US011465217B1

(12) United States Patent
Wollenburg

(10) Patent No.: US 11,465,217 B1
(45) Date of Patent: Oct. 11, 2022

(54) METHOD AND APPARATUS FOR USING A PORTABLE DRILL

(71) Applicant: Woodpeckers, LLC, Strongsville, OH (US)

(72) Inventor: Benjamin T. Wollenburg, North Olmsted, OH (US)

(73) Assignee: Woodpeckers, LLC, Strongsville, OH (US)

( * ) Notice: Subject to any disclaimer, the term of this patent is extended or adjusted under 35 U.S.C. 154(b) by 0 days.

(21) Appl. No.: 17/405,164

(22) Filed: Aug. 18, 2021

(51) Int. Cl.
*B23B 47/28* (2006.01)
*B23B 45/00* (2006.01)
*B23B 49/00* (2006.01)
*B25H 1/00* (2006.01)

(52) U.S. Cl.
CPC .......... *B23B 45/003* (2013.01); *B23B 47/28* (2013.01); *B23B 49/003* (2013.01); *B23B 2247/12* (2013.01); *B25H 1/0021* (2013.01); *Y10S 408/712* (2013.01); *Y10T 408/5653* (2015.01)

(58) Field of Classification Search
CPC ....... B23B 47/00; B23B 47/28; B23B 49/003; B23B 49/006; B23B 2247/00; B23B 2247/12; B23B 45/003; B23B 2260/0482; B23B 2260/0485; B23B 2260/0487; B23B 2260/12; B23Q 9/0014; B25H 1/0021; B25H 1/0078; B25H 1/005; B25H 1/0064; Y10T 408/564; Y10T 408/5653; Y10T 408/99; Y10T 408/8925; Y10T 408/8928; Y10S 408/712
See application file for complete search history.

(56) References Cited

U.S. PATENT DOCUMENTS

| | | | |
|---|---|---|---|
| 1,470,143 A | 10/1923 | Buterbaugh | |
| 2,050,709 A | 4/1936 | Lopez | |
| 2,165,334 A | 7/1939 | Bossi | |
| 2,574,653 A * | 11/1951 | Miller | B23Q 16/001 81/157 |
| 2,832,241 A | 4/1958 | Nelson | |
| 2,849,900 A | 9/1958 | Heidtman, Jr. | |
| 2,888,965 A | 6/1959 | Phillips | |
| 2,909,085 A | 10/1959 | Jepson | |
| 3,046,817 A | 2/1963 | Schwable | |
| 3,077,129 A | 2/1963 | Carles | |
| 3,119,286 A | 1/1964 | Forman et al. | |
| 3,746,460 A | 7/1973 | Lipe | |

(Continued)

*Primary Examiner* — Chwen-Wei Su
(74) *Attorney, Agent, or Firm* — Sand, Sebolt & Wernow Co., LPA

(57) ABSTRACT

A drill guide that includes associated components and various methods of use herein. The drill guide includes a first guide column and a second guide column provided on a base plate. The drill guide also includes a chuck carrier adapted to operatively receive a drill chuck of a portable drill. The chuck carrier is operably engaged with the first guide column and the second guide column, and the chuck carrier is linearly moveable along the first guide column and the second guide column between a return position and a plunging position relative to the base plate. The drill guide also includes a tapered portion defined in the first guide column. The drill guide also includes a depth stopper that is operably engaged with the first guide column, wherein the tapered portion enables self-tightening of the depth stopper about the first guide column.

20 Claims, 40 Drawing Sheets

(56) References Cited

U.S. PATENT DOCUMENTS

| | | | |
|---|---|---|---|
| 3,838,935 A | 10/1974 | Boyajian | |
| 3,958,893 A | 5/1976 | Boyajian | |
| 4,080,092 A | 3/1978 | Hudson | |
| 4,082,474 A | 4/1978 | Stiger | |
| 4,179,231 A * | 12/1979 | Hadden | B25H 1/0064 408/112 |
| 4,391,558 A | 7/1983 | Perry | |
| 4,445,811 A * | 5/1984 | Sanders | B23Q 16/001 409/184 |
| 4,572,715 A * | 2/1986 | Wolff | B23B 47/287 408/112 |
| 4,585,376 A | 4/1986 | Davenport, Sr. et al. | |
| 4,923,341 A | 5/1990 | Cameron | |
| 5,252,010 A * | 10/1993 | Obrecht | B23Q 16/001 33/642 |
| 5,660,508 A | 8/1997 | Schneider | |
| 5,713,702 A * | 2/1998 | Turner | B23B 41/006 408/100 |
| 5,765,273 A * | 6/1998 | Mora | B23Q 1/5412 108/4 |
| 7,094,008 B2 * | 8/2006 | Hartsfield, Jr. | B23B 47/287 408/110 |
| 7,290,574 B2 * | 11/2007 | Baber | B25F 5/021 144/48.5 |
| 7,708,505 B2 * | 5/2010 | Opsitos, Jr. | B23B 45/02 408/112 |
| 7,784,507 B2 | 8/2010 | Gass | |
| 7,976,252 B2 | 7/2011 | McDaniel et al. | |
| 8,628,280 B2 | 1/2014 | Ceroll et al. | |
| 9,555,481 B2 * | 1/2017 | Nowland | B23B 45/00 |
| 2019/0358715 A1 * | 11/2019 | Yu | B25H 1/0042 |

* cited by examiner

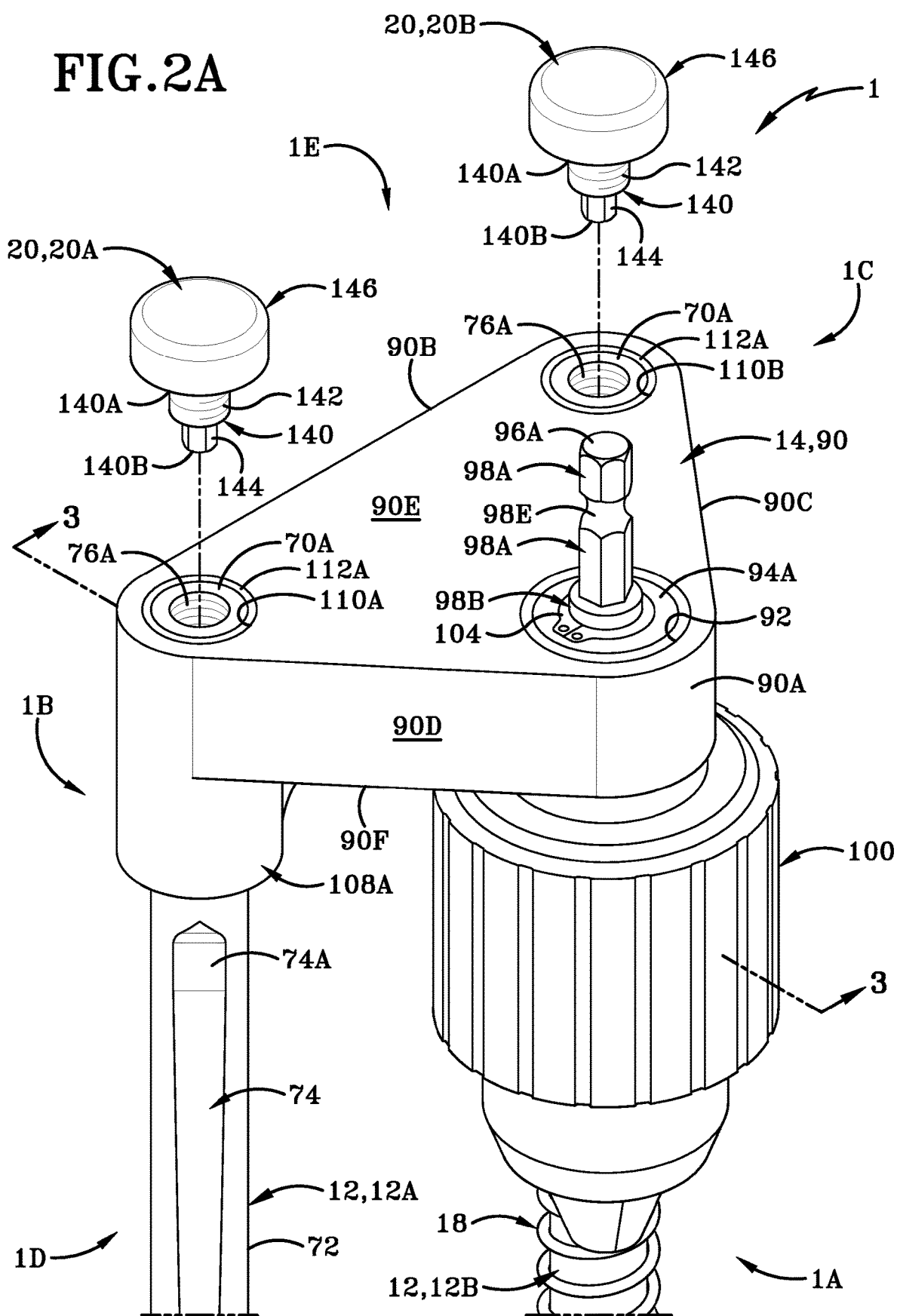

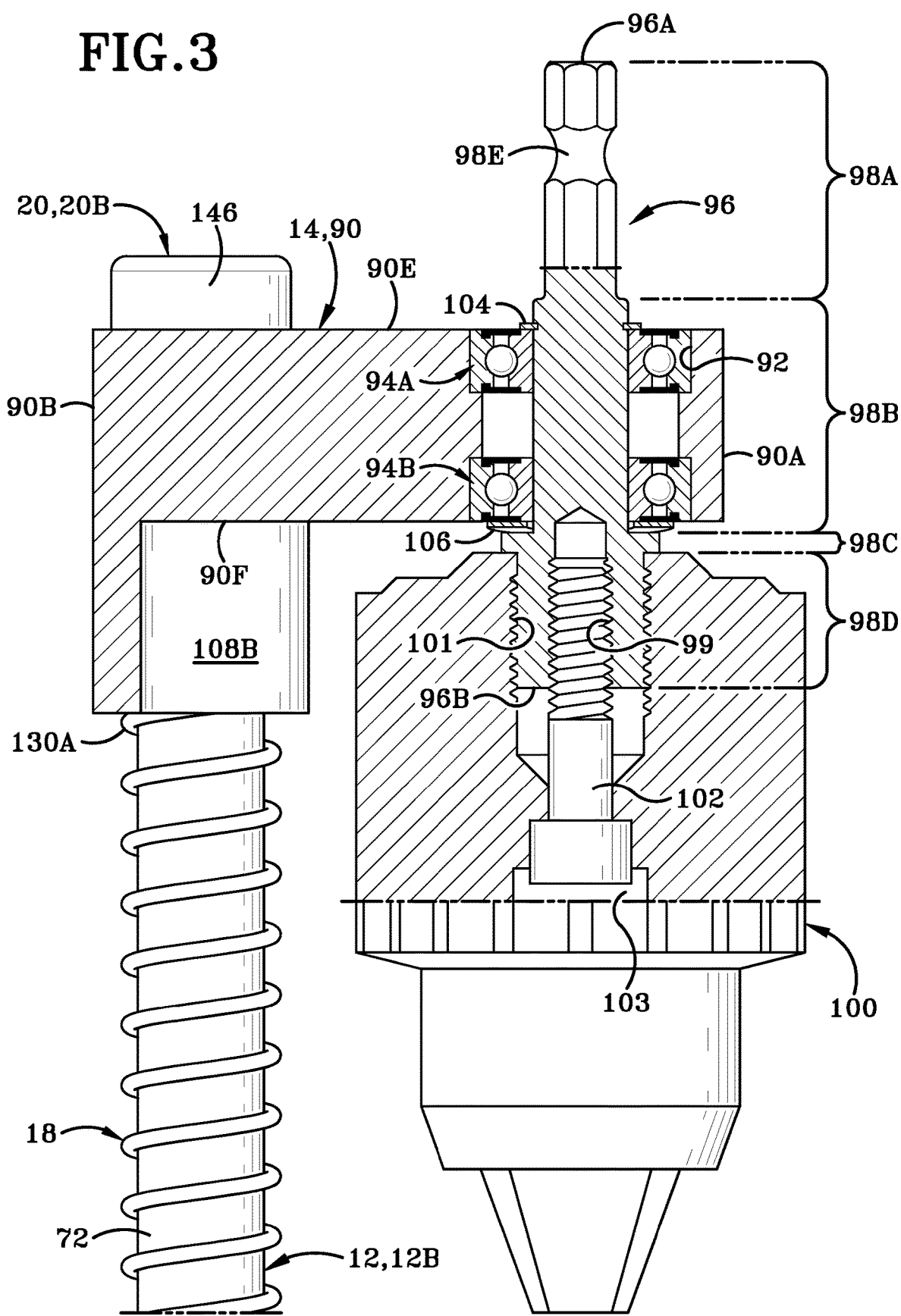

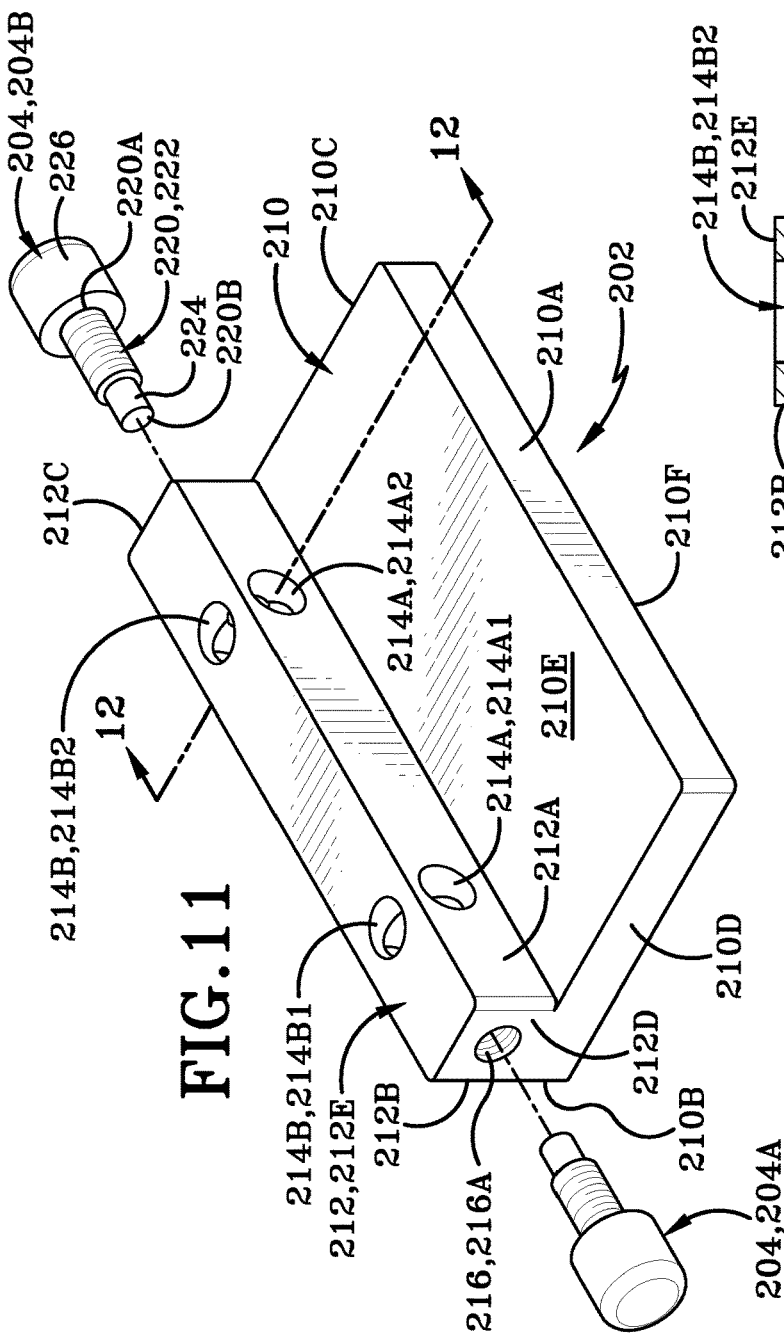
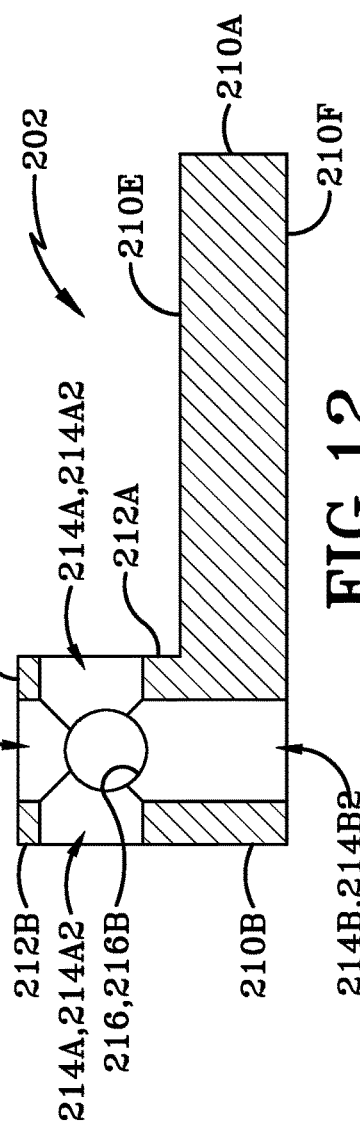
FIG.11
FIG.12

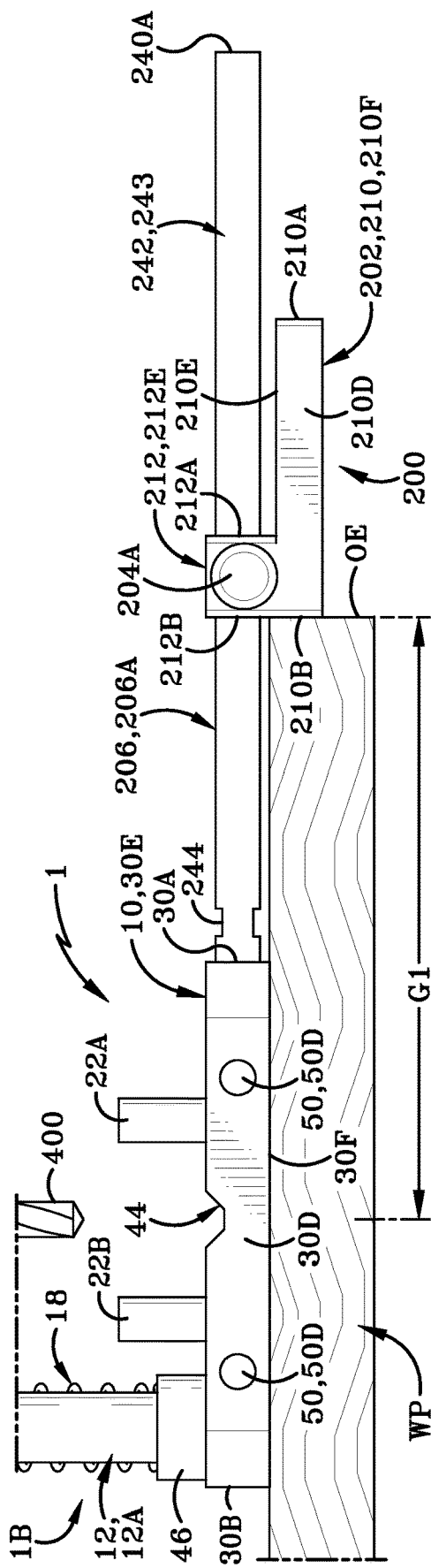
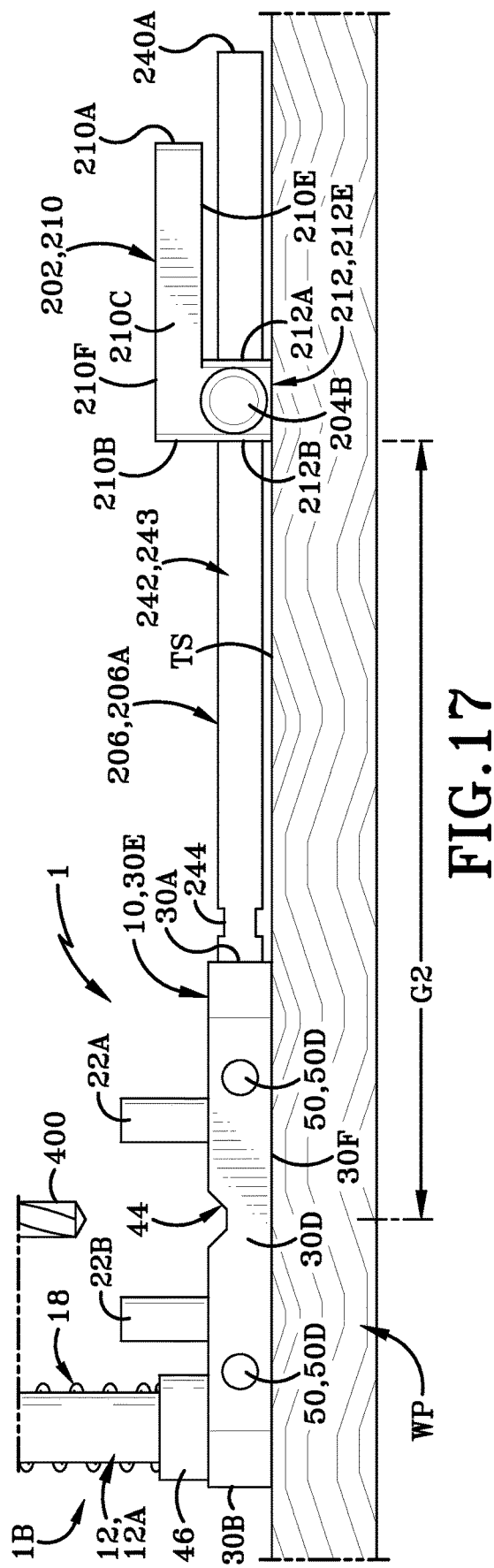
FIG.15
FIG.17

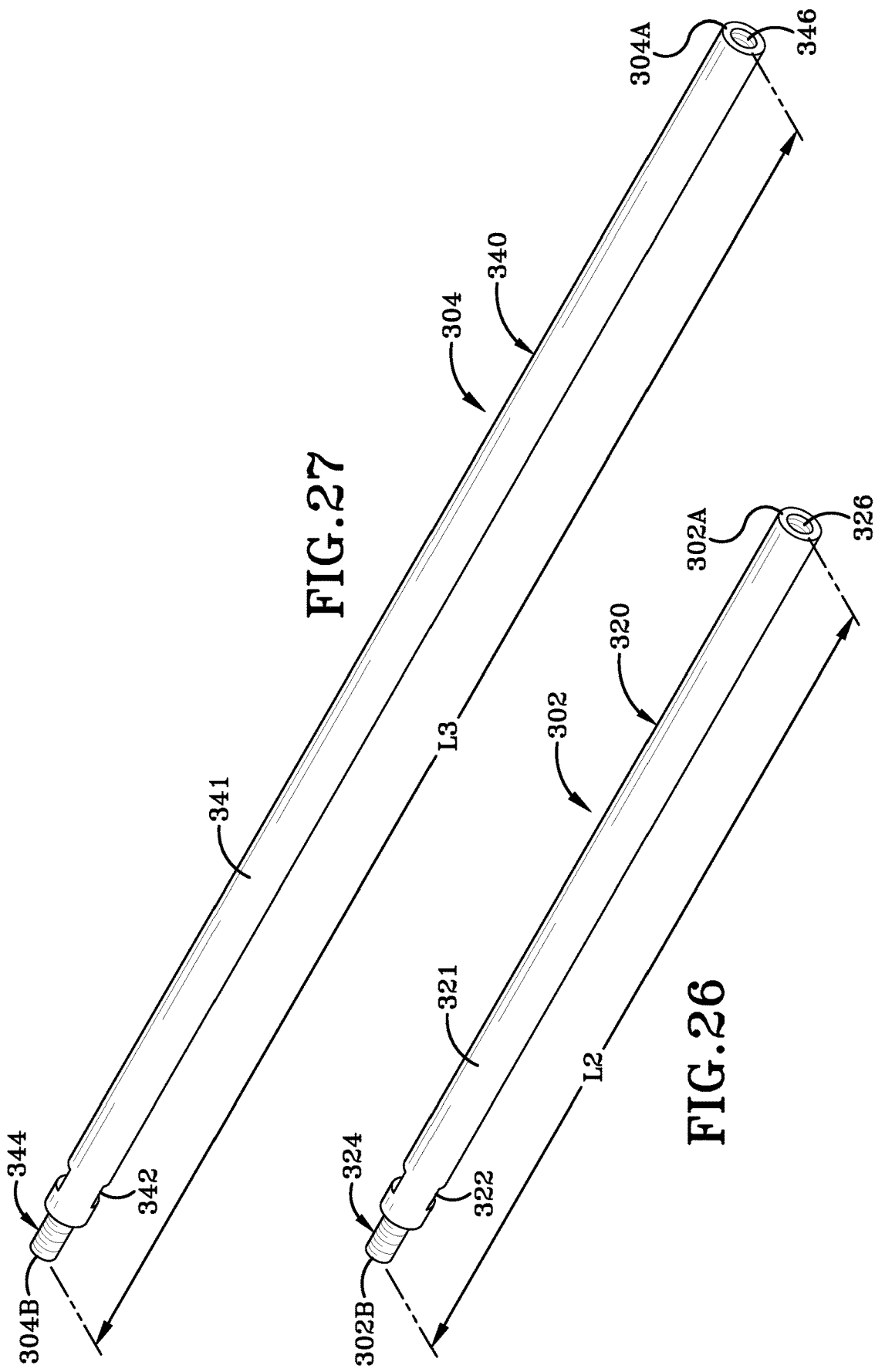

METHOD AND APPARATUS FOR USING A PORTABLE DRILL

TECHNICAL FIELD

The present disclosure generally relates to a multipurpose tool. More particularly, the present disclosure relates to a portable drill guide. Specifically, the present disclosure relates to a portable drill guide that is useable to enable a user to more accurately use a portable drill to drill a hole into a workpiece in a controlled straight line.

BACKGROUND

Hand drills, handheld drills, and portable power drills are versatile tools which are used in multiple projects for drilling holes into different types of workpiece, such as wood workpieces. Generally, portable power drills are used in woodworking projects for drilling and/or boring holes of different dimensions based on the selected drilling bit used with a selected portable power the drill. While a woodworker may use a portable power drill to drill various types of holes in workpieces, it is difficult and demanding to drill precise and accurate holes into a workpiece where the holes are substantially straight and orthogonal to the longitudinal axis of the workpiece.

To address these difficulties and problems, a woodworker may select a device or multiple devices to help stabilize and guide his or her portable power drill during a drilling operation. While such assisting devices are provided in the market, the woodworker may have to use a number of different devices to drill different precise holes into a workpiece. For example, the woodworker may have to use a first set of assisting devices with the portable power drill for drilling a first hole with a first set of dimensions and a second set of assisting devices with the portable power drill for drilling a second hole with a second set of dimensions. In another example, the woodworker may have to use a first set of assisting devices with the portable power drill for drilling a first hole that is located in a center of a workpiece and a second set of assisting devices with the portable power drill for drilling a second hole at a location away from the center of a workpiece. Such use of multiple assisting devices requires the woodworker to have access to these various assisting devices and requires the expenditure of more time and effort when the woodworker is drilling multiple holes into a workpiece.

SUMMARY

The presently disclosed drill guide provides a woodworker with a multifunctional tool which may be used for adjusting and aligning a portable drill in order to make a straight hole in a workpiece at a desired location and to a desired depth. The disclosed drill guide may reduce the overall number of portable drill assisting devices that a woodworker has to use to complete a project and may also the reduce the project's completion time since the need to switch between multiple devices is avoided. As such, the drill guide disclosed herein addresses some of the inadequacies of previously known drill assisting devices.

In one aspect, an exemplary embodiment of the present disclosure may provide drill guide. The drill guide may include a base plate. The drill guide may also include a first guide column and a second guide column provided on the base plate. The drill guide may also include a chuck carrier adapted to operatively receive a drill chuck of a portable drill. The chuck carrier is operably engaged with the first guide column and the second guide column where the chuck carrier is linearly moveable along the first guide column and the second guide column between a return position and a plunging position relative to the base plate. The drill guide may also include a tapered portion defined in the first guide column. The drill guide may also include a depth stopper operably engaged with the first guide column where the tapered portion enables self-tightening of the depth stopper about the first guide column.

This exemplary embodiment or another exemplary embodiment may further provide that the tapered portion further comprises a first diameter defined at a first end of the tapered portion; and a second diameter defined at a second end of the tapered portion that is greater than the first diameter, wherein the tapered portion is adapted to provide a self-tightening mechanism for the depth stopper about the first guide column when the chuck carrier moves towards the opening. This exemplary embodiment or another exemplary embodiment may further provide a biaser provided with the second guide column for returning the chuck carrier to the return position. This exemplary embodiment or another exemplary embodiment may further provide that at least one lock knob is operably engaged with one of the first guide column and the second guide column, and the at least one lock knob retains the chuck carrier on the one of the first guide column and the second guide column. This exemplary embodiment or another exemplary embodiment may further provide that the base plate further comprises a top surface and an opposed bottom surface which extend between a front end and an opposed rear end. This exemplary embodiment or another exemplary embodiment may further provide that an opening is defined in the base plate where the opening extends between the top surface and the bottom surface and wherein the opening is adapted to receive a drilling bit provided on the chuck carrier therethrough. This exemplary embodiment or another exemplary embodiment may further provide that the chuck carrier further comprises a chuck, and wherein the chuck is aligned with the opening of the base plate in a first position. This exemplary embodiment or another exemplary embodiment may further provide that the chuck carrier further comprises a chuck, wherein the chuck is located outwardly away from the base plate in a second position. This exemplary embodiment or another exemplary embodiment may further provide that the opening of the base plate is adapted to receive a drilling bit having a diameter of up to about one inch. This exemplary embodiment or another exemplary embodiment may further provide that the chuck of the chuck carrier is adapted to engage a drilling bit having a diameter of up to about two inches when the chuck is in the second position. This exemplary embodiment or another exemplary embodiment may further provide that the base plate further comprises a first side and an opposed second side, and wherein a groove is defined in the base plate disposed between the first side and the second side and extends from the top surface towards the bottom surface and the groove is adapted to receive a curvilinear workpiece therein. This exemplary embodiment or another exemplary embodiment may further provide that at least one centering pin is selectively operatively engageable with the base plate, where the at least one centering pin is movable between a first stored position on a top surface of the base plate and a first centering position on a bottom surface of the base plate. This exemplary embodiment or another exemplary embodiment may further provide that the at least one centering pin comprises a first centering pin and a second centering pin; the second centering pin is selectively operatively engageable with the base plate between a second stored position on the top surface of the base plate remote from the first centering pin and a second centering position on the bottom surface of the base plate remote from the first centering pin; wherein the first centering pin and second centering pin are adapted to align a workpiece with a chuck of the chuck carrier. This exemplary embodiment or another exemplary embodiment may further provide that a fence is adapted to abut an outermost edge of a workpiece and at least one guide rod, wherein the at least one guide rod operably engages the fence to the base plate. This exemplary embodiment or another exemplary embodiment may further provide that the chuck carrier is adapted to engage a drilling bit therein and the at least one guide rod maintains the fence a distance away from the drilling bit. This exemplary embodiment or another exemplary embodiment may further provide a fence; and at least one guide rod, wherein the at least one guide rod operably engages the fence to the base plate, and wherein a top surface of the fence is disposed adjacent to a bottom surface of the base plate. This exemplary embodiment or another exemplary embodiment may further provide a support rod operatively engaged with the base plate; a flip stop operatively engaged with the support rod, said flip stop having a stop arm; wherein the support rod maintains the flip stop a distance away from the drilling bit; wherein the at least one guide rod extends between a front end of the base plate and a rear end of the fence; and wherein the stop arm is orthogonal to the rear end of the fence.

In another aspect, an exemplary embodiment may provide a method of using a portable drill with a drill guide. The method comprising steps of operably engaging a drilling bit into a chuck of a chuck carrier of the drill guide; aligning a set of witness lines on a workpiece with guide markers provided on a base plate of the drill guide; setting a depth stopper to a desired height on a tapered portion of a first guide column of the drill guide; operably engaging a drill chuck of the portable drill with the chuck of the chuck carrier; collectively moving the portable drill and the chuck carrier along the first guide column towards an opening defined by the base plate; self-tightening the depth stopper about the first guide column as the chuck carrier moves towards the opening; and drilling a hole into the workpiece with the drilling bit.

This exemplary embodiment or another exemplary embodiment may further provide the step of collectively moving the portable drill and the chuck carrier away from the base plate via a biaser provided on a second guide column of the drill guide. This exemplary embodiment or another exemplary embodiment may further provide steps of rotating the chuck carrier from a first position where the drilling bit aligns with the opening in the base plate to a second position where the drilling bit is located outwardly away from the base plate; disengaging the drilling bit from the chuck carrier; and engaging another drilling bit of a greater diameter with the chuck carrier. This exemplary embodiment or another exemplary embodiment may further provide steps of removing a first lock knob from the first guide column of the drill base when the chuck carrier is in the first position; disengaging the chuck carrier from the first guide column; rotating the chuck carrier to the second position; reengaging the chuck carrier in the second position with the first guide column; and operably engaging the first lock knob with the first guide column to maintain the chuck carrier in the second position. This exemplary embodiment or another exemplary embodiment may further provide the steps of removing a first centering pin from a first stored position on a top surface of the base plate; removing a second centering pin from a second stored position on the top surface of the base plate; operably engaging the first centering pin at a bottom surface of the base plate in a first centering position; operably engaging the second centering pin at the bottom surface of the base plate in a second centering position; and locating the workpiece between the first centering pin and the second centering pin on the bottom surface of the base plate. This exemplary embodiment or another exemplary embodiment may further provide the step of positioning a workpiece into a groove defined by the base plate, wherein the workpiece defines a curvilinear shape. This exemplary embodiment or another exemplary embodiment may further provide steps of operably engaging at least one guide rod with a first end of the base plate; operably engaging a fence with the at least one guide rod; and positioning a top surface of the fence adjacent to a bottom surface of the base plate. This exemplary embodiment or another exemplary embodiment may further provide steps of operably engaging at least one guide rod with a first end of the base plate; operably engaging a fence with the at least one guide rod; positioning the fence a first distance away from the drilling bit; and abutting a rear end of the fence to a first outermost edge of the workpiece. This exemplary embodiment or another exemplary embodiment may further provide steps of operably engaging a support rod with a first side of the base plate; operably engaging a flip stop with the support rod; positioning the flip stop at a second distance away from the drilling fence; and abutting a stop arm of the flip stop to a second outermost edge of the workpiece, wherein the stop arm is orthogonal to the rear end of the fence.

In yet another aspect, an exemplary embodiment of the present disclosure may provide another drill guide. The drill guide may include a base plate. The drill guide may also include at least one guide column that is provided on the base plate. The drill guide may also include a chuck carrier that is operably engaged with the at least one guide column and being linearly moveable relative to the base plate, wherein the chuck carrier is adapted to engage a portable drill. The drill guide may also include a fence assembly that is operably engagable with the base plate The fence assembly is adapted to collectively maintain the base plate, the at least one guide column, the chuck carrier, and the portable drill at a predetermined location on a workpiece.

This exemplary embodiment or another exemplary embodiment may further provide that the base plate further comprises a front wall and an opposed rear wall, a first side wall, and an opposed second side wall; and wherein the fence assembly is selectively operatively engageable with the base plate at one of the front wall, the rear wall, the first side wall, and the second side wall. This exemplary embodiment or another exemplary embodiment may further provide that the fence assembly further comprises a fence and at least one guide rod which operably engages the fence to the base plate, and maintains the fence a distance away from the base plate. This exemplary embodiment or another exemplary embodiment may further provide that the fence is engaged with the at least one guide rod and is selectively movable between a first end of the at least one guide rod and a second end of the at least one guide rod. This exemplary embodiment or another exemplary embodiment may further provide that the fence comprises a plate and a step. The plate has a front end, an opposed rear end, a longitudinal axis that extends between the front end and the rear end, and the plate further has a top surface and an opposed bottom surface. The step extends outwardly from the top surface of the plate and includes an upper surface remote from the top surface of the plate. This exemplary embodiment or another exemplary embodiment may further provide that the rear end of the plate faces the base plate, and wherein the at least one guide rod extends between the rear end of the plate and the front end of the base plate. This exemplary embodiment or another exemplary embodiment may further provide that the upper surface of the plate and a top surface of the base plate both face in a same direction. This exemplary embodiment or another exemplary embodiment may further provide that the upper surface of the plate and a top surface of the base plate face in opposite directions. This exemplary embodiment or another exemplary embodiment may further provide that the top surface of the plate faces a bottom surface of the base plate. This exemplary embodiment or another exemplary embodiment may further provide that the bottom surface of the plate is orthogonal to a top surface of the base plate. This exemplary embodiment or another exemplary embodiment may further provide a first assembly that is operatively engaged with the base plate and is adapted to retain the base plate in a longitudinal position relative to a first edge of a workpiece; and a second assembly that is operatively engaged with the base plate and is adapted to retain the base plate in a transverse position relative to a second edge of the workpiece, wherein the first assembly and the second assembly are orthogonal to one another.

In another aspect, an exemplary embodiment may provide method of guiding a portable drill. The method comprising steps of operably engaging the portable drill to a drill guide; engaging at least one guide rod to a base plate of the drill guide; placing the base plate of the drill guide on a workpiece; engaging a fence of the drill guide with the at least one guide rod; positioning the fence against the workpiece; and maintaining a drilling bit on the drill guide at a predetermined location on the workpiece.

This exemplary embodiment or another exemplary embodiment may further provide that the step of placing of the base plate of the drill guide on the workpiece includes placing the base plate on a top surface of the workpiece; wherein the positioning of the fence against the workpiece includes placing a rear end of the fence on a side surface of the workpiece that is substantially perpendicular to the top surface of the workpiece; and positioning the fence at a distance away from the drilling bit via the at least one guide rod. This exemplary embodiment or another exemplary embodiment may further provide that the step of placing of the base plate of the drill guide on the workpiece includes placing the base plate on a top surface of the workpiece; wherein the positioning of the fence against the workpiece includes placing a front end of the fence on a side surface of the workpiece that is substantially perpendicular to the top surface of the workpiece; and positioning a portion of a top surface of the fence adjacent to a bottom surface of the base plate. This exemplary embodiment or another exemplary embodiment may further provide that the step of placing of the base plate of the drill guide on the workpiece includes placing the base plate on a top surface of the workpiece; placing an upper surface of the fence on the top surface of the workpiece; and positioning the fence a distance away from the drilling bit via the at least one guide rod. This exemplary embodiment or another exemplary embodiment may further provide that the step of placing of the base plate of the drill guide on the workpiece includes placing the base plate on a side surface of the workpiece; wherein the positioning of the fence against the workpiece includes placing a bottom surface of the fence on the top surface of the workpiece; and positioning the fence a distance away from the drilling bit via the at least one guide rod.

In another aspect, an exemplary embodiment may provide method of guiding a portable drill. The method comprising steps of engaging a first assembly with a base plate of a drill guide; placing the base plate on a surface of a workpiece; retaining the base plate in a longitudinal position relative to a first edge of the workpiece, wherein the first edge is orthogonal to the surface of the workpiece; orienting a second assembly orthogonally to the first assembly; engage the second assembly with the base plate of the drill guide; and retaining the base plate in a transverse position relative to a second edge of the workpiece, wherein the second edge is orthogonal to the first edge.

This exemplary embodiment or another exemplary embodiment may further provide locating a drilling bit of the drill guide at a predetermined location on the surface of the workpiece; rotating the drilling bit; and drilling a hole into the workpiece along a straight line.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 2A is an enlargement of the highlighted region in FIG. 2, wherein a first locking knob and a second locking knob are provided in an isolated exploded view from the drill guide.

FIG. 3 is a longitudinal cross-section of a chuck carrier of the drill guide taken in the direction of line 3-3 of FIG. 2A.

FIG. 8 is also a top plan view of a base plate and the first and second centering pin of the drill guide.

FIG. 11 is a top, front, right isometric perspective view of a fence of the fence assembly, wherein a pair of thumb screws of the fence are provided in an isometric exploded view from the fence.

FIG. 12 is a longitudinal cross-section of the fence taken in the direction of line 12-12 of FIG. 11.

FIG. 15 is a right side elevation view showing the drill guide and the fence assembly with the workpiece, wherein the rear end of the fence abuts the outermost end of the workpiece as shown in FIG. 14C.

FIG. 17 is a right side elevation view of drill guide and the fence assembly, wherein the top surface of the fence abuts the top surface of the workpiece as shown to FIG. 16.

FIG. 25A is also a top plan view of the drill guide resting on a workpiece, wherein the first and second centering pins are abutting first and second outermost sides of the workpiece at first locations.

FIG. 25B is also a top plan view similar to FIG. 25A showing the drill guide resting on a workpiece, wherein the drill guide is rotated about its vertical axis where the first and second centering pins are abutting first and second outermost sides of the workpiece at second, opposing locations.

FIG. 26 is a top, front, right isometric perspective view of a guide rod of a flip stop assembly.

FIG. 27 is a top, front, right, isometric perspective view of an extension rod of the flip stop assembly.

Similar numbers refer to similar parts throughout the drawings.

DETAILED DESCRIPTION

Figure 1:
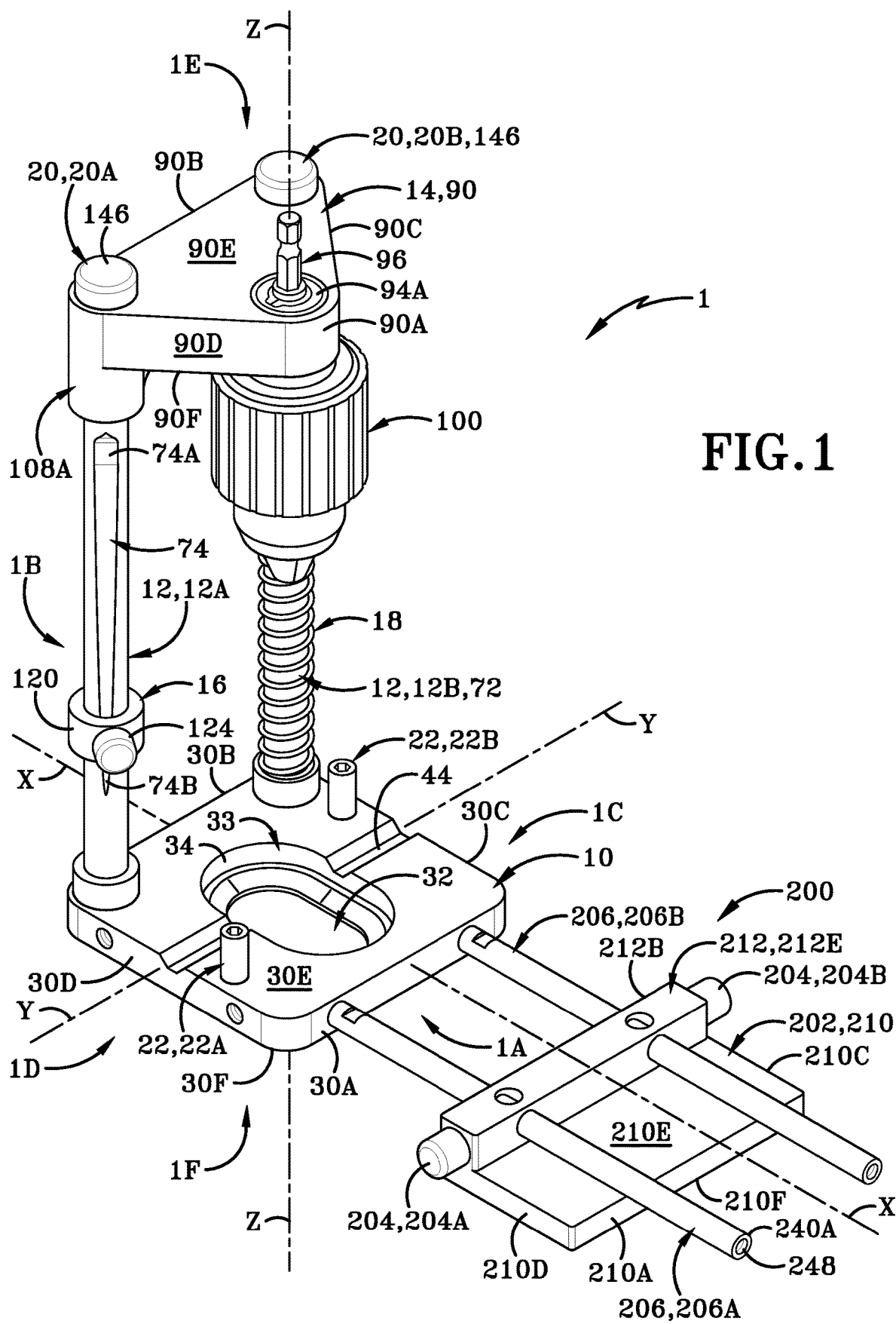
FIG. 1 is a top, front, right side isometric perspective view of a drill guide in accordance with an aspect of the present disclosure, wherein the drill guide is illustrated operatively engaged with a fence assembly in accordance with a further aspect of the present disclosure.

FIG. 1 illustrates a drill guide, shown generally at 1, for use with a hand drill or a portable drill, which is described in more detail below. Drill guide 1 generally includes a front end 1A, a rear end 1B that opposes the front end 1A, and a longitudinal axis "X" that extends between the front end 1A and the rear end 1B. Drill guide 1 also generally includes a left side or first side 1C, a right side or second side 1D that opposes the left side 1C, and a transverse axis "Y" that extends between the left side 1C and the right side 1D. Drill guide 1 generally includes a top end 1E, a bottom end 1F that opposes the top end 1E, and a vertical axis "Z" that extends between the top end 1E and the bottom end 1F. It should be understood that the terms "front," "rear," "left," "right," "top," and "bottom" are used to describe the orientation of drill guide 1 illustrated in the attached figures and should in no way be considered to limit the orientation in which drill guide 1 may be utilized during a drilling operation.

Referring now to FIG. 1, the drill guide 1 includes a base plate 10, at least one guide column 12, a chuck carrier 14, a depth stopper 16, a biaser 18, at least one lock knob 20, and a pair of centering pins 22. Still referring to FIG. 1, a fence assembly or first assembly 200 may be operably engaged the drill guide 1 as desired by a woodworker when using the drill guide 1 during a drilling operation. Referring now to FIG. 31B, a flip stop assembly or a second assembly 300 may also operably engage the drill guide 1 as desired by a woodworker when using the drill guide 1 during a drilling operation. Such use of the fence assembly 200 and the flip stop assembly 300 is described in more detail later herein.

Figure 2:
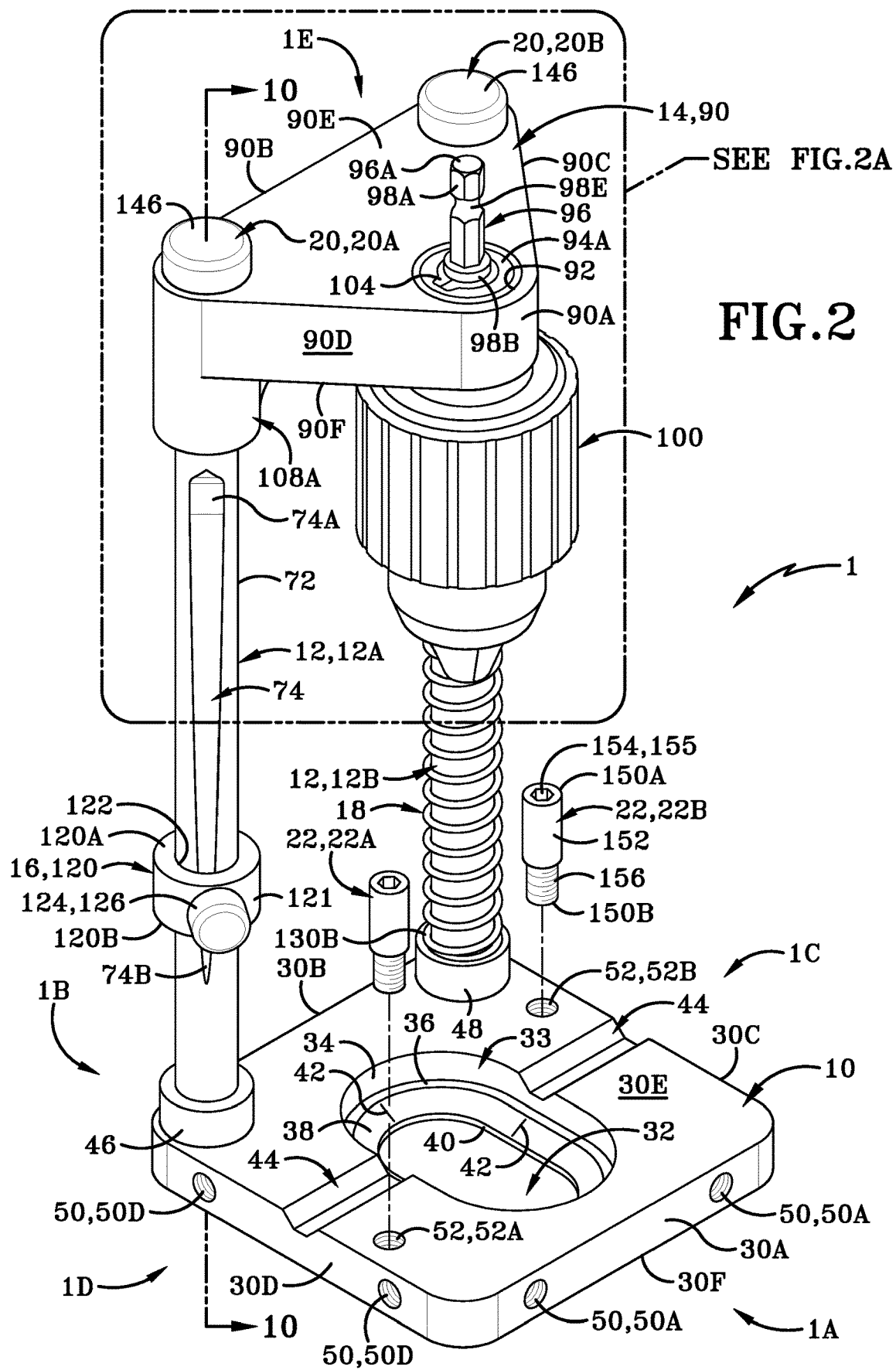
FIG. 2 is a top, front, right side isometric perspective view of a drill guide in accordance with an aspect of the present disclosure, wherein a first centering pin and a second centering are provided in an isometric exploded view from the drill guide. The fence assembly is removed.

The various components of drill guide 1 will now each be described in greater detail. Referring now to FIGS. 1 and 2, the base plate 10 includes a front end 30A, a rear end 30B that opposes the front end 30A, and a longitudinal axis between the front end 30A and the rear end 30B. The longitudinal axis of base plate 10 is aligned with the longitudinal axis "X" of drill guide 1. The base plate 10 also includes a left side or first side 30C, a right side or second side 30D that opposes the left side 30C, and a transverse axis between the left side 30C to the right side 30D. The transverse axis of base plate 10 is aligned with the transverse axis "Y" of drill guide 1. The base plate 10 also includes a top surface 30E that faces the top end 1E of the drill guide 1 and extends from the front end 30A to the rear end 30B of the base plate 10. The base plate 10 also includes a bottom surface 30F (seen in FIG. 9) that faces the bottom end 1F of the drill guide 1 and extends from the front end 30A to the rear end 30B of the base plate 10. The vertical axis of base plate 10 extends between the top surface 30E and bottom surface 30F of the base plate 10 and is aligned with the vertical axis "Z" of drill guide 1.

Still referring to FIGS. 1 and 2, the base plate 10 defines a central opening 32 that is disposed between the front end 30A and the rear end 30B of the base plate 10 and extends between top surface 30E and bottom surface 30F of base plate 10. In the illustrated embodiment, the central opening 32 defined by the base plate 10 is curvilinear and/or round in shape. In one exemplary embodiment, a central opening defined by a base plate may be substantially elongated such that the central opening defined by the base plate is oblong-shaped. In another exemplary embodiment, a central opening defined by a base plate may be substantially elongated such that the central opening defined by the base plate is ovoidal. Furthermore, the central opening 32 may be any suitable shape that will enable different types of drilling bits of different diameters and lengths to be received therethrough, in particular drilling bits up to diameters of one inch.

Figure 8:
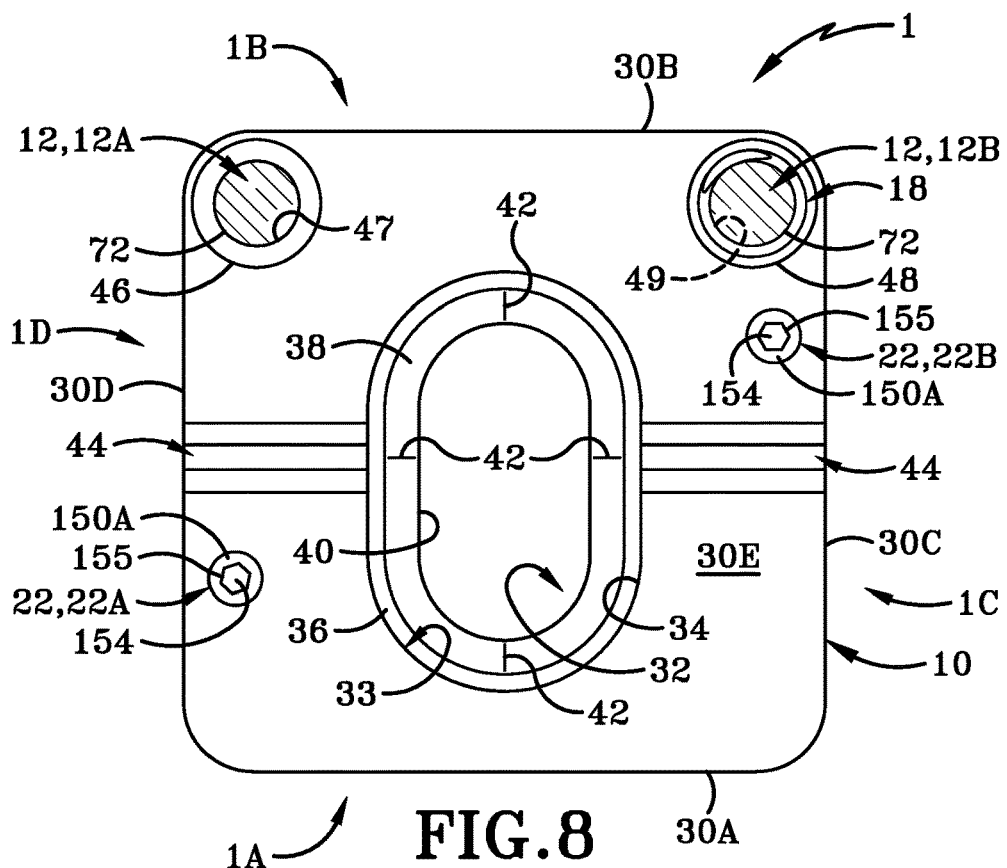
FIG. 8 is a transverse cross-section of first and second guide columns taken in the direction of line 8-8 of FIG. 4.

Referring to FIGS. 1 and 8, the central openings 32 is also defined in a recess 33. The recess 33 is bounded by a first circumferential wall 34 extending from the top surface 30E to a flat intermediate wall 36 disposed between the top surface 30E and the bottom surface 30F. In addition, the recess 33 is also bounded by an angled bottom wall 38 that extends from the flat intermediate wall 36 to a second circumferential wall 40 that is disposed proximate to the bottom surface 30F of the base plate 10.

As clearly illustrated in FIG. 8, a set of guide markers 42 are provided on the angle bottom wall 30 in which first and second guide marker are aligned with one another parallel with the longitudinal axis of the base plate 10 and third and fourth guide marker are aligned with one another parallel with the transverse axis of the base plate 10. The guide markers 42 on the base plate 10 allows a woodworker to align the guide markers 42 of the drill guide 1 with a set of witness lines provided on a workpiece for accurately positioning the drill guide 1 with a predetermined drilling location. Such use of guide markers 42 of the drill guide 1 during a drilling operation is provided in more detail below.

Referring now to FIGS. 1, 2, and 8, the base plate 10 defines a groove 44 that extends downwardly from the top surface 30E and into the base plate 10 towards the bottom surface 30F. The groove 44 is also disposed between the left end 30C and the right end 30D of the base plate 10 parallel with the transverse axis of the base plate 10. In the illustrated embodiment, the groove 44 defined by the base plate 10 has a tapered-shape. In one exemplary embodiment, a groove defined by a base plate may be substantially triangular and/or V-shaped. In another exemplary embodiment, a groove defined by a base plate may be substantially trapezoidal. The groove 44 defined by the base plate 10 allows a woodworker to introduce a curvilinear and/or rounded workpiece (e.g., dowel rod, tapered rods, etc.) to the groove 44 such that the groove 44 of the base plate 10 prevents rotational movement of said curvilinear and/or rounded workpiece during a drilling process. Such use of the groove 44 defined by the base plate 10 during a drilling process is provided in more detail below.

Figure 5:
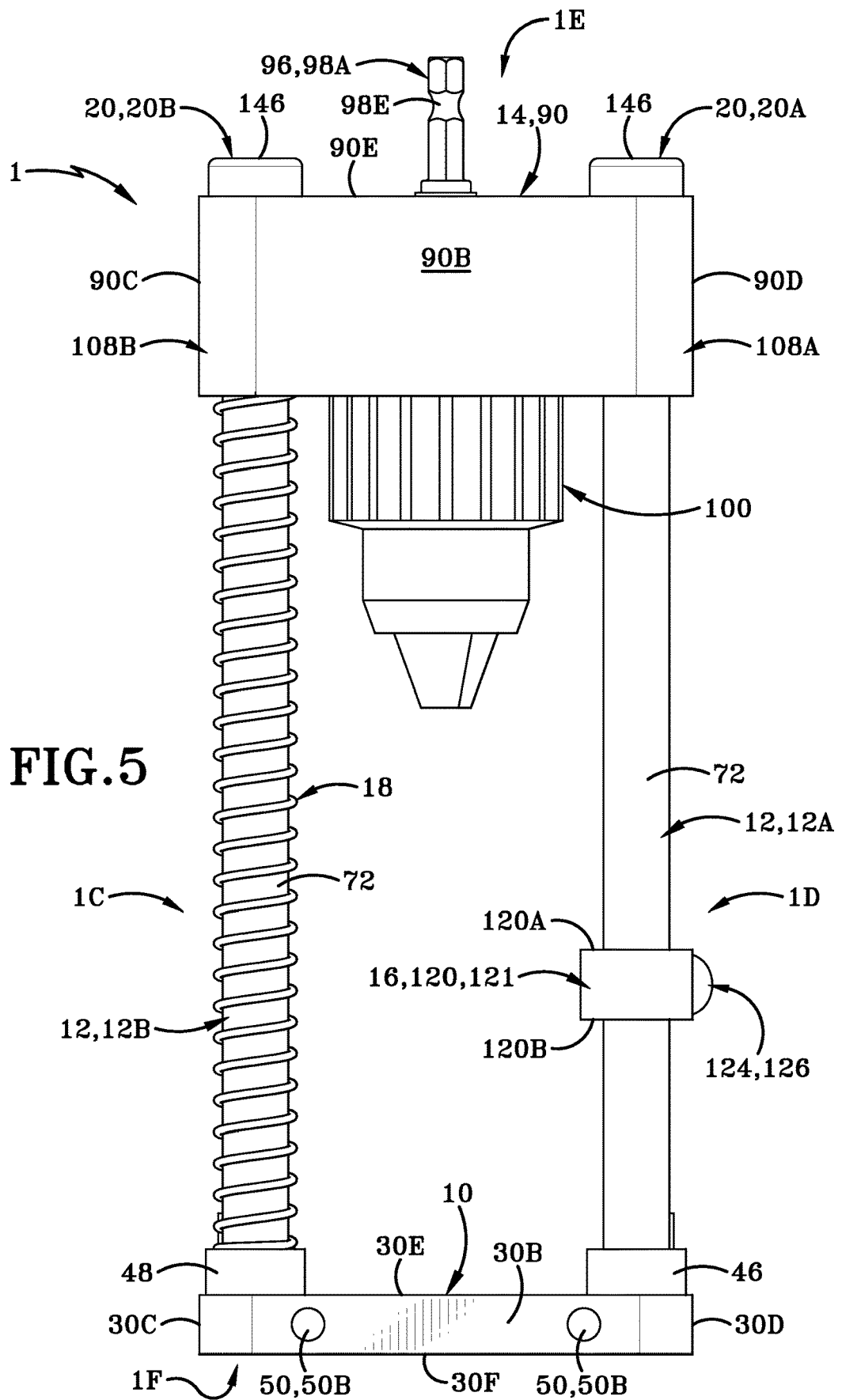
FIG. 5 is a rear elevation view of the drill guide of FIG. 2, wherein the chuck carrier is provided in the first position.

Referring to FIGS. 1, 2, and 5, the base plate 10 also includes a first extension 46 and a second extension 48. The first extension 46 is disposed proximate to the rear end 30B and the right side 30D of the base plate 10 and extends upwardly from the top surface 30E parallel with the vertical axis "Z." The second extension 48 is disposed proximate to the rear end 30B and the left side 30C of the base plate 10 and extends upwardly from upwardly from the top surface 30E parallel with the vertical axis "Z." In the illustrated embodiment, the first extension 46 and the second extension 48 oppose one another on the base plate 10 relative to the transverse axis of the base plate 10. As illustrated in FIG. 8, the first extension 46 defines a passageway 47 that extends entirely through the base plate 10 and the first extension 46 relative to the vertical axis "Z". Similarly, the second extension 48 defines a passageway 49 that extends entirely through the base plate 10 and the second extension 46 relative to the vertical axis "Z". The uses of the first and second extensions 46, 48 are provided in more detail below.

Referring now to FIGS. 2 and 4-7, the base plate 10 defines a set of threaded openings 50 that extends laterally into the base plate 10 relative to the longitudinal axis or the transverse axis of the base plate 10. Each threaded opening of the set of threaded openings 50 is substantially smaller than the central opening 32. In the illustrated embodiment, each of the front end 30A, rear end 30B, left side 30C, and right side 30D defines at least one threaded opening 50. In other words, the front end 30A of base plate 10 defines at least one threaded opening 50A from the set of threaded openings 50, the rear end 30B of base plate 10 defines at least one threaded opening 50B from the set of threaded openings 50, the left side 30C of base plate 10 defines at least one threaded opening 50C from the set of threaded openings 50, and the right side 30D of base plate 10 defines at least one threaded opening 50D from the set of threaded openings 50. In one exemplary embodiment, a front end, a rear end, a left side, and a right side of a base plate may define a pair of threaded openings in a set of threaded openings. In another exemplary embodiment, a front end, a rear end, a left side, and a right side of a base plate may define at least two threaded openings in a set of threaded openings. Such use of the set of threaded openings 50 is described in more detail below.

Referring now to FIG. 2, the base plate 10 defines a set of threaded passageways 52. Each threaded passageway of the set of threaded passageways 52 is substantially smaller than the central opening 32. Each threaded passageway of the threaded passageways 52 also extends entirely through the base plate 10 from the top surface 30E to the bottom surface 30F relative to the vertical axis "Z." A first threaded passageway 52A of the set of threaded passageways 52 is defined proximate to the left side 30C and between the rear end 30B and the groove 44. A second threaded passageway 52B of the set of threaded passageways 52 is defined proximate to the right side 30D and between the front end 30A and the groove. Such use of the set of threaded passageways 52 is described in more detail below.

Referring to FIG. 1, each guide column 12A, 12B of the pair of guide columns 12 operably engages with one of the first and second extensions 46, 48 of the base plate 10. The guide columns 12A, 12B are substantially similar to one another and are engaged with the one of the first extension 46 and second extension 48 in the same orientation. Inasmuch as the guide columns 12 are substantially similar, the following description will relate to the first guide column 12A. It should be understood, however, that the description of the first guide column 12A applies substantially equal to the second guide column 12B.

Figure 4:
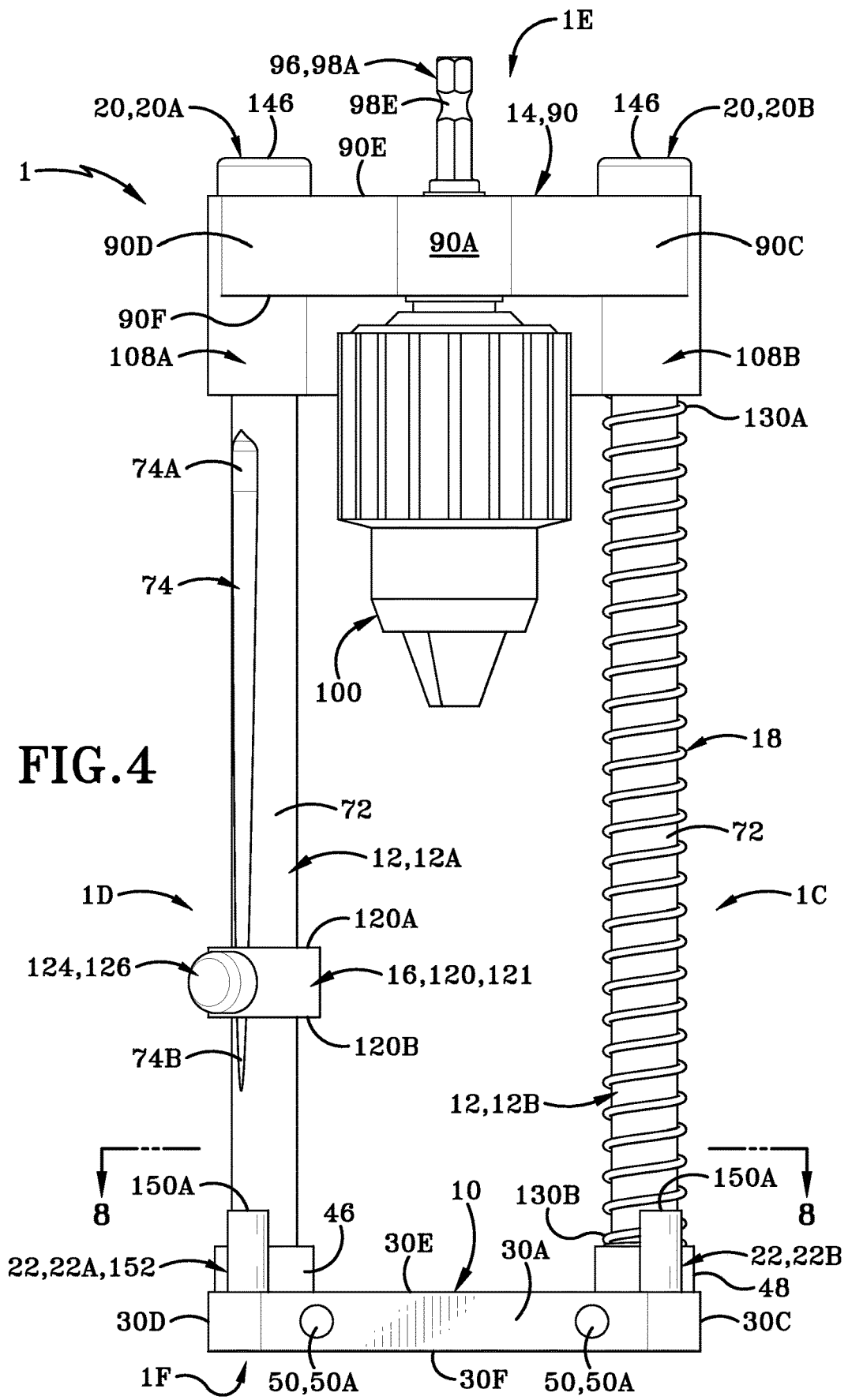
FIG. 4 is a front elevation view of the drill guide of FIG. 2, wherein the chuck carrier is provided in a first position.
Figure 10:
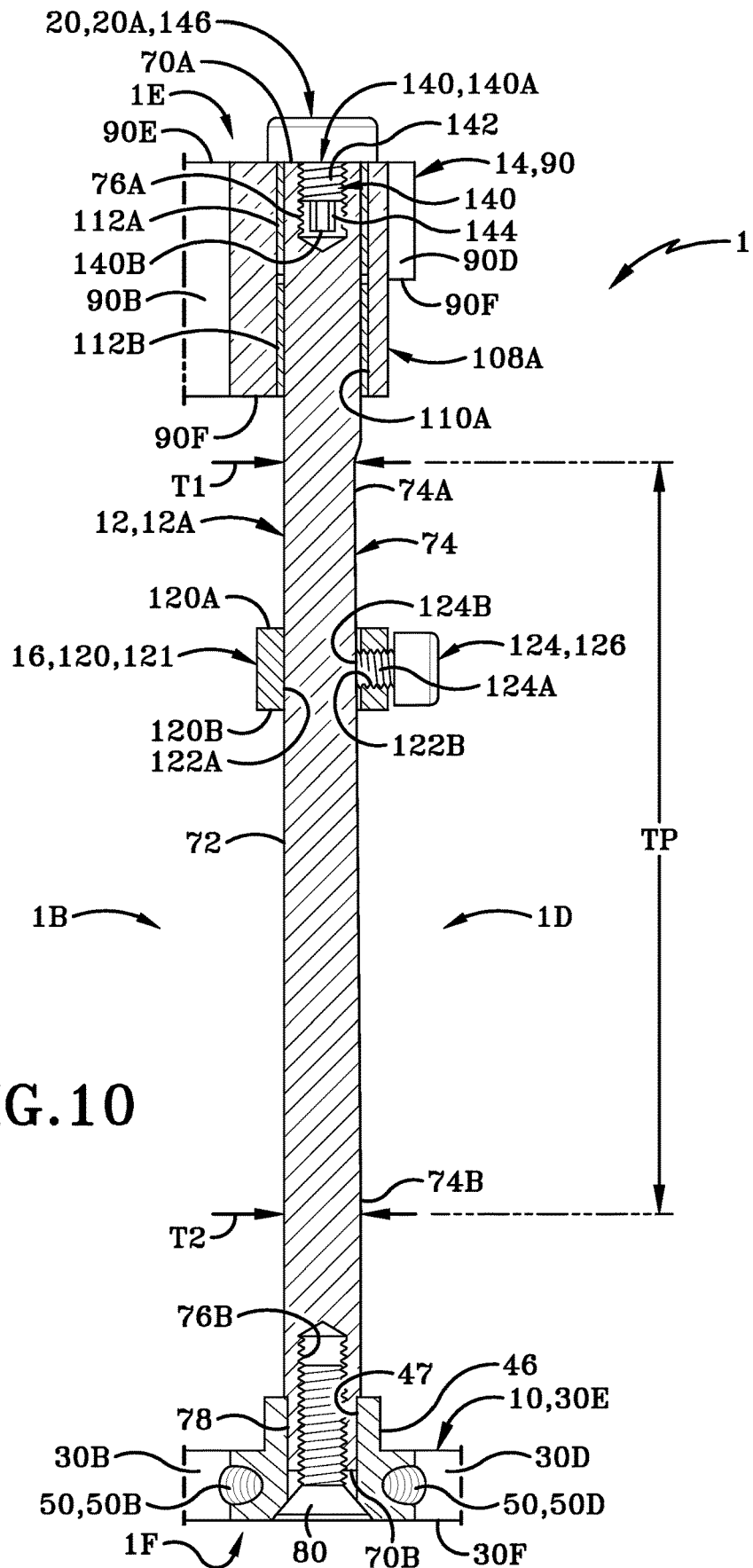
FIG. 10 is a longitudinal cross-section of the drill guide taken in the direction of line 10-10 of FIG. 2.

Referring to FIG. 10, the first guide column 12A has a top end or first end 70A, a bottom end or second end 70B that opposes the top end 70A, and a longitudinal axis that extends from the top end 70A to the bottom end 70B. The first guide column 12A also has an outer surface 72 that is disposed circumferentially about the longitudinal axis of the first guide column 12A between the top end 70A and the bottom end 70B. In the illustrated embodiment, the first guide column 12A also defines a tapered portion 74 that laterally extends into the first guide column 12A orthogonal to the longitudinal axis "X" of drill guide 1. The tapered portion 74 is a flattened surface that extends along the first guide column 12A orthogonal to the longitudinal axis "X" of drill guide 1. The tapered portion 74 has a first end 74A proximate to the top end 70A of the first guide column 12A, an opposed second end 74B proximate to the bottom end 70B of the first guide column 12A, and a length "TS" that is measured from the first end 74A to the second end 74B. In addition, the tapered portion 74 defines a first diameter "$T_1$" at the first end 74A of the tapered portion and a second diameter "$T_2$" at the second end 74B of the tapered portion 74. The length "TS" of the tapered portion is less than the overall length of the first guide column 12A measured from the top end 70A of the first guide column 12A to the bottom end 70B of the first guide column 12A. As illustrated in FIGS. 4 and 10, the tapered portion 74 tapers in diameter from the second end 74B to the first end 74A where the second diameter "$T_2$" of the first guide column 12A proximate to the second end 74B of the tapered portion 74 is greater than the first diameter $T_1$" of the first guide column 12A proximate to the first end 74A of the tapered portion 74. In the illustrated embodiment, the first guide column 12A of the pair of guide columns is the only guide rod that has a tapered portion. In one exemplary embodiment, a first guide column and a second guide column may have a tapered portion. Such use of the tapered portion 74 of the first guide column 12A is described in more detail below.

Still referring to FIG. 10, the first guide column 12A has a first threaded passage 76A and a second threaded passage 76B. The first threaded passage 76A extends downwardly from the top end 70A of the first guide column 12A towards the bottom end 70B of the first guide column 12A relative to the longitudinal axis of the first guide column 12. As described later herein, the first threaded passage 76A operably engages the first guide column 12A to the chuck carrier 14. The second threaded passage 76B extends upwardly from the bottom end 70B of the first guide column 12A towards the top end 70A of the first guide column 12A relative to the longitudinal axis of the first guide column 12. The first guide column 12A also has a reduced portion 78 that extends from the bottom end 70B towards the top end 70A in which the reduced portion 78 has a smaller diameter than the rest of the first guide column 12A. The reduced portion 78 is sized and configured to be received by the passageway 47 of the first extension 46 where the first guide column 12A is operably engaged with the base plate 10. In addition, a fastener 80 further operably engages the first guide column 12A to the base plate 10 by operably fastening to the second threaded passage 76B of the first guide column 12A. Other suitable ways may be used to operably engage a first guide column to a base plate. Examples of operably engaging a first guide column to a base plate includes attaching, affixing, connecting, coupling, fastening, joining, linking, locking, mounting, press-fitting, securing, and other suitable ways of operably engaging a first guide column to a base plate.

Referring now to FIGS. 1 and 2, the chuck carrier 14 includes housing 90. The housing 90 has a front end 90A, a rear end 90B that opposes the front end 90A, and a longitudinal axis defined between the front end 90A and the rear end 90B. The housing 90 also includes a left side or first side 90C, a right side or second side 90D that opposes the left side 90C, and a transverse axis that is defined between the left side 90C and the right side 90D. The housing 90 also includes a top surface 90E, a bottom surface 90F that opposes the top surface 90E, and a vertical axis defined between the top surface 90E and the bottom surface 90F. As shown in FIG. 3, the housing 90 defines a front through-hole 92 that extends entirely through the housing 90 from the top surface 90E to the bottom surface 90F relative to the vertical axis of the housing 90.

Still referring to FIG. 3, chuck carrier 14 includes at least one ball bearing 94. In the illustrated embodiment, the chuck carrier 14 includes an upper ball bearing 94A and a lower ball bearing 94B. The upper ball bearing 94A is disposed inside of the front through-hole 92 and operably engages with the housing 90 inside of said front through-hole 92. In the illustrated embodiment, the upper ball bearing 94A is press-fitted into the housing 90 via the front through-hole 92. In other exemplary embodiments, any suitable engagement for maintaining an upper ball bearing inside of a housing may be used. The upper ball bearing 94A is disposed proximate to the top surface 90E of the housing 90 such that the upper ball bearing 94A is even with the top surface 90E of the housing 90 and fails to protrude outside of the front through-hole 92. The lower ball bearing 94B is also disposed inside of the front through-hole 92 and operably engages with the housing 90 inside of said first through-hole 92. In the illustrated embodiment, the lower ball bearing 94B is press-fitted into the housing 90 via the front through-hole 92. In other exemplary embodiments, any suitable engagement for maintaining a lower ball bearing inside of a housing may be used. The lower ball bearing 94B is disposed proximate to the bottom surface 90F of the housing 90 such that the lower ball bearing 94B is even with the bottom surface 90F of the housing 90 and fails to protrude outside of the front through-hole 92. In the illustrated embodiment, the upper ball bearing 94A is disposed above the lower ball bearing 94B relative to the vertical axis of the housing 90.

Still referring to FIG. 3, the chuck carrier 14 also includes a hex bit 96 that has a top or first end 96A and an opposed bottom or second end 96B. A hex portion 98A of the hex bit 96 defined from the first end 96A to the top surface 90E of the housing 90 is disposed exterior to the front through-hole 92. As described in more detail herein, the hex portion 98A allows a portable power drill to operably engage with the hex bit 96. A blanked portion 98B of the hex bit 96 defined between the top surface 90E of the housing 90 to the bottom surface 90F of the housing 90 operably engages with the upper ball bearing 94A and the lower ball bearing 94B inside of the front through-hole 92. The mechanical engagement between the hex bit 96 and the upper ball bearing 94A and lower ball bearing 94B allows the upper ball bearing 94A and lower ball bearing 94B to support rotational movement of the hex bit 96 during a drilling operation. In other words, the upper ball bearing 94A and lower ball bearing 94B allows the hex bit 96 to freely rotate inside of the front through-hole 92 without any interruption caused by the housing 90. A shoulder 98C of the hex bit 96 is defined between the blanked portion 98B and a threaded portion 98D that prevents the hex bit 96 from backing out from the housing 90 once the hex bit 96 is assembled to the housing 90. The hex bit 96 also has threaded portion 98D that is defined between the shoulder 98C and the second end 96B of the hex bit 96. The use of the threaded portion 98D of the hex bit 96 is described in more detail below. The hex bit 96 also defines a threaded opening 99 that extends upwardly from the second end 96B of the hex bit 96 towards the first end 96A of hex bit 96 where the threaded opening 99 is defined inside of the threaded portion 98D, the shoulder 98C, and a portion of the blanked portion 98B.

Still referring to FIG. 3, the hex bit 96 also defines an annular concave groove 98E. The annular concave groove 98E that extends between the hex portion 98A and the blanked portion 98B on the hex bit 96. As described in more detail herein, the annular concave groove 98E may allow a portable drill that includes a quick release to operably engage with the hex bit 96 during a drilling operation. Such types of portable drills are described in more detail below.

Still referring to FIG. 3, the chuck carrier 14 also includes a drill chuck 100. The drill chuck 100 defines a threaded channel 101 that operably engages the hex bit 96 with the drill chuck 100. In the illustrated embodiment, the threaded portion 98D of the hex bit 96 operably fastens to the threaded channel 101 of the drill chuck 100. In addition, a connector 102 passes through a non-threaded channel 103 defined by the drill chuck 100 and operably fastens the drill chuck 100 to the hex bit 96. Upon assembly, the hex bit 96 and the drill chuck 100 may collectively rotate together during a drilling operation via a rotational force exerted by a portable power drill, which is described in more detail below.

Figure 9:
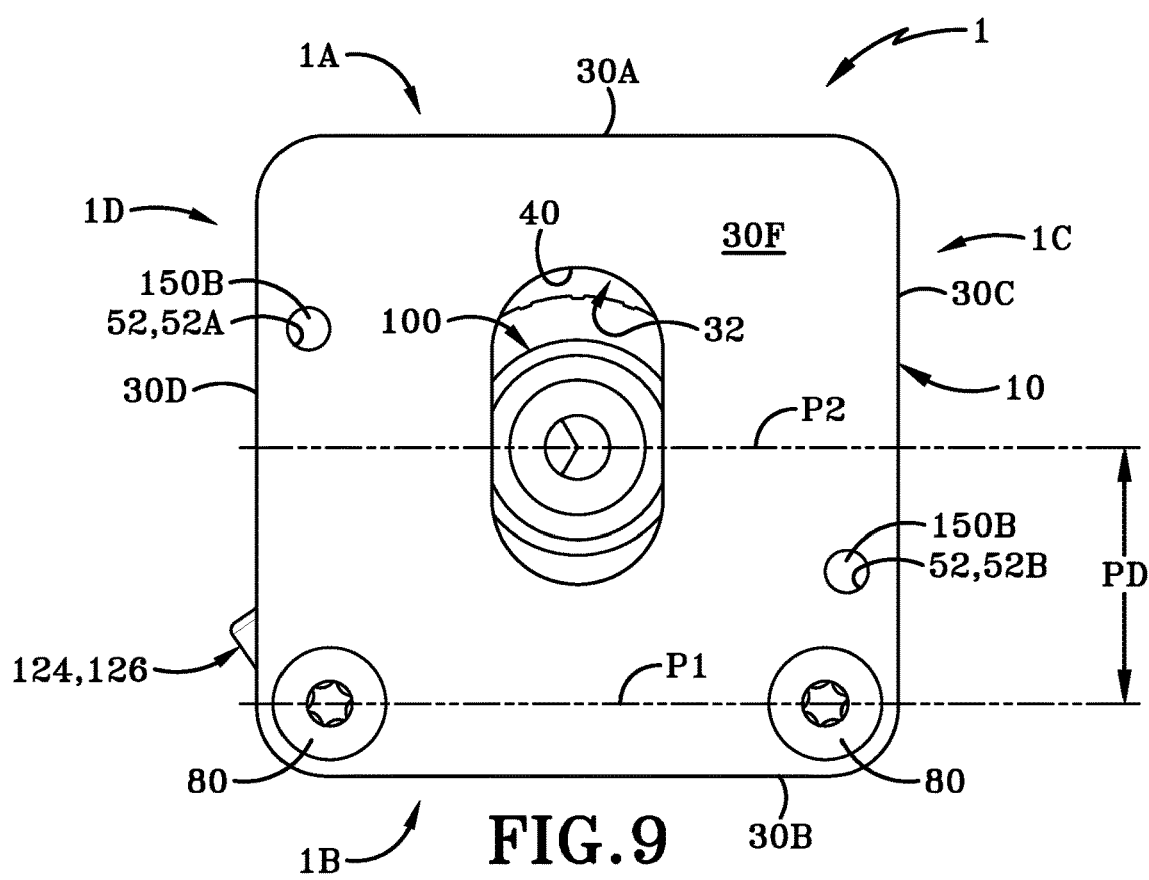
FIG. 9 is a bottom plan view of the drill guide, wherein the chuck carrier is provided in the first position.
Figure 22:
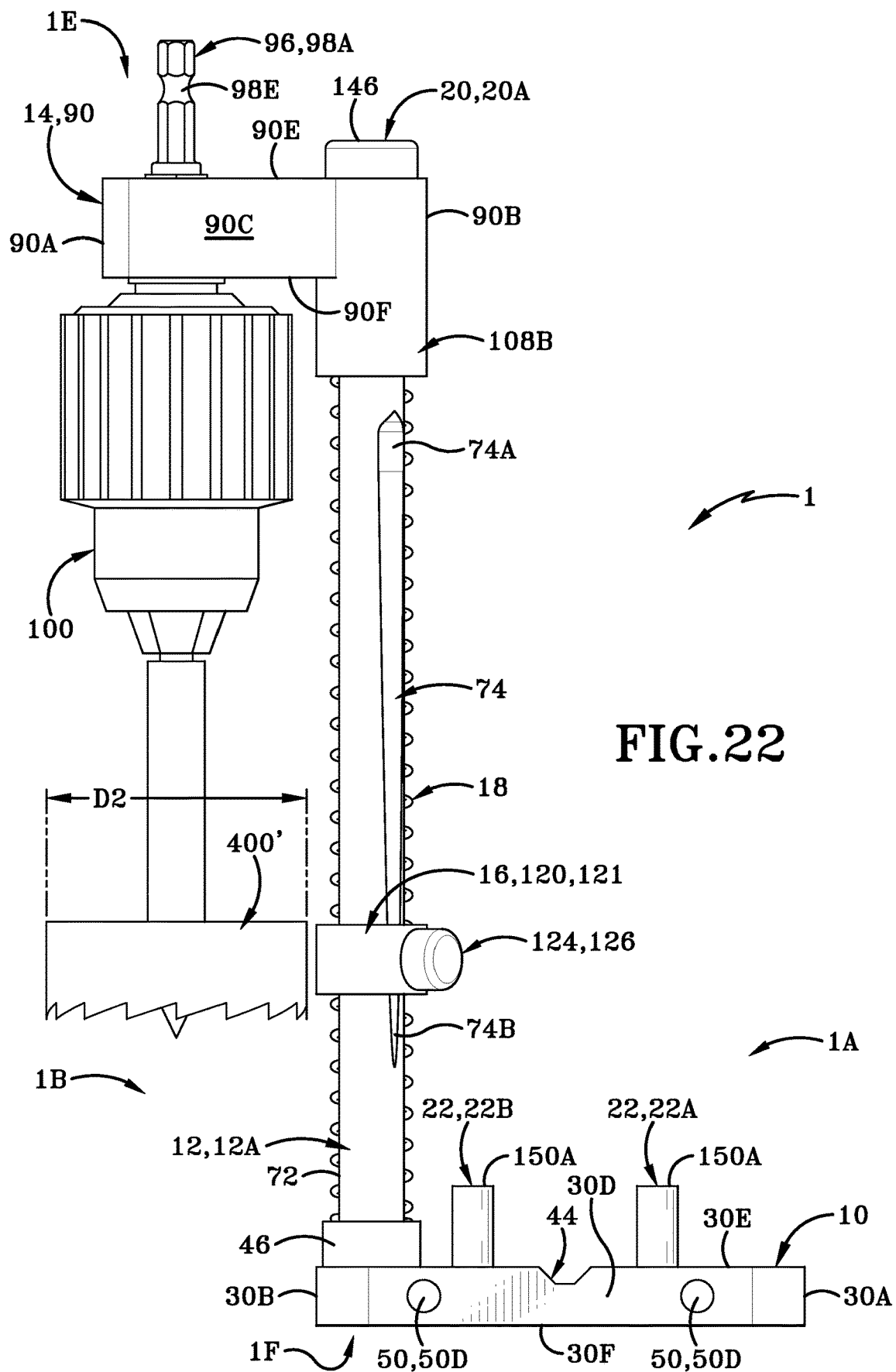
FIG. 22 is a right side elevation view of the drill guide similar to FIG. 6, but the chuck carrier is provided in a second position.

In the illustrated embodiment, the drill chuck 100 is offset from the first and second columns 12A, 12B of the drill guide 1 in which the drill chuck 100 and the first and second columns 12A, 12B are positioned in different planes relative to the transverse axis "Y" of the drill guide 1. As illustrated in FIG. 9, the first and second guide columns 12A, 12B are positioned in common plane where the first and second guide columns 12A, 12B are positioned in a first plane "$P_1$" that extends between the left and right sides 1C, 1D of the drill guide 1 parallel with the transverse axis "Y". Still referring to FIG. 9, the drill chuck 100 is positioned in a second, different plane "$P_2$" that extends between the left and right sides 1C, 1D of the drill guide 1 parallel with the transverse axis "Y". However, the second plane "$P_2$" is offset from the first plane "$P_1$" relative to the longitudinal axis "X" of the drill guide 1 at a distance "PD". Such offset of the drill chuck 100 relative to the first and second guide columns 12A, 12B allows the woodworker to orient that drill chuck 100 and the chuck carrier 14 from a first orientation (FIG. 1) to a second different orientation (FIG. 22). Such first and second orientation for the drill chuck 100 and the chuck carrier 14 is described in more detail below.

The chuck carrier 14 may include any suitable drill chuck 100 in the drill guide 1. In the illustrated embodiment, the chuck carrier 14 uses a keyless drill chuck for the drill chuck 100 on the drill guide 1. In another exemplary embodiment, a chuck carrier may include a keyed drill chuck for a drill chuck on a drill guide.

Still referring to FIG. 3, a retaining ring 104 is operably engaged to the blanked portion 98B of the hex bit 96. The retaining ring 104 directly abuts the top surface 90E of the housing 90 to provide a suitable support between the hex bit 96 and the housing 90 for holding and maintaining the position of the hex bit 96 inside of the housing 90. In addition, a curved washer 106 is operably engaged to the hex bit 96 and the housing 90 in which the curved washer 106 is provided between the shoulder 98C of the hex bit 96 and the bottom surface 90F of the housing. In this illustrated embodiment, the curved washer 106 provides a spring-like profile and/or structural configuration to absorb light mechanical loads for keeping the hex bit 96 and associated parts operably engaged to the hex bit 96 in place during operation.

Referring now to FIGS. 2A and 10, the housing 90 has a first protrusion 108A and a second protrusion 108B. The first protrusion 108A extends downwardly from the housing 90 away from the bottom surface 90F relative to the vertical axis of the chuck carrier 14 and towards the base plate 10. The first protrusion 108A is positioned proximate to the rear end 90B and the right side 90D. The first protrusion 108A defines a first rear through-hole 110A that extends entirely through the chuck carrier 14 and the first protrusion 108A from the top surface 90E to the bottom surface 90F relative to the vertical axis of the chuck carrier 14. The second protrusion 108B extends downwardly from the housing 90 away from the bottom surface 90F relative to the vertical axis of the chuck carrier 14 and towards the base plate 10. The second protrusion 108B is positioned proximate to the rear end 90B and the left side 90C. The second protrusion 108B defines a second rear through-hole 110B that extends entirely through the chuck carrier 14 and the second protrusion 108B from the top surface 90E to the bottom surface 90F relative to the vertical axis of the chuck carrier 14.

Referring to FIG. 10, an upper bushing 112A and a lower busing 112B are provided inside each of the first rear through-hole 110A and the second rear through-hole 110B. Since both the upper bushing 112A and the lower bushing 112B are arranged identically in the first protrusion 108A and the second protrusion 108B, the structural arrangement of the upper bushing 112A and the lower bushing 112B inside of the first rear through-hole 110A of the first protrusion 108A will be described. It should be understood that while the structural arrangement of the upper bushing 112A and the lower bushing 112B inside of the first rear through-hole 110A of the first protrusion 108A is being described, such description is applied identically to the upper bushing 112A and the lower bushing 112B inside of the second rear through-hole 110B of the second protrusion 108B.

As shown in FIG. 10, the upper bushing 112A is disposed inside of the first rear through-hole 110A and operably engages the housing 90 inside of said first rear through-hole 110A. In the illustrated embodiment, the upper bushing 112A is press-fitted into the first protrusion 108A of the housing 90 via the first rear through-hole 110A. In other exemplary embodiments, any suitable engagement for maintaining an upper bushing inside of a first protrusion of a housing may be used. The upper bushing 112A is disposed proximate to the top surface 90E of the housing 90 such that the upper bushing 112A is even with the top surface 90E of the housing 90 and fails to protrude outside of the first rear through-hole 110A. Still referring to FIG. 10, the lower bushing 112B is disposed inside of the first rear through-hole 110A and operably engages the housing 90 inside of said first rear through-hole 110A. In the illustrated embodiment, the lower bushing 112B is press-fitted into the first protrusion 108A of the housing 90 via the first rear through-hole 110A. In other exemplary embodiments, any suitable engagement for maintaining a lower bushing inside of a first protrusion of a housing may be used. The lower bushing 112B is disposed proximate to the bottom surface 90F of the housing 90 such that the lower bushing 112B is even with the bottom surface 90F of the housing 90 and fails to protrude outside of the first rear through-hole 110A. In the illustrated embodiment, the upper ball bushing 112A is disposed above the lower bushing 112B relative to the vertical axis of the housing 90.

Still referring to FIG. 10, the upper bushing 112A and the lower bushing 112B operably engage to the outer surface 72 of the first guide column 12A inside of the first rear through-hole 110A. Similarly, the upper bushing 112A and the lower bushing 112B operably engage to the outer surface 72 of the second guide column 12B inside of the second rear through-hole 110B. The use of the upper bushing 112A and the lower bushing 112B being positioned between each guide rod 12A, 12B and the chuck carrier 14 is considered advantageous at least because the upper bushing 112A and the lower bushing 112B allow the chuck carrier 14 to freely move along the outer surfaces 72 of the guide columns 12A, 12B for plunging a drilling bit into a workpiece, which is described in more detail below. In addition, the upper bushing 112A and the lower bushing 112B being positioned between each guide rod 12A, 12B and the chuck carrier 14 may be formed of any suitable material. In one exemplary embodiment, an upper bushing and a lower bushing positioned between guide rods and a chuck carrier may be formed of a polymer material. In another exemplary embodiment, an upper bushing and a lower bushing positioned between guide rods and a chuck carrier may be formed of Teflon™.

Referring now to FIGS. 1, 2, and 10, a depth stopper 16 is provided on the first guide column 12A. The depth stopper 16 has a collar 120 that defines a top surface 120A and an opposed bottom surface 120B joined by a circumferential wall 121. The collar 120 also defines a longitudinal axis between the top surface 120A and the bottom surface 120B. The depth stopper 16 also defines a central opening 122A that extends entirely through the collar 120 from the top surface 120A to the bottom surface 120B relative to longitudinal axis of the collar 120. The central opening 122A is sized and configured to receive and house a portion of the first guide portion 12A. As illustrated in FIG. 10, the depth stopper 16 also defines a threaded side opening 122B disposed between the top surface 120A and the bottom surface 120B and extends entirely through circumferential wall 121. In this illustrated embodiment, the threaded side opening 122B is in fluid communication with the central opening 122A. Such use of the threaded side opening 122B is described in more detail below.

In addition, a depth stopper 16 includes a fastener 124. The fastener 124 has a threaded shaft 124A that is sized and configured to operably engage with the threaded side opening 122B of the collar 120. In other words, the threaded shaft 124A operably threads to the threaded side opening 122B of the collar 120. The fastener 124 also includes an engaging end 124B that operably engages with the tapered portion 74 of the first guide column 12A. The fastener 124 also includes a knob 126 that is provided on the threaded shaft 124A. The knob 126 allows a woodworker to tighten and/or loosen the fastener 124 for maintaining and/or moving the position of the collar 120 on the first guide column 12A. When the fastener 124 is tightened to the first guide column 12A, the threaded shaft 124A extends through the threaded side opening 122B and into the central opening 122A to allow the engaging end 124B of the fastener 124 to operably engage the tapered portion 74 of the first guide column 12A (see FIG. 10). The structural configuration between the fastener 124 of the depth stopper 16 and the tapered portion 74 of the first guide column 12A is considered advantageous at least because the tapered portion 74 provides a self-tightening mechanism between the depth stopper 16 and the first guide rod 12A. The self-tightening mechanism provided by the tapered portion 74 to the fastener 124 occurs because the tapered portion 74 keeps reducing as the tapered portion 74 progresses to the bottom end 70B of the first guide column 12A. In other words, the diameter of the tapered portion 74 proximate to the top end 70A of the first guide column 12A is less than the diameter proximate to the bottom end 70B of the first guide column 12A. When the fastener 124 is loosened from the first guide column 12A, the threaded shaft 124A backs into the threaded side opening 122B and away from the central opening 122A to allow the collar 120 to freely move along the tapered portion 74 and the outer surface 72 of the first guide column 12A.

The depth stopper 16 is considered advantageous at least because the depth stopper 16 limits the downward travel of the chuck carrier 14 and all associated components on the chuck carrier 14 at a specific location of the tapered portion 74 on the first guide rod 12A. With the inclusion of the tapered portion 74, the depth stopper 16 remains at the desired location along the first guide column 12A even when the chuck carrier 14 is exerted against the depth stopper 16 (via the woodworker) due to the self-tightening mechanism between the depth stopper 16 and the first guide column 12A. In other words, the fastener 124 operably engaged with the collar 120 fails to move downwardly due to the tapered portion 74 preventing the fastener 124 from sliding and/or moving down the first guide column 12A during one or more contacts with the chuck carrier 14 during a drilling operation.

Figure 7:
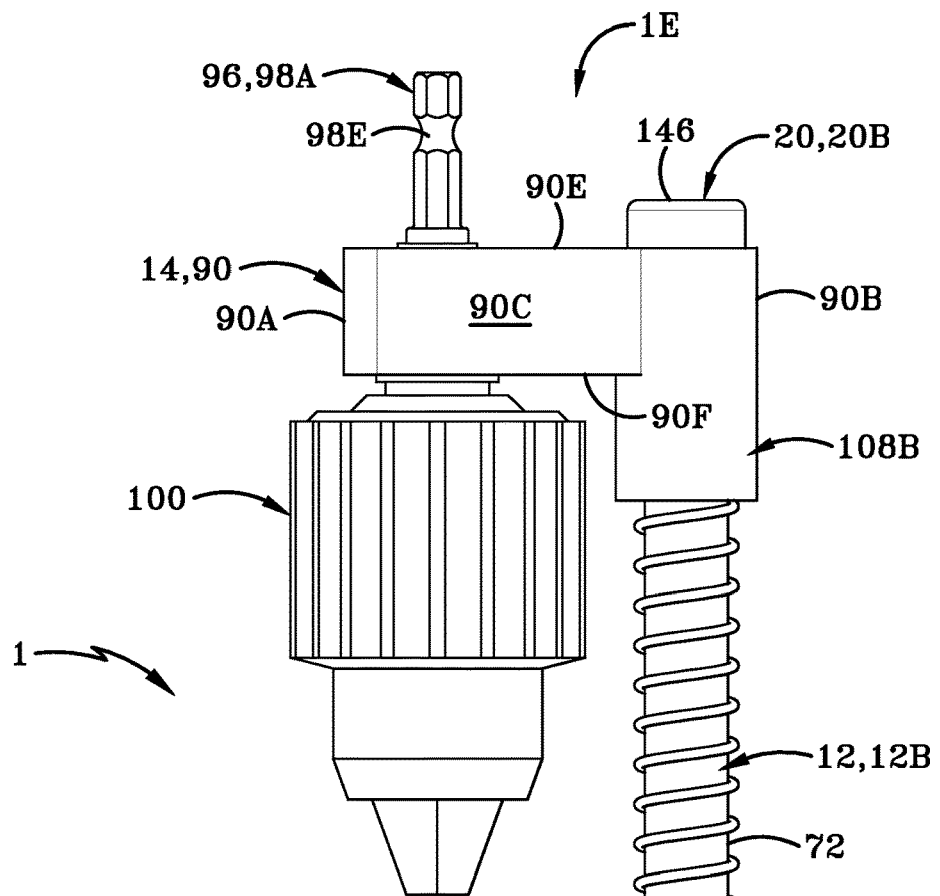
FIG. 7 is a left side elevation view of the drill guide of FIG. 2, wherein the chuck carrier is provided in the first position.

Referring now to FIGS. 1, 4, 5, and 7, the biaser 18 has a top end or first end 130A, an opposed bottom end or second end 130B, and a longitudinal axis that extends between the top end 130A to the bottom end 130B. In the illustrated embodiment, the biaser 18 is circumferentially disposed about the second guide column 12B. As illustrated in FIG. 5, the top end 130A of the biaser 18 operably engages the lower surface of the second protrusion 108B on the chuck carrier 14 in which the top end 130A of the biaser 18 directly abuts the lower surface of the second protrusion 108B on the chuck carrier 14. As illustrated in FIGS. 5 and 7, the bottom end 130B of the biaser 18 operably engages the second extension 48 of the base plate 10. In other words, the bottom end 130B of the biaser 18 directly abuts a top surface of the second extension 48 of the base plate 10. In the illustrated embodiment, the biaser 18 is configured to bias the chuck carrier 14, and associated components provided on the chuck carrier 14, towards the top end 1E of the drill guide 1 and away from the base plate 10 relative to the vertical axis "Z." In the illustrated embodiment, the biaser 18 is a compression spring that is configured to oppose compression and return to its uncompressed length when the applied force is removed. In another exemplary embodiment, any suitable type of biaser may be used to bias a chuck carrier, and associated components provided on the chuck carrier, towards a top end of a drill guide and away from a base plate of the drill guide relative to a vertical axis of the drill guide.

The biaser 18 is considered advantageous at least because the biaser 18 assists a woodworker in moving the chuck carrier 14 and associated components provided on the chuck carrier 14 away from a workpiece after drilling a hole in said workpiece. In other words, the biaser 18 returns the chuck carrier 14 and associated components provided on the chuck carrier 14 to its original, pre-drilling position without the woodworker exerting a force on the drill guide 1 to move the chuck carrier 14.

Referring to FIGS. 1 and 2, at least one locking knob 20 is provided in the drill guide 1. In the illustrated embodiment, the drill guide 1 provides a first locking knob 20A and a second locking knob 20A that operably engage with one of the first guide column 12A and the second guide column 12B. The locking knobs 20A, 20B are substantially similar to one another and are engaged with one of the first guide column 12A and the second guide column 12B in the same orientation. Inasmuch as the locking knobs 20 are substantially similar, the following description will relate to the first locking knob 20A. It should be understood, however, that the description of the first locking knob 20A applies equally to the second locking knob 20B.

Referring to FIG. 2A, the first locking knob 20A includes a shaft 140 that has a first end 140A, an opposed second end 140B, and a longitudinal axis defined between the first end 140A and the second end 140B. The shaft 140 has a threaded portion 142 that extends from the first end 140A to a key portion 144 of the shaft 140. As shown in FIG. 10, the threaded portion 142 is sized and configured to operably engage with the first threaded passage 76A of the first guide column 12A. In other words, the threaded portion 142 is sized and configured to operably thread with the first threaded passage 76A of the first guide column 12A. The key portion 144 of the shaft 140 extends from the threaded portion 142 to the second end 140B of the shaft 140. As shown in FIG. 10, the key portion 144 is sized and configured to be received by the first threaded passage 76A such that the key portion 144 is housed inside of the first threaded passage 76A of the first guide column 12A. As described in more detail herein, the key portion 144 of the first locking knob 20 may operably engage with the centering pins 22, the fence assembly 200, and flip lock assembly 300. Such engagement is described in more detail below. Referring to FIG. 2A, a knob 146 is provided at the first end 140A of the shaft 140 for allowing a woodworker to tighten and/or loosen the first locking knob 20A from and/or to the first guide column 12A and to manipulate the first locking knob 20A when needed. As illustrated in FIG. 10, the engagement between the first locking knob 20A and the first guide column 12A limits the travel of the chuck carrier 14 when traveling away from the base plate 10 and towards the first end 70A of the first guide column 12A. The first locking knob 20A limits the travel of the chuck carrier 14 by having a lower surface of the knob 146 (proximate to the first end 140A of shaft 140) directly abutting the top surface 90E of the housing 90 while the first locking knob 20A is operably fastened to the first guide column 12A.

In the illustrated embodiment, the key portion 144 of the locking knobs 20 is hexagonal-shaped (e.g. Allen wrench style key). While the key portion 144 of the locking knobs 20 is hexagonal-shaped, any suitable shape or configuration for a key portion on a locking knob may be used. Examples of suitable shapes or configuration for a key portion on a locking knob include flat style key, Philips style key, torx style key, square style key, star style key, and any other suitable shapes or configurations for a key portion on a locking knob for a particular embodiment.

Referring now to FIGS. 1 and 2, a pair of centering pins 22 is provided with the drill guide 1. In the illustrated embodiment, the drill guide 1 provides a first centering pin 22A and a second centering pin 22A that operably engage with one of the threaded passageways 52 defined on the base plate 10. The centering pins 22A, 22B are substantially similar to one another and are engaged with one of the threaded passageways 52 defined on the base plate 10 in the same orientation. Inasmuch as the centering pins 22 are substantially similar, the following description will relate to the second centering pin 22B. It should be understood, however, that the description of the first centering pin 22B applies equally to the first centering pin 22A.

Referring now to FIG. 2, the centering pin 22 includes a top end or first end 150A, an opposed bottom end or second end 150B, and a longitudinal axis that extends between the top end 150A to the bottom end 150B. In the illustrated embodiment, the first centering pin 22A includes a blanked portion 152 that extends from the top end 150A to a threaded portion 156. A passageway 154 is defined by the centering pin 22 inside of the blanked portion 152 and extends downwardly from the top end 150A towards the bottom end 150B relative to the longitudinal axis of the centering pin 22. A plurality of facets 155 are also defined inside of the passageway 154 in a specific arrangement. In the illustrated embodiment, the plurality of facets 155 are arranged in a hexagonal arrangement. In other exemplary embodiment, a plurality of facets provided in a first centering pin may include a single recessed line arrangement, a recessed cross shape arrangement, a recessed star with rounded points arrangement, a recessed square arrangement, a recessed star arrangement, and any other suitable arrangements for a plurality of facets provided in a first centering pin for a particular embodiment. As described in more detail herein, the plurality of facets 155 of the centering pin 22 is complementary to the key portion 144 of the locking knobs 20A, 20B for allowing one of the first locking knob 20A and the second locking knob 20B to manipulate the centering pin 22. Such manipulation by the locking knobs 20A, 20B to the centering pins 22A, 22B is described in more detail below.

Still referring to FIG. 2, the threaded portion 156 of the centering pin 22 extends from the blanked portion 152 to the bottom end 150B of the centering pin 22. The threaded portion 156 of the centering pin 22 may operably engage with one of the threaded passageways of the set of threaded passageways 52 defined on the base plate 10. As illustrated in FIGS. 1, 2, and 8, the first centering pin 22A operably engages with the first threaded passageway 52A on the base plate 10 and the second centering pin 22B operably engages with the second threaded passageway 52B on the base plate 10. As described in more detail herein, the first centering pin 22A may operably engage with one of the threaded passageways of the set of threaded passageways 52 at the top surface 30E of the base plate 10 (e.g., a stored position) and the bottom surface 30F of the base plate 10 (e.g., a centering position). Such engagement between the centering pins 22 and the set of threaded passageways 52 on either the top surface 30E of the base plate 10 or the bottom surface 30F of the base plate 10 is described in more detail below.

As illustrated in FIG. 1, the fence assembly 200 includes a fence 202, at least one thumb screw 204 operably engaged with the fence 202, and at least one guide rod 206 operably engaged with both the fence 202 and the at least one thumb screw 204. In the illustrated embodiment, the at least one guide rod 206 operably engages with base plate 10 of the drill guide 1 for operably engaging the fence 202 with the base plate 10 for a drilling operation. Such use of the fence assembly 200 with the drill guide 1 during a drilling operation is described in more detail below.

As illustrated in FIGS. 1 and 11, the fence 202 includes a plate 210. The plate includes a front end 210A, a rear end 210B that opposes the front end 210A, and a longitudinal axis that extends between the front end 210A and the rear end 210B. The fence 202 also includes a left side or first side 210C, a right side or second side 210D that opposes the left side 210D, and a transverse axis that extends between the left side 210C and the right side 210D. The fence 202 also includes a first top surface 210E, a bottom surface 210F that opposes the first top surface 210E, and vertical axis that extends between the first top surface 210E and the bottom surface 210F.

Still referring to FIGS. 1 and 11, the fence 202 includes a step 212. In the illustrated embodiment, the fence 202 and the step 212 is a unibody component that is integrally extruded, molded, printed, or additively manufactured, removably machined, or formed as a unitary, monolithic member substantially fabricated from a rigid, manmade, material. In one example, metal or metal alloys, such as stainless steel or aluminum alloy, may form a substantial majority of the components or elements used to fabricate the fence and the various components integrally formed, molded, or extruded therewith. The rigid fence should withstand typical woodworking handling from an operator pressing the fence against a piece of wood without damaging the fence. While it is contemplated that the fence 202 and its additional components described herein are uniformly and integrally extruded, molded, or formed, it is entirely possible that the components of the fence be formed separately from alternative materials as one having routine skill in the art would understand. Furthermore, while the components of the fence are discussed below individually, it is to be clearly understood that the components and their corresponding reference elements of the fence are portions, regions, or surfaces of the body and all form a respective element or component of the unitary tool body. Thus, while the components may be discussed individually and identified relative to other elements or components of the fence, in this exemplary embodiment, there is a single fence having the below described portions, regions, or surfaces.

Still referring to FIGS. 1 and 11, the step 212 is positioned proximate to the rear end 210B of the plate 210 and extends upwardly from the plate 210. The step 212 includes a front end 212A that is parallel with the front end 210A of the plate 210, a rear end 212B that is parallel with rear end 210B of the plate 210, and a longitudinal axis that is parallel with the longitudinal axis of the plate 210. The step 212 also includes a left side or first side 212C that is parallel with the left side 210C of plate 210, a right side or second side 212D that is parallel with the right side 210D of the plate 210, and a transverse axis that is parallel with the transverse axis of the plate 210. The step 212 also includes a second upper surface 212E that is parallel with the first top surface 210E of the plate 210. In the illustrated embodiment, each of the front surface 212A, the rear surface 212B, left side 212C, right side 212D, and second top surface 212 is disposed above the front surface 210A, the rear surface 210B, left side 210C, right side 210D, and first top surface 210E relative to the vertical axis of the plate 210.

Referring to FIGS. 11 and 12, the step 212 defines a first set of passageways 214A that extends entirely through the step 212 from the front end 212A to the rear end 212B relative to the longitudinal axis of the step 212. The step 212 also defines a second set of passageways 214B that extends entirely through the step 212 and the plate 210 from the second upper surface 212E of the step 212 to the bottom surface 210F of the plate 210. In the illustrated embodiment, the first set of passageways 214A and the second set of passageways 214B are defined orthogonally to one another and are in fluid communication with one another. In one example, a first passageway 214A1 of the first set of passageways 214A is defined perpendicular to a first passageway 214B1 of the second set of passageways 214B where the first passageways 214A1, 214B1 are in fluid communication with one another. As described in more detail herein, the at least one guide rod 206 may operably engage with fence 202 via one of the first set of passageways 214A and the second set of passageways 214B. Such engagement between the fence 202 and the at least one guide rod 206 is described in more detail below.

Still referring to FIGS. 11 and 12, the step 212 also defines a set of threaded passageways 216 that extends into the step 212. As illustrated in FIG. 12, a first threaded passageway 216A of the set of threaded passageways 216 extends from the right side 212C of the step 212 and into the step 212 relative to the transverse axis of the step 212. In the illustrated embodiment, the first threaded passageway 216A is perpendicular to the first passageways 214A1, 214B1 and in fluid communication with said first passageways 214A1, 214B1. The second threaded passageway (not illustrated) extends from the right side 212C of the step 212 and into the step 212 relative to the transverse axis of the step 212. The second threaded passageway is also perpendicular to second passageways 214A2, 214B2 of the first and second sets of passageways 214A, 214B and in fluid communication with said second passageways 214A2, 214B2.

Referring now to FIG. 11, the at least one thumb screw 204 includes a first thumb screw 204A and a second thumb screw 204B that operably engage the one of the threaded passageways of the set of threaded passageways 216 of the fence 202. The thumb screws 204A, 204B are substantially similar to one another and are engaged with one of the threaded passageways 216 on the fence 202 in the same orientation. Inasmuch as the thumbs screws 204 are substantially similar, the following description will relate to the second thumb screw 204B. It should be understood, however, that the description of the second thumb screw 204B applies equally to the first thumb screw 204A.

Still referring to FIG. 11, the thumb screw 204 includes a shaft 220. The shaft 220 has a first end 220A, an opposed second end 220B, and a longitudinal axis that extends from the first end 220A to the second end 220B. The shaft 220 includes a threaded portion 222 that extends from the first end 220A to a blanked portion 224 of the shaft 220. The threaded portion 222 operably engages with one of the threaded passageways 216A, 216B of the set of threaded passageways 216 to maintain the thumb screw 204 inside of the fence 202 (seen in FIG. 1). The blanked portion 224 of the shaft 220 extends from the threaded portion 222 to the second end 220B of the shaft 220. As described in more detail herein, the blanked portion 224 operably engages with the at least one fence guide rod 206 when the at least one fence guide rod 206 operably engages the fence 202. In addition, a knob 226 is provided at the first end 220A of the shaft 220 for allowing a woodworker to tighten and/or loosen the thumb screw 204 from the fence 202. Such manipulation of the thumb screw 204 during a drilling operation is described in more detail below.

Figure 13:
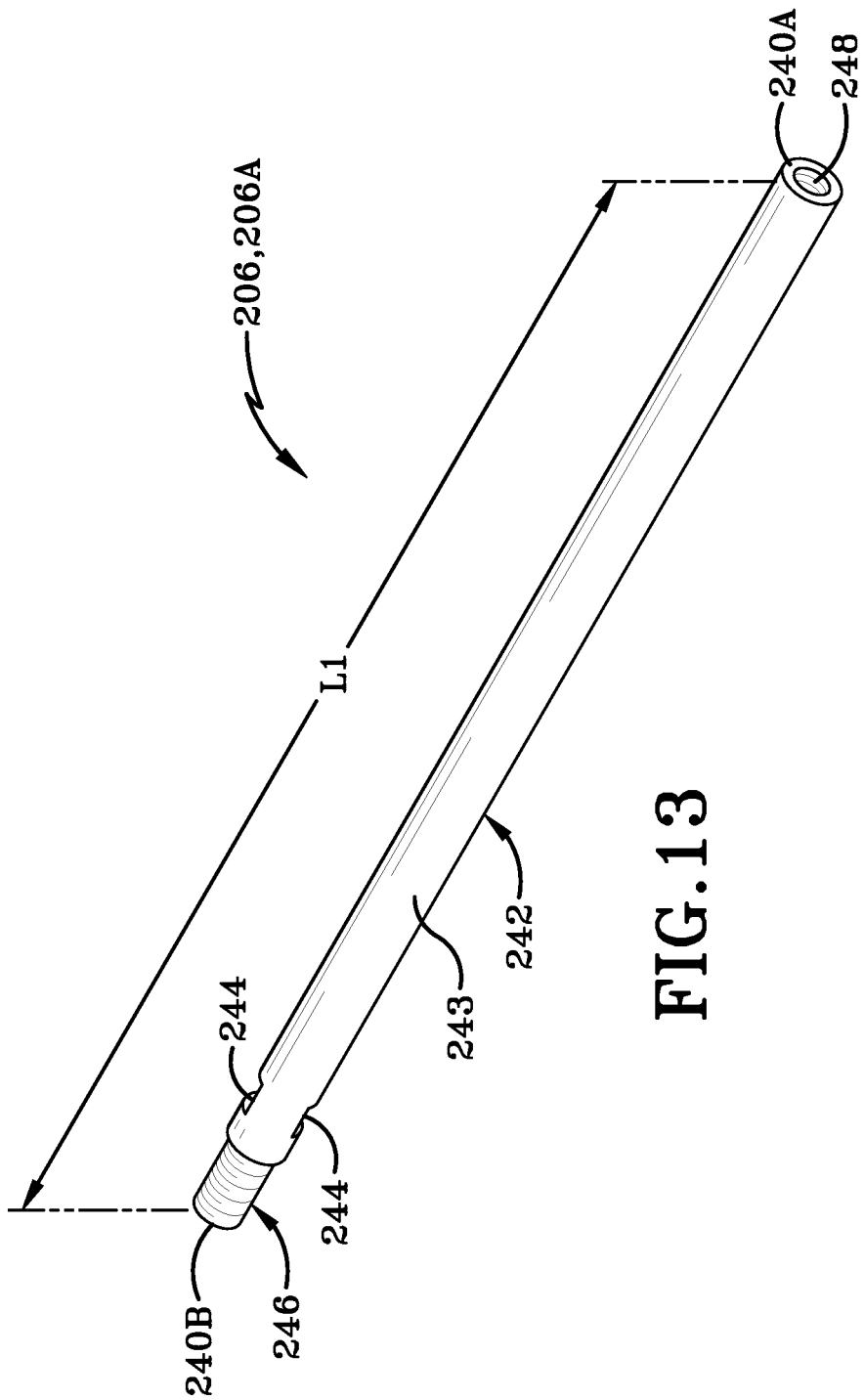
FIG. 13 is a top, front, right isometric perspective view of a guide rod of the fence assembly.

Referring now to FIG. 13, the fence assembly 200 includes the at least one guide rod 206. In the illustrated embodiment, the at least one guide rod 206 includes a first guide rod 206A and a second guide rod 206B that operably engage with the fence 202 inside of one of the passageways of the first set of passageways 214A or one of the passageways of the second set of passageways 214B. The first guide rod 206A and the second guide rod 206B are substantially similar to one another and are engaged with one of the passageways of the first set of passageways 214A or one of the passageways of the second set of passageways 214B in the same orientation. Inasmuch as the guide rods 206 are substantially similar, the following description will relate to the first guide rod 206A. It should be understood, however, that the description of the first guide rod 206A applies equally to the second guide rod 206B.

Still referring to FIG. 13, the first guide rod 206A has a front end or first end 240A, an opposed rear end or second end 240B, and a length "L1" that is measured from the front end 240A to the rear end 240B. The first guide rod 206A has a blanked portion 242 that extends from the front end 240A to a threaded portion 246. The first guide rod 206A defines a set of notches 244 that extends from an outer surface 243 of the blanked portion 230 and into the first guide rod 206A orthogonally to the longitudinal axis of the first guide rod 206A. As described later herein, the set of notches 244 are sized and configured to receive a tool (e.g., an open-ended wrench and tools of the like) for further tightening and/or loosening the first guide rod 206A to the base plate 10. The threaded portion 246 of the first guide rod 206A extends from the blanked portion 242 to the rear end 240B of the first guide rod 206A. The threaded portion 246 is sized and configured to operably engage with one of the threaded opening in the set of threaded openings 50 on the base plate 10. In other words, the threaded portion 246 operably threads to one of the threaded opening in the set of threaded openings 50 on the base plate 10. Such engagement between the guide rods 206A, 206B and the set of threaded openings 50A, 50B, 50C, and 50D is described in more detail below.

The first guide rod 206A also defines a threaded chamber 248 that extends from the first end 240A towards the second end 240B relative to the longitudinal axis of the first guide rod 206A. The threaded chamber 248 is sized and configured to receive one of the locking knobs 20A, 20B for further tightening or loosening the first guide rod 206A from the base plate 10. In other words, one of the locking knobs 20A, 20B may operably thread to the threaded chamber 248 of the first guide rod 206A for further tightening or loosening the first guide rod 206A from the base plate 10. Such engagement between the guide rods 206A, 206B and the locking knobs 20A, 20B is described in more detail below.

Figure 31A:
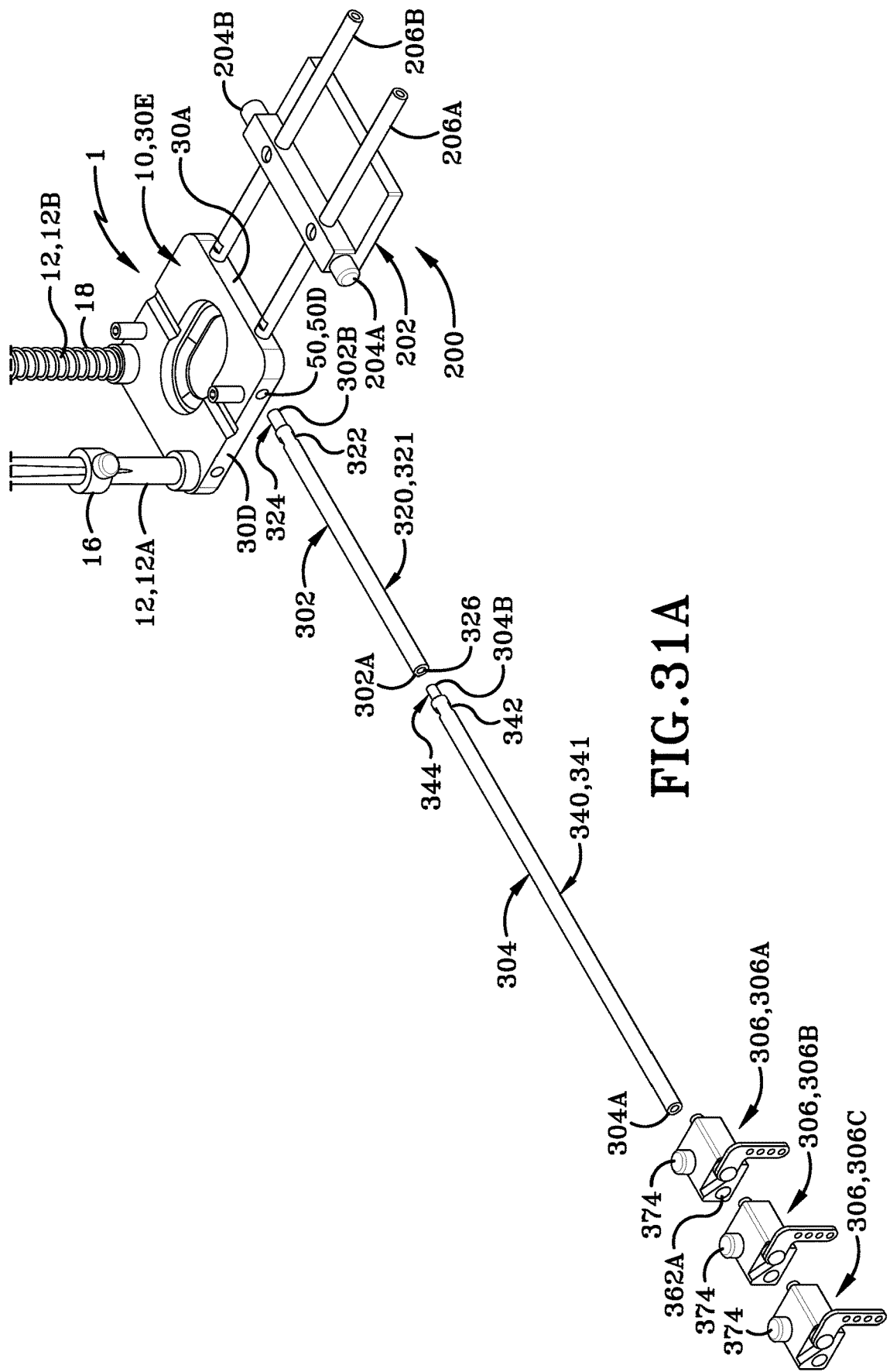
FIG. 31A is a partial exploded view of the flip stop assembly, wherein the fence assembly is operably engaged to the drill guide.
Figure 31B:
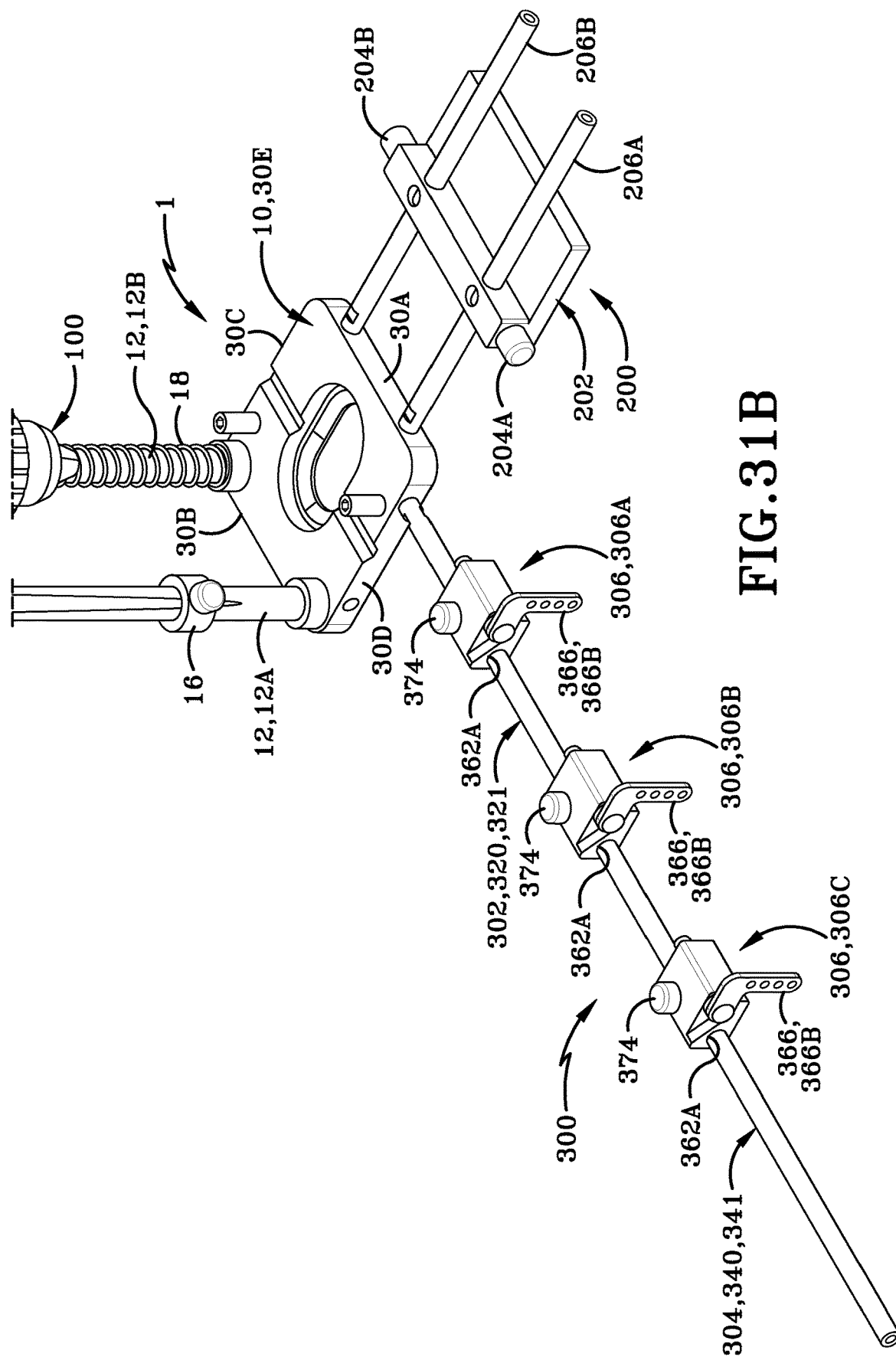
FIG. 31B is a partial top, front, right isometric perspective view of the flip stop assembly and the fence assembly operably engaged to the drill guide.

As illustrated in FIGS. 31A and 31B, the flip stop assembly 300 includes, at least one support rod 302 that may operably engage the base plate 10, at least one extension rod 304 that may operably engage with the at least one guide rod 304, and at least one flip stop 306 that may operably engage the at least one support rod 302 and the at least one extension rod 304. In the illustrated embodiment, the at least one support rod 302 operably engages with base plate 10 of the drill guide 1 for operably engaging the at least one flip stop 306 with the base plate 10 for a drilling operation. In one exemplary embodiment, at least one extension rod 304 may be operably engaged to the at least one guide rod 306 for extending the overall length of the flip stop assembly 300. Such use of the flip stop assembly 300 with the drill guide 1 during a drilling operation is described in more detail below.

Referring to FIG. 26, the flip stop assembly 300 includes the at least one support rod 302. In the illustrated embodiment, the at least one support rod 302 includes a single support rod 302 that operably engages with one of the threaded openings in the set of threaded openings 50. It should be understood, however, that the description of the support rod 302 applies equally to other guide rods that may be included in the flip stop assembly 300.

Still referring to FIG. 26, the support rod 302 has a front end or first end 302A, an opposed rear end or second end 302B, and a length "L2" that is measured from the front end 302A to the rear end 302B. The length "L2" of the support rod 302 and the second guide rod 320B is substantially equal to the length "L1" of the guide rods 206A, 206B of the fence assembly 200. In one exemplary embodiment, the support rod 302 of the flip stop assembly 300 may be substantially identical to the guide rod 206 of the fence assembly 200. In the illustrated embodiment, the support rod 302 has a blanked portion 320 that extends from the front end 302A to a threaded portion 324. The support rod 302 defines a set of notches 322 that extends from an outer surface 321 of the blanked portion 320 and into the support rod 302. As described later herein, the set of notches 322 are sized and configured to receive a tool (e.g., an open-ended wrench and tools of the like) for further tightening and/or loosening the support rod 302 to the base plate 10. The threaded portion 324 of the support rod 302 extends from the blanked portion 320 to the rear end 302B of the support rod 302. The threaded portion 324 is sized and configured to operably engage with one of the threaded opening in the set of threaded openings 50 on the base plate 10. In other words, the threaded portion 324 operably threads to one of the threaded opening in the set of threaded openings 50 on the base plate 10. Such engagement between the support rod 302 and the set of threaded openings 50A, 50B, 50C, and 50D is described in more detail below.

The support rod 302 also defines a threaded chamber 326 that extends from the first end 302A towards the second end 302B relative to the longitudinal axis of the support rod 302. The threaded chamber 326 is sized and configured to receive one of the locking knobs 20A, 20B for further tightening or loosening the support rod 302 from the base plate 10. In other words, one of the locking knobs 20A, 20B may operably thread to the threaded chamber 326 of the support rod 302 for further tightening or loosening the support rod 302 from the base plate 10. Such engagement between the support rod 302 and the locking knobs 20A, 20B is described in more detail below.

The flip stop assembly 300 includes the at least one extension rod 304. In the illustrated embodiment, the at least one extension rod 304 includes a single extension rod 304 that operably engages with support rod 302 for further expanding the overall length of the flip stop assembly 300. It should be understood, however, that the description of the extension rod 304 applies equally to other expansion rods that may be included in the flip stop assembly 300 for further expanding the length of the flip stop assembly 300.

Still referring to FIG. 27, the extension rod 304 has a front end or first end 304A, an opposed rear end or second end 304B, and a length "L3" that is measured from the front end 304A to the rear end 302B. The length "L3" of the extension rod 304 is greater than the length "L1" of the guide rods 206A, 206B of the fence assembly 200 and the length "L2" of the support rod 302 of the flip stop assembly 300. The extension rod 304 has a blanked portion 340 that extends from the front end 304A to a threaded portion 344. The extension rod 304 defines a set of notches 342 that extends from an outer surface 341 of the blanked portion 340 and into the extension rod 304. As described later herein, the set of notches 342 are sized and configured to receive a tool (e.g, an open-ended wrench and tools of the like) for further tightening and/or loosening the extension rod 304 to the support rod 302 in the flip stop assembly 300. The threaded portion 344 of the extension rod 304 extends from the blanked portion 340 to the rear end 304B of the extension rod 304. The threaded portion 344 is sized and configured to operably engage with the threaded chamber 326 of the support rod 302 to further expand the length of the flip stop assembly 300. In other words, the threaded portion 344 operably threads to the threaded chamber 326 of the support rod 302 to further expand the length of the flip stop assembly 300. Such engagement between the expansion rod 304 and the support rod 302 is described in more detail below.

The expansion rod 304 also defines a threaded chamber 346 that extends from the first end 304A towards the second end 304B. The threaded chamber 346 is sized and configured to receive one of the locking knobs 20A, 20B for further tightening the expansion rod 304 to the support rod 302 or loosening the expansion rod 304 from the support rod 302. In other words, one of the locking knobs 20A, 20B may operably thread to the threaded chamber 346 of the expansion rod 304 for further tightening the expansion rod 304 to the support rod 302 or loosening the expansion rod 304 from the support rod 302. Such engagement between the expansion rod 304 and the locking knobs 20A, 20B is described in more detail below.

As illustrated in FIGS. 31A-32D, the flip stop assembly 300 includes the at least one flip stop 306. In one exemplary embodiment, the at least one flip stop 306 may include a single flip stop 306 (see FIGS. 32A-32B) that operably engages with support rod 302 and/or an expansion rod 304 during a drilling operation. In another exemplary embodiment, the at least one flip stop 306 may include a plurality of flip stop 306 (e.g., flip stops 306A, 306B, and 306C) (see FIGS. 31A-31B and 32C-32D) that operably engages with support rod 302 and/or an expansion rod 304 during a drilling operation. It should be understood, however, that the description of the flip stop 306 applies equally to other flip stops that may be included in the flip stop assembly 300.

Figure 28:
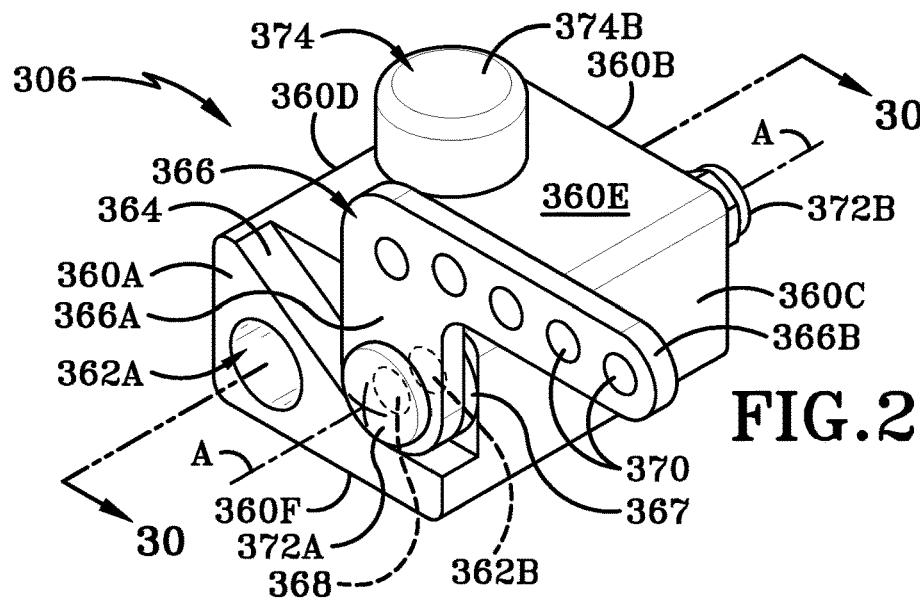
FIG. 28 is a top, front, right isometric perspective view of a flip stop of the flip stop assembly.
Figure 29:
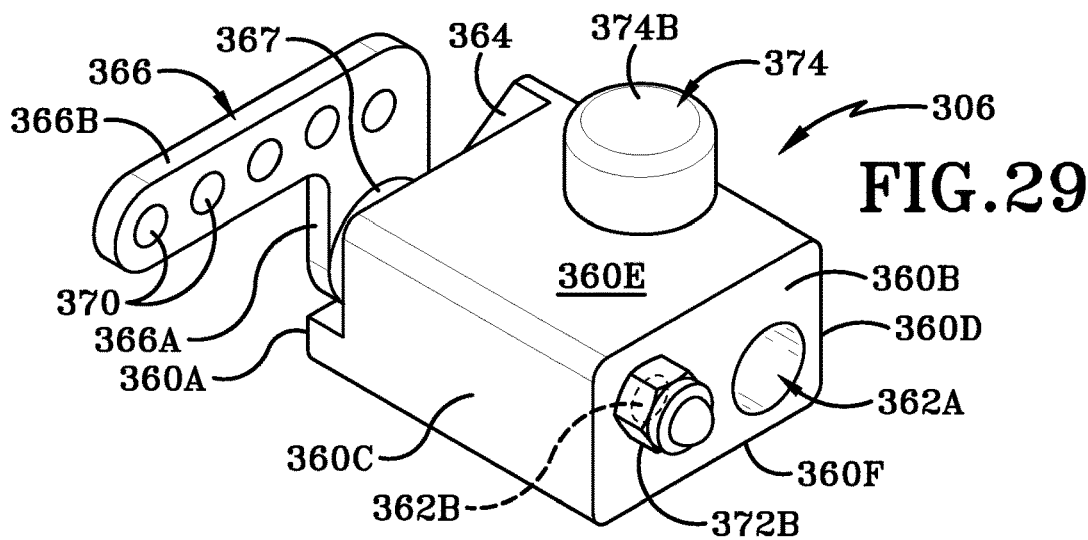
FIG. 29 is a top, rear, left isometric perspective view of the flip stop of the flip stop assembly in FIG. 28.
Figure 30:
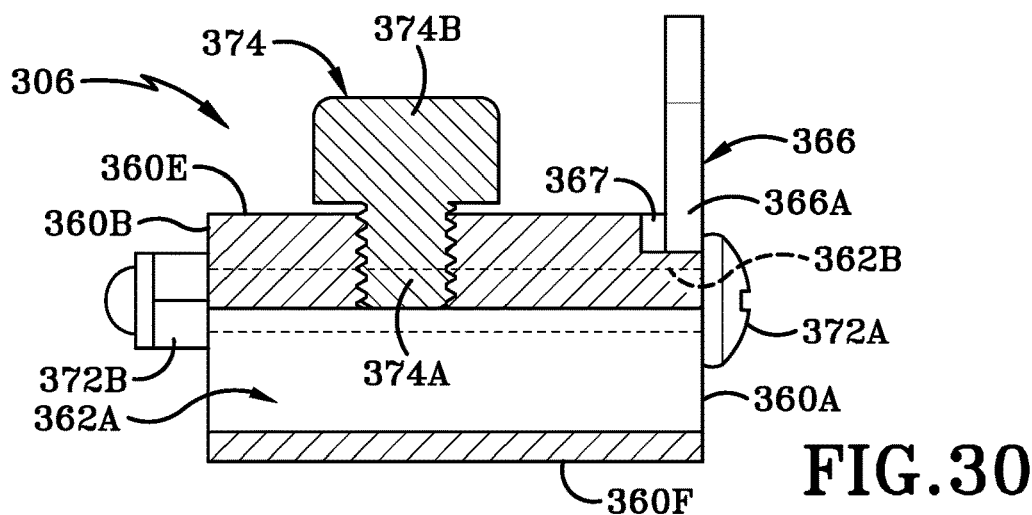
FIG. 30 is longitudinal cross-section of the flip stop taken in the direction of line 30-30 of FIG. 28.

Referring to FIGS. 28-30, the flip stop 306 includes a front end 360A, a rear end 360B that opposes the front end 360A, and a longitudinal axis that extends between the front end 360A and the rear end 360B. The flip stop 306 also includes a left side or first side 360C, a right side or second side 360D that opposes the left side 360C, and a transverse axis that extends between the left side 360C and the right side 360D. The flip stop 306 also includes a top end 360E, a bottom end 360F that opposes the top end 360E, and a vertical axis that extends between the top end 360E and the bottom end 360F.

In the illustrated embodiment, the flip stop 306 defines a first bore 362A that extends entirely through the flip stop 306 from the front end 360A to the rear end 360 relative to the longitudinal axis of the flip stop 306. As shown in FIGS. 28 and 29, the first bore 362A is disposed proximate to the right side 360D of the flip stop 306. As described in more detail below, the first bore 362A is sized and configured to receive and house a portion of the support rod 302 and/or the expansion rod 304 depending on the position of the flip stop 306 as desired by the woodworker during a drilling operation. The flip stop 306 also defines a second bore 362B that extends entirely through the flip stop 306 from the front end 360A to the rear end 360 relative to the longitudinal axis of the flip stop 306. As shown in FIGS. 28 and 29, the first bore 362A is disposed proximate to the left side 360C of the flip stop 306. The flip stop 306 also defines a threaded bore 362C that extends into the flip stop 306 from the top end 360A towards the first bore 362A relative to the vertical axis of the flip stop 306. As shown in FIG. 30, the threaded bore 362C is disposed proximate to the left side 360C of the flip stop 306 and is in fluid communication with the first bore 362A. The flip stop 306 also defines an incline 364 proximate to the front end 360A of the flip stop 306. The incline 364 is gradually sloped from the top end 360E of the flip stop 306 towards the bottom end 360F of the flip stop 306. The use of the incline 364 defined by the flip stop 306 is described in more detail below.

Still referring to FIGS. 28-30, the flip stop 306 also includes a stop arm 366. In the illustrated embodiment, the stop arm 366 defines an L-shaped configuration that has a first portion 366A joined to a second portion 366B in which the second portion 366B is orthogonal to the first position 366A. The first portion 366A of the stop arm 366 defines a main through-hole 368 that extends entirely through the stop arm 366 relative to a transverse axis of the stop arm 366. The second portion 366B of the stop arm 366 defines a plurality of through-holes 370 that extends entirely through the stop arm 266 relative to the transverse axis of the stop arm 366. The main through-hole 368 of the first portion 366A of the stop arm 366 is sized and configured to receive a fastener 372A for operably engaging the stop arm 366 to the flip stop 306. The fastener 372A is maintained in the flip stop via a nut 372B operably fastening to the fastener 372A. As shown in FIGS. 28 and 29, the stop arm 366 is oriented away from the flip stop 306 and is rotatable about the fastener 372A for operably engaging an end or end of a workpiece during a drilling operation. The fastener 372A defines an axis of rotation "A" along the length of the fastener 372A in which the stop arm 266 rotates about during a drilling operation. Such rotation and engagement of the stop arm 366 with a workpiece is provided in more detail below. The rotation of the stop arm 366 about the fastener 372A is also limited due to the incline 364 defined by the flip stop 306. The stop arm 366 in complementary is shape with the incline 364 defined by the flip stop 306.

In addition, the flip stop 306 may include a washer 367 positioned between the stop arm 366 and the front end 360A of the flip stop 306 proximate to the incline 364. The washer 367 may provide rotational support to the stop arm 366 to allow the stop arm 366 to freely rotate about the fastener 372A. In one exemplary embodiment, the washer 367 may be made from polymer and/or plastic material to allow for ease of rotation between the stop arm 366 and the flip stop 306.

Still referring to FIGS. 28-30, the flip stop 306 also includes a thumb screw 374. The thumb screw 374 has a threaded shaft 374A that operably engages with the threaded bore 362C of the flip stop 306 such that the thumb screw 374 operably threads to the flip stop 306. The thumb screw 374 also includes a knob 374B provided at one end of the threaded shaft 374A for allowing a woodworker to tighten or loosen the thumb screw 374 to the flip stop 306. The thumb screw 374 of the flip stop 306 operably maintains the flip stop 306 at a location along the support rod 302 or the extension rod 304 as desired by the woodworker during a drilling operation. As such, the thumb screw 374 operably engages an end of the threaded shaft 374A opposite to the knob 374B to the support rod 302 or the extension rod 304 for maintaining the flip stop 306 at a desired location.

Having described the structure of the drill guide 1 and the various components and connections thereof within drill guide 1, methods of use thereof will now be described.

Figure 14A:
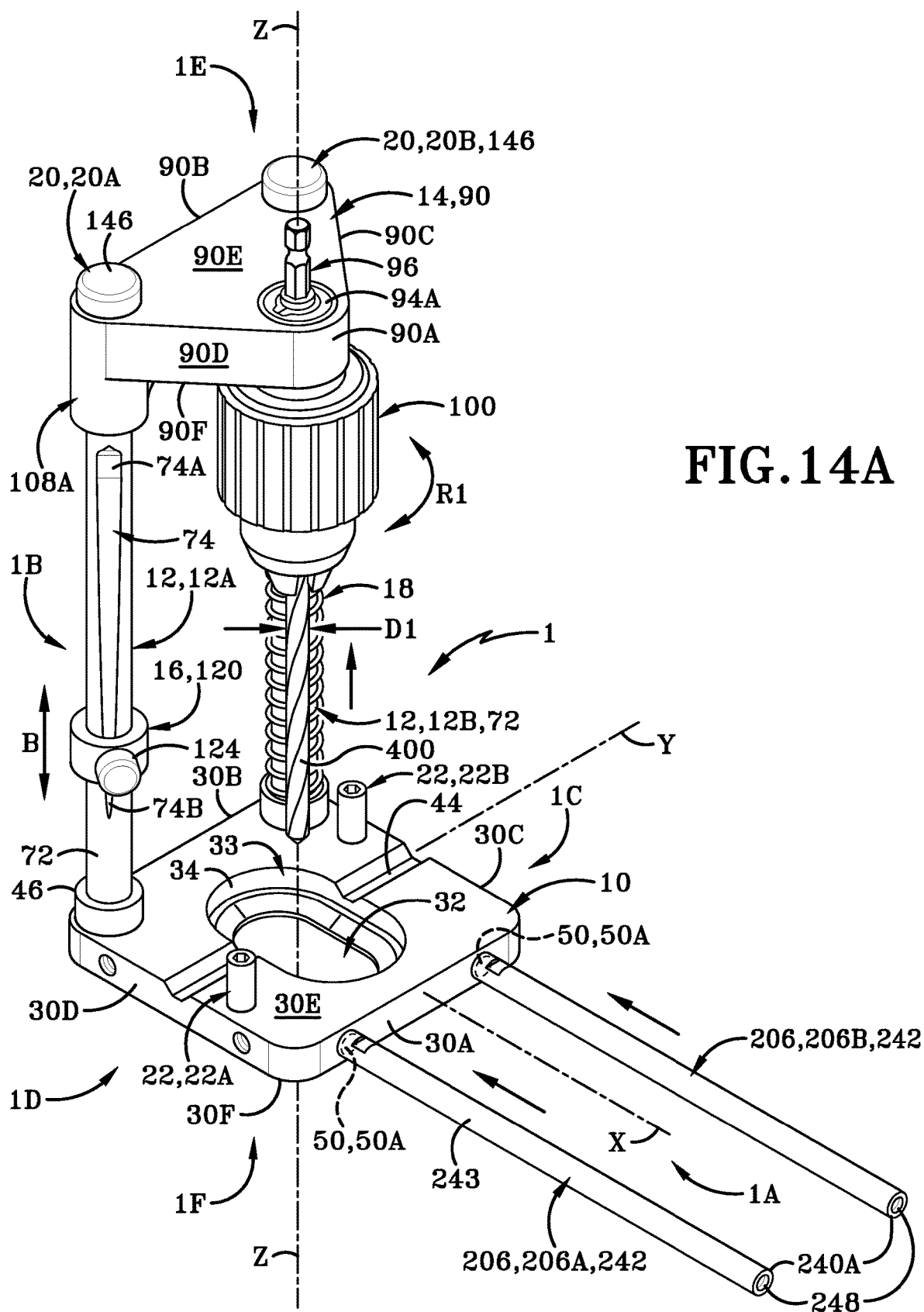
FIG. 14A is a top, front, right isometric perspective view of the drill guide resting on a workpiece, wherein a drilling bit is operatively engaged with the drill guide, and wherein first and second guide rods of the fence assembly are operably engaged with the drill guide.
Figure 14B:
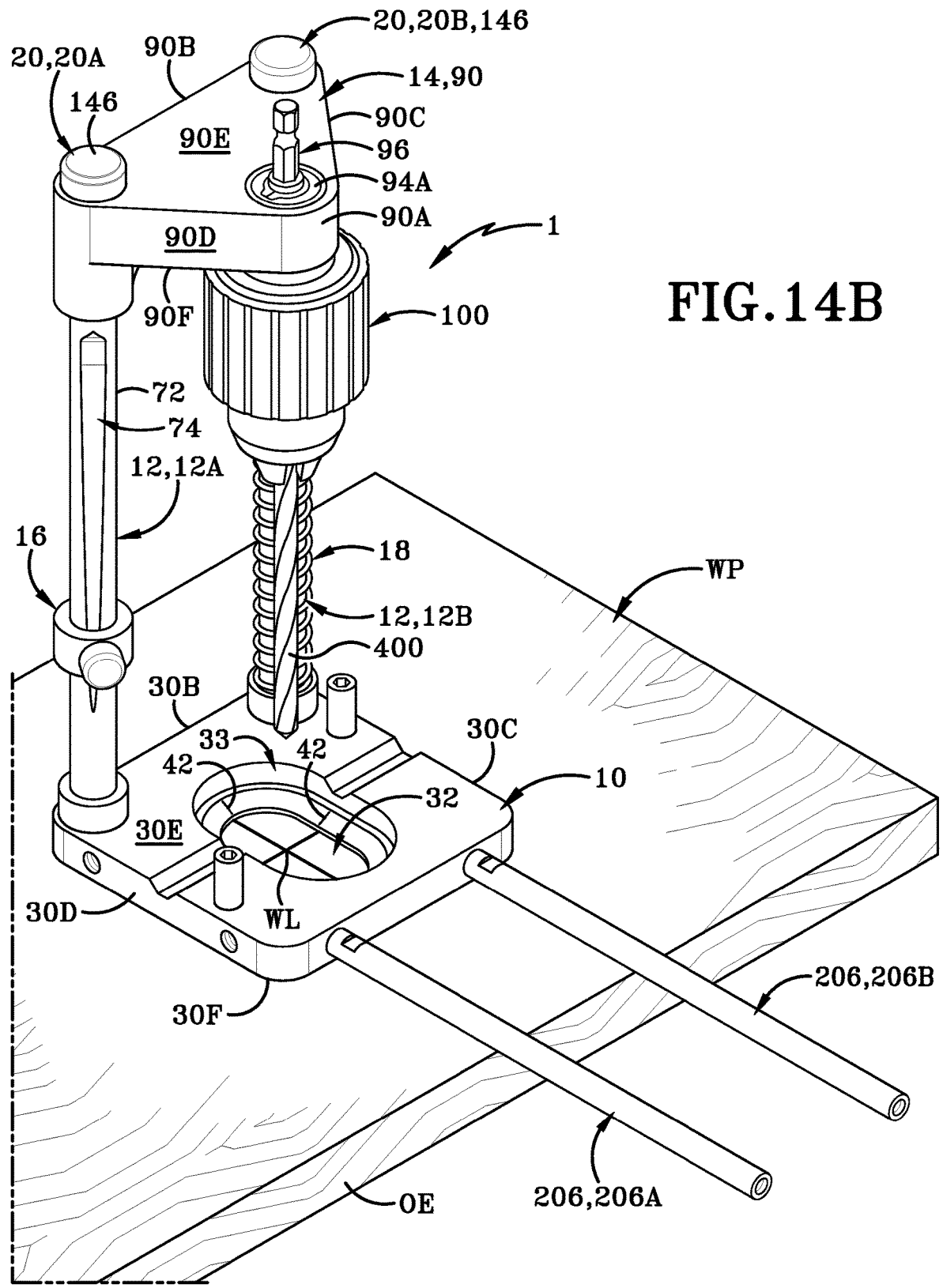
FIG. 14B is a top, front, right isometric perspective view similar to FIG. 14A showing the drill guide resting on the workpiece, wherein guide markers of the drill guide are aligned with a set of witness lines scribed on the workpiece.

Prior to using the drill guide 1 on a workpiece, a drilling bit must be provided on the drill guide 1. As illustrated in FIG. 14A, a woodworker may install a drilling bit 400 with a first diameter "D1" into the drill chuck 100 of the chuck carrier 14. In this configuration, the woodworker may select a drilling bit 400 that is equal to or less than one inch in diameter. The woodworker using the drill guide 1 would loosen the drill chuck 100 by applying a rotational force on the drill chuck 100 to expanded the chucks of the drill chuck 100 away from one another to define a suitable diameter that is complementary to the first diameter "D1" of the drilling bit 400. The rotational force applied to the drill chuck 100 is denoted by arrows labeled "R1." Once the drilling bit 400 is inserted into the drill chuck 100, the woodworker then applies an opposing rotational force "R1" on the drill chuck 100 to collapse the chucks of the drill chuck 100 towards one another to hold and maintain the drilling bit 400 with the drill chuck 100.

Prior to using the drill guide 1 on a workpiece, the woodworker may then select a suitable depth limit when plunging the drilling bit 400 into a workpiece via the depth stopper 16. Still referring to FIG. 14A, the woodworker may linearly move the depth stopper 16 along the tapered portion 74 of the first guide column 12A until the woodworker determines a suitable height for limiting the movement of the chuck carrier 14 and the plunging action of the drilling bit 400. The linear movement of the depth stopper 16 is denoted by arrows labeled "B". During linear movement of the depth stopper 16, the fastener 124 is disengaged from the tapered portion 74 of the first guide column 12A to allow the collar 120 to freely move along the first guide column 12A. Once the woodworker finds a suitable height for limiting the travel of the chuck carrier 14 and the plunging action of the drilling bit 400, the woodworker tightens the fastener 124 against the tapered portion 74 of the first guide column 12A to maintain the desired height of the depth stopper 16.

Prior to using the drill guide 1 on a workpiece, the woodworker may utilize the fence assembly 200 during a drilling operation. The woodworker may operably engage at least one guide rod 206 to the base plate 10. As illustrated in FIG. 14A, the woodworker may operably engage a first guide rod 206A and a second guide rod 206B to the base plate 10 via the set of threaded openings 50. In the illustrated embodiment, the first guide rod 206A and the second guide rod 206B operably thread into the first set of threaded openings 50A that is defined at the front end 30A of the base plate 10 via the woodworker apply a rotational force on each of the first guide rod 206A and the second guide rod 206B in the clockwise direction. In other exemplary embodiments, the woodworker may operably thread the first guide rod 206A and the second guide rod 206B into the second set of threaded openings 50B that is defined at the rear end 30B of the base plate 10, operably thread the first guide rod 206A and the second guide rod 206B into the third set of threaded openings 50C that is defined at the left side 30C of the base plate 10, or operably thread the first guide rod 206A and the second guide rod 206B into the fourth set of threaded openings 50D that is defined at the right side 30D of the base plate 10.

To further tighten the first guide rod 206A and the second guide rod 206B into the first set of threaded openings 50A, the woodworker may remove one of the locking knobs 20A, 20B from one of the guide columns 12A, 12B by applying a rotational force on one of the locking knobs 20A, 20B in a counter-clockwise direction. Once one of the locking knobs 20A, 20B is removed from one of the guide columns 12A, 12B, the woodworker may then insert the key portion 144 of the locking knob 20 into the threaded chamber 248 of the first guide rod 206A due to the key portion 144 and the threaded chamber 248 being complementary to one another. Once the locking knob 20 operably engages the first guide rod 206A, the woodworker may apply a rotational force to the locking knob 20 in the counter-clockwise direction to further tighten the first guide rod 206A into one of the threaded openings 50A provided on the front end 30A of the base plate 10. The woodworker may repeat the same tightening process to the second guide rod 206B. Once tightening of the first guide rod 206A and the second guide rod 206B are complete, the woodworker may operably engage the locking knob 20 back into the respective guide column 12 by applying a rotational force to the locking knob 20 in a clockwise direction until the locking knob 20 is secured inside of the respective guide column 12. The woodworker may also use a tool (e.g., open-ended wrench) to further tighten the first guide rod 206A and the second guide rod 206B into the first set of threaded openings 50A via the notches 246 on each of the first guide rode 206A and the second guide rod 206B.

Optionally, the woodworker may omit the action of setting the depth stopper 16 at a desired height relative to the base plate 10 if desired. Optionally, the woodworker may omit the fence assembly 200 from the drill guide 1 during a drilling operation if desired.

Prior to introducing the drill guide to a workpiece "WP", the woodworker scribes a set of witness lines "WL" at a desired location on the workpiece "WP" to locate the exact point for drilling a hole into the workpiece "WP." Once the set of witness lines "WL" are scribed on the workpiece "WP," the woodworker may then introduce the drill guide 1 to the workpiece "WP" and align the drill guide 1 with the set of witness lines "WL" on the workpiece "WP." The woodworker aligns the drill guide 1 with the set of witness lines "WL" by aligning the guide markers 42 of the base plate 10 with the set of witness lines "WL." Once aligned, the drilling bit 400 provided on the drill guide 1 is disposed directly above the location to drill a hole into the workpiece "WP."

Figure 14C:
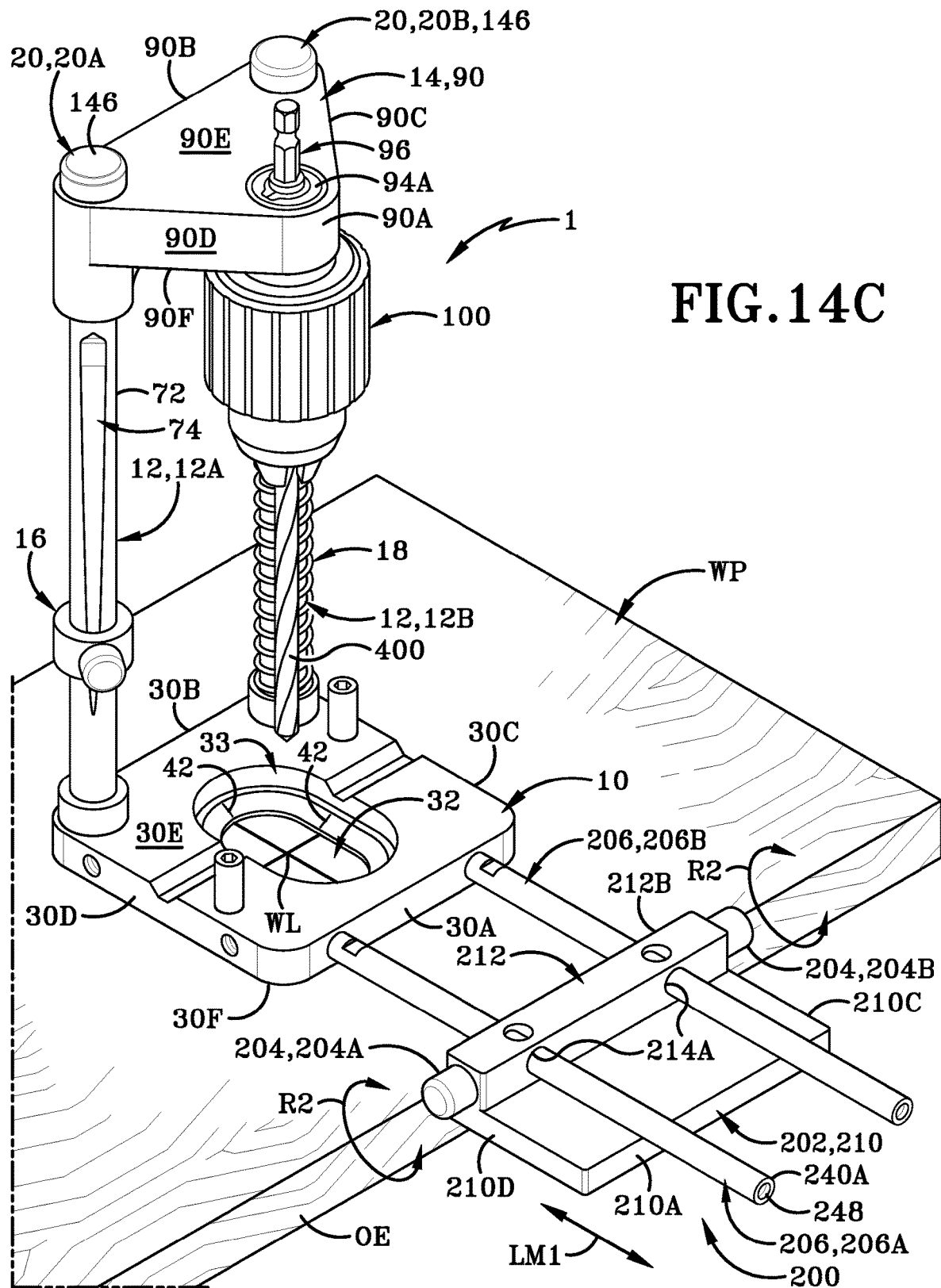
FIG. 14C is a top, front, right isometric perspective view similar to FIG. 14B showing the drill guide resting on the workpiece, wherein the fence is operably engaged with the first and second guide rods and a rear end of the fence abuts an outermost end of the workpiece.

Once the drill guide 1 and the drilling bit 400 are suitably aligned with the set of witness lines "WL" and above the drilling hole location, the woodworker may then complete assembly of the fence assembly 200. As illustrated in FIG. 14C, the woodworker may introduce the fence 202 to the first guide rod 206A and the second guide rod 206B in a first orientation relative to the base plate 10 by inserting the first guide rod 206A and the second guide rod 206B into one of the first set of passageways 214A and the second set of passageways 214B. Prior to engaging the fence 202 with the first and second guide rods 206A, 206B, the first and second thumb screws 204A, 204B are loosened from the fence 202 until the shafts 220 of the first and second thumbs screws 204A, 204B are completely disposed inside of the respective threaded passageway of the set of passageways 216 and away from the respective passageway of the first set of passageways 214A. As such, the woodworker may apply a rotational force on the knobs 226 of the first and second thumb screws 204A, 204B in a counter-clockwise direction to loosen the first and second thumbs screws 204A, 204B from the fence 202. The rotational force applied to the first and second thumb screws 204A, 204B is denoted by arrows labeled "R2". The woodworker may then introduce the fence 202 to the first and second guide rods 206A, 206B once the first and second thumb screws 204A, 204B are provided in a suitable position where the shafts 220 of the first and second thumbs screws are completely disposed inside of the respective threaded passageway of the set of passageways 216 and away from the respective passageway of the first set of passageways 214A.

Still referring to FIG. 14C, the woodworker inserts the first guide rod 206A and the second guide rod 206B through the first set of passageways 214A to operably engage the fence 202 to the base plate 10 in the first orientation. The woodworker linearly slides the fence 202 along the first guide rod 206A and the second guide rod 206B until the rear end 210B, 212B of the fence 202 directly abuts against an outermost end "OE" of the workpiece "WP" (also see FIG. 15). The linear movement of the fence 202 along the first guide rod 206A and the second guide rod 206B is denoted by arrows labeled "LM1." The woodworker may the apply a rotational force "R2" on the knobs 226 of the first and second thumb screws 204A, 204B in a clockwise direction to tighten the first and second thumbs screws 204A, 204B to the fence 202 and the first and second guide rods 206A, 206B to maintain the position of the fence 202 on the first and second guide rods 206A, 206B. As such, the first the second thumb screws 204A, 204B prevent linear movement of the fence 202 along the first and second guide rods 206A, 206B during the drilling operation. Furthermore, the woodworker may select the first orientation for the fence 202 in order to maximize the distance of the fence 202 relative to the drilling bit 400 when provided on the first and second guide rods 206A, 206B.

While not illustrated herein, a woodworker may use extension rods (such as extensions rods 304) to expand the distance of the fence 202 relative to the drilling bit 400 for a substantially larger workpiece that the workpiece "WP" illustrated herein. In one exemplary embodiment, a woodworker may install a set of extensions rods to a set of guide rods for maximizing the distance of a fence relative to a base plate at distance from about six and one-half inches up to about twelve inches. In another exemplary embodiment, a woodworker may install more than one set of extensions to a set of guide rods for maximizing the distance of a fence relative to a base plate at a distance up to about twelve inches per set of extension rods used during a drilling operation.

As illustrated in FIG. 15, the first and second top surfaces 210E, 212E of the fence 202 face in the same direction of the top surface 30E of the base plate 10 relative to the longitudinal axis "X" of the drill guide 1. In addition, the fence 202 is positioned away from the base plate 10 at a distance "$G_1$" that is measured from the drilling bit 400 to the rear end 2106 of the fence 202. In the illustrated orientation, the maximum distance "$G_1$" between the front end 30A of the base plate 10 to the rear end 2106 of the fence 202 is of about seven and three-quarter inches.

Figure 14D:
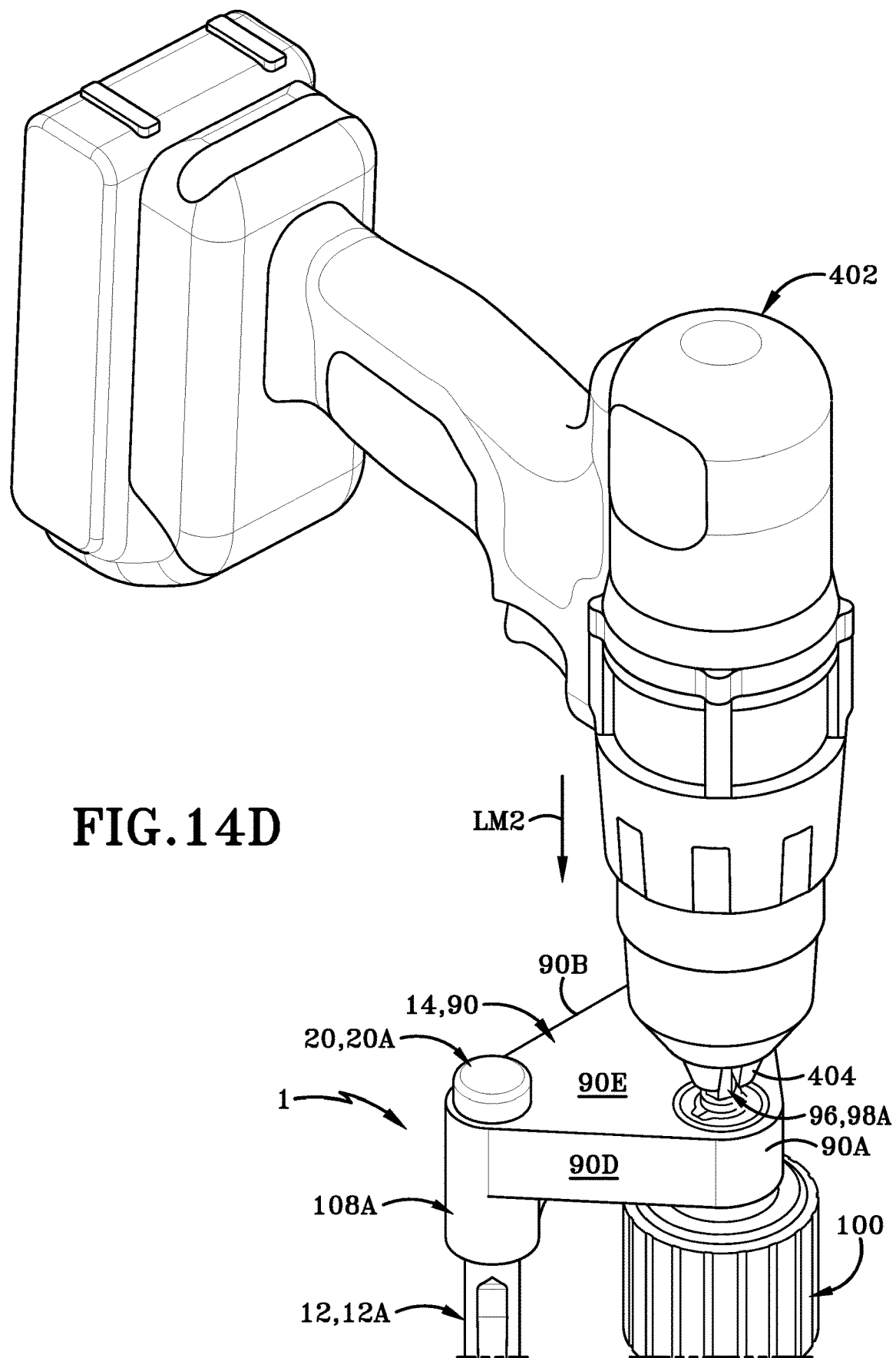
FIG. 14D is a top, front, right isometric perspective view similar to FIG. 14C but only showing a portable power drill operatively engaged to a hex bit of the chuck carrier of the drill guide.

Referring now to FIG. 14D, the woodworker may introduce a portable power drill 402 to the drill guide 1. Any and all hand drills, handheld drills, electric and battery-operated portable power drills contemplated for use with the drill guide disclosed herein will be referred to hereafter throughout this disclosure by the term "portable drill".

In the illustrated embodiment, the portable power drill 402 includes a drill chuck 404 that may operably engage with the hex bit 96 of the chuck carrier 14 of the drill guide 1. As shown in FIG. 14D, the woodworker linearly moves the drill chuck 404 of the portable power drill 402 to the chuck carrier 14 to operably engage the drill chuck 404 with the hex portion 98A of the hex bit 96. The linear movement exerted by the woodworker on the portable power drill 402 is denoted by an arrow labeled "LM2." Any suitable drill chuck provided on portable power drills may be operably engaged to the hex bit 96 of the drill guide 1. Examples of suitable drill chucks provided on portable power drills include keyed drill chucks, keyless drill chucks, quick release chucks, and any other suitable drill chucks provided on portable power drills. In the illustrated embodiment, the drill chuck 404 of the portable power drill 402 has a keyless drill chuck in which the woodworker loosens the drill chuck 404 by a rotational force in the counter-clockwise direction to match the diameter of the hex bit 96. Once the diameters of the drill chuck 404 and the hex bit 96 are complementary to one another, the woodworker engages the drill chuck 404 to the hex bit 96 by applying a rotational force in the clockwise direction to tighten the drill chuck 404 to the hex bit 96.

Figure 14E:
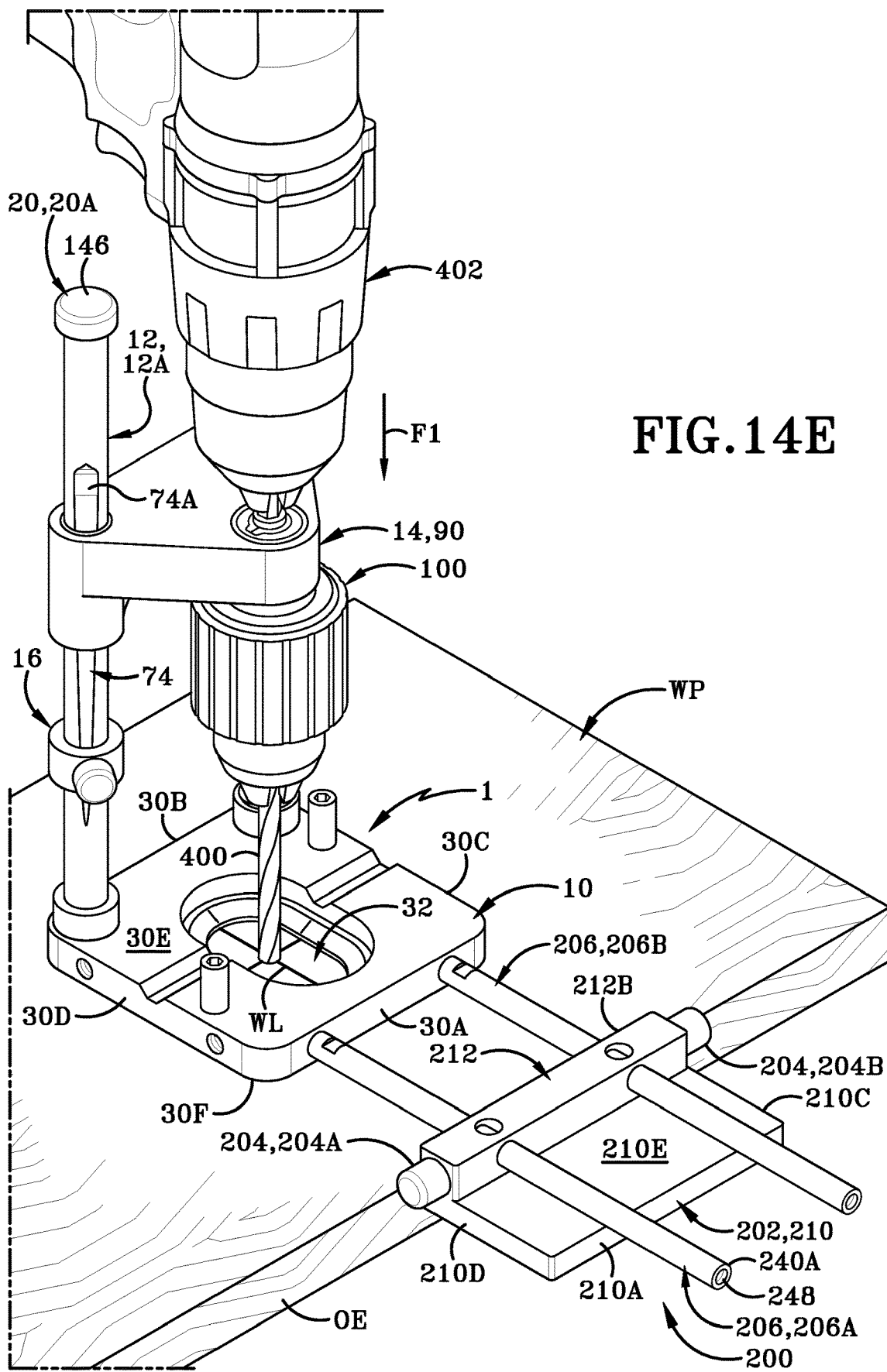
FIG. 14E is a top, front, right isometric perspective view similar to FIG. 14D showing the portable power drill and the chuck carrier of the drill guide in operation moving and rotating the drilling bit into the workpiece for drilling a hole.

Once the portable power drill 402 is operably engaged to the drill guide 1, the woodworker may drill a hole into the workpiece "WP." As illustrated in FIG. 14E, the woodworker applies a downward linear force on the portable power drill 402 directed towards the base plate 10. Such downward linear force applied to the portable power drill 402 is shown by an arrow labeled "F1." As the woodworker applies the downward force to the portable power drill 402, the chuck carrier 14 and associated parts on the chuck carrier 14 progress towards the base plate 10 and the workpiece "WP." During this downward linear force, the portable power tool 402 is also applying a rotational force to the hex bit 96, via the woodworker activating the power of the portable power drill 402, which transfers to the drill chuck 100 of the chuck carrier 14. Since the drill chuck 100 of the chuck carrier 14 is rotating, the drilling bit 400 operably engaged to the drill chuck 100 is also rotating with the drill chuck 100 via the rotational force created by the portable power drill 402. As the drilling bit 400 plunges into the workpiece "WP," the woodworker may plunge the drilling bit 400 into the workpiece "WP" until the first protrusion 108A directly abuts and/or hits the depth stopper 16 while plunging the drilling bit 400. Since the tapered portion 74 gradually increases towards the bottom end 70B of the first guide column 12B, the fastener 124 is pressed against the tapered portion 74 causing a self-tightening interaction for preventing the depth stopper 16 from moving downwardly towards the base plate 10. As such, a sudden hit or strike on the depth stopper 16 by the chuck carrier 14 will not move the depth stopper 16 downwardly due to the interaction between the tapered portion 74 of the first guide column 12A and the fastener 124 of the depth stopper 16.

Figure 14F:
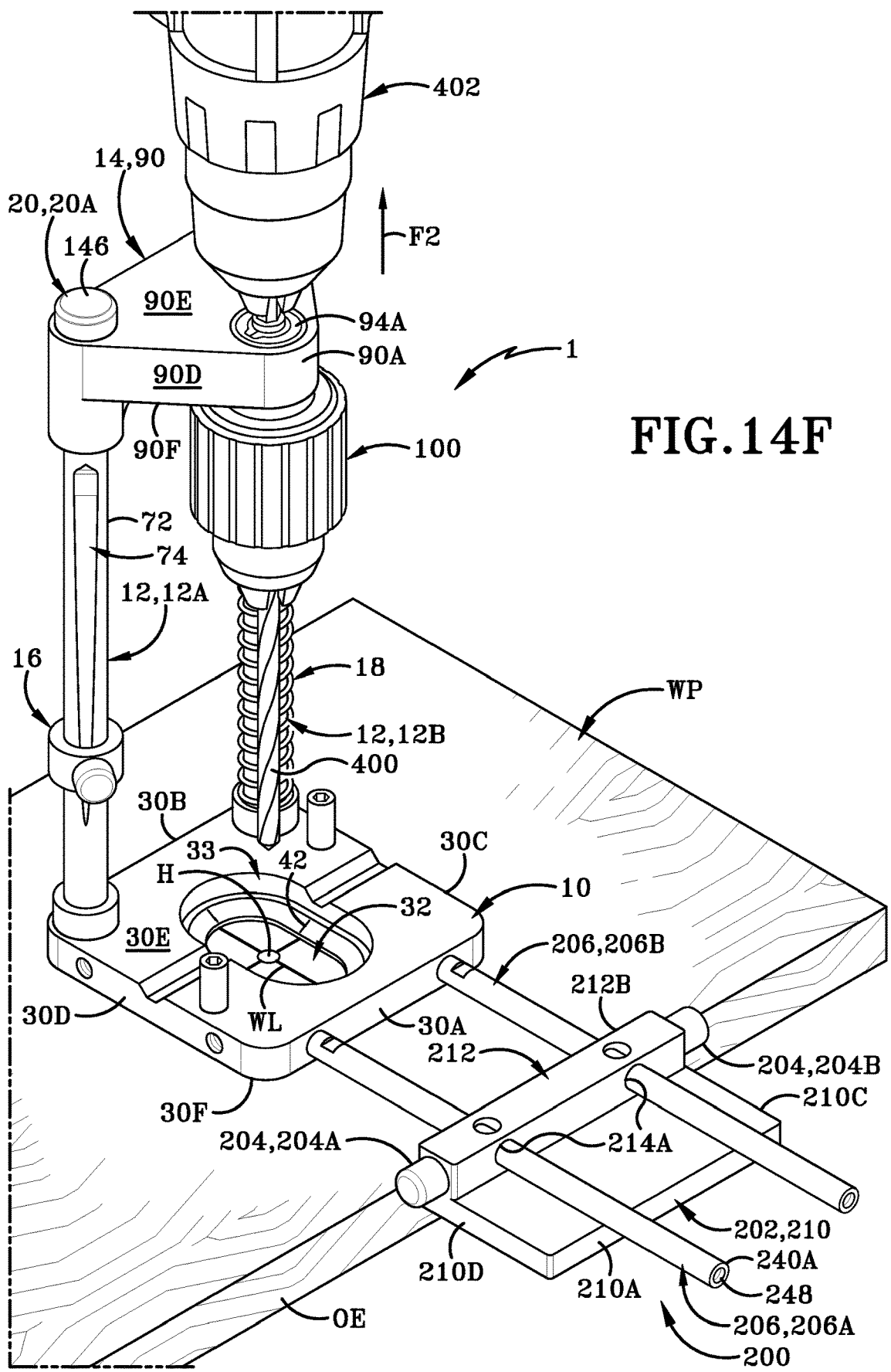
FIG. 14F is a top, front, right isometric perspective view similar to FIG. 14E showing a biaser of the drill guide in operation of moving the, drilling bit, the portable power drill, and the chuck carrier of the drill guide away from base plate after drilling a hole into the workpiece.

Once the woodworker has completed the drilling process and drilled a hole "H" into the workpiece "WP," the biaser 18 provides assistance to the woodworker for moving the chuck carrier 14 and the portable power drill 402 after performing a drilling operation (see FIG. 14F). Here, the biaser 18 assists the woodworker by applying an upward linear force on the chuck carrier 14 and the portable power drill 402 that is directed away from the base plate 10 and away from the workpiece "WP" to move the drilling bit 400 from the workpiece "WP." Such upward linear force applied to the chuck carrier 14 and the portable power drill 402 by the biaser 18 is shown by an arrow labeled "F2." In addition, the woodworker may repeat the plunging process and removal process illustrated in FIGS. 14E and 14F until a desired hole is drilled into and/or through the workpiece "WP."

As described below and illustrated in FIGS. 16-21, the fence assembly 200 provides multiple orientations for allowing the woodworker to drill into a workpiece with different orientations of the fence 202 and different attachment points of the guide rods 206 to the base plate 10.

Figure 16:
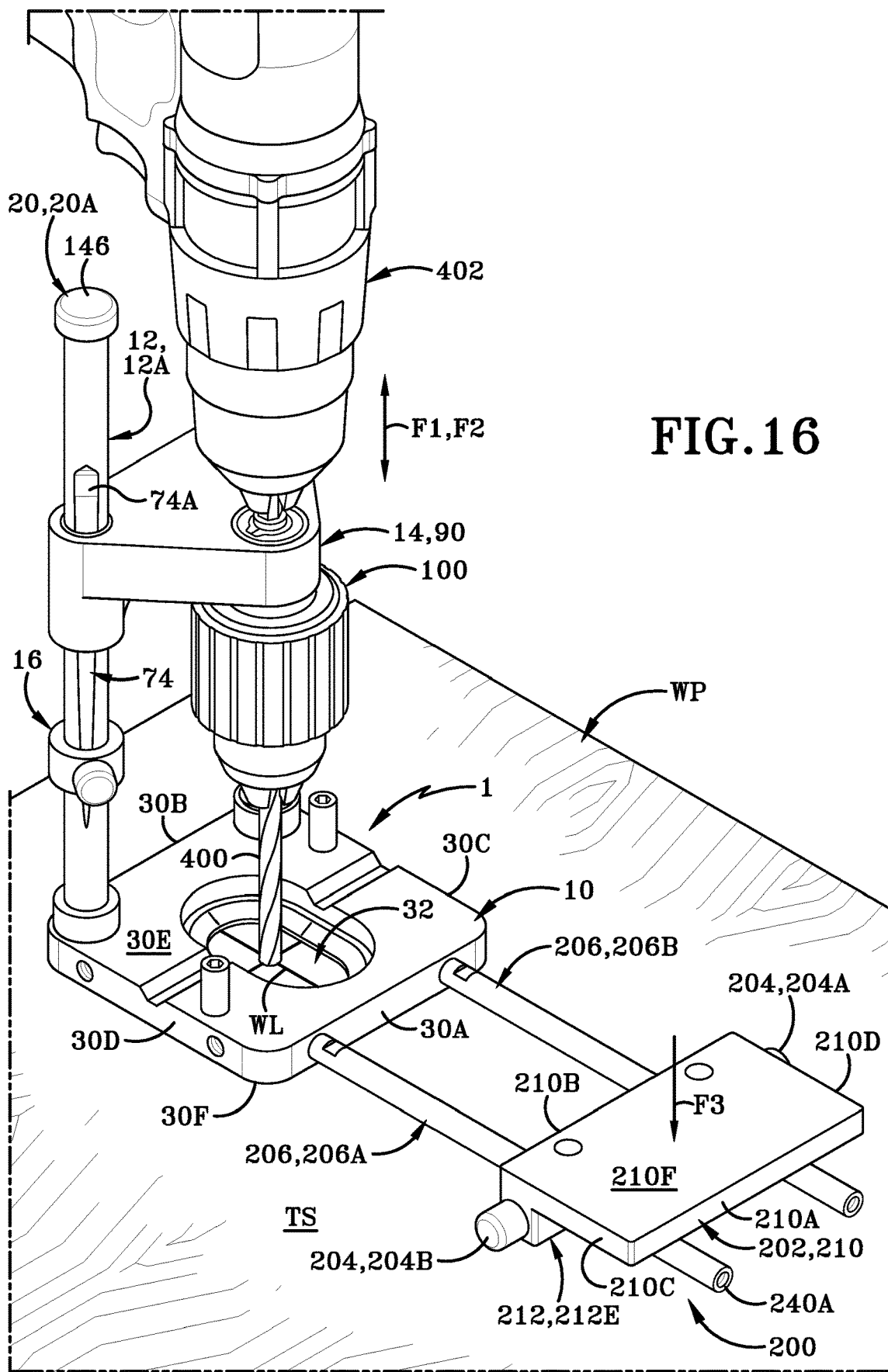
FIG. 16 is a top, front, right isometric perspective view of the portable power drill and the chuck carrier of the drill guide in operation moving and rotating the drilling bit into the workpiece for drilling a hole, wherein a top surface of the fence abuts a top surface of the workpiece.

As illustrated in FIGS. 16 and 17, the woodworker may orient the fence 202 on the first and second guide rods 206A, 206B in a second orientation relative to the base plate 10. In the second orientation, the first and second top surfaces 210E, 212E of the fence 202 face an opposing direction as compared to the top surface 30E of the base plate 10 relative to the longitudinal axis "X" of the drill guide 1. Similar to the first orientation as illustrated in FIGS. 14A-14F, the first and second guide rods 206A, 206B operably engage with the fence 202 via the first set of passageways 214A. In the illustrated embodiment, second top surface 212A of the step 212 operably engages with a top surface "TS" of a workpiece "WP." In this orientation, the fence 202 provides the woodworker with additional support and stability when using the drill guide 10 to drill a hole into the workpiece "WP." In other words, the fence 202 acts an outrigger that provides the woodworker with additional support and stability when using the drill guide 10 to drill a hole into the workpiece "WP."

Generally, a woodworker would desire this second orientation of the fence 200 as shown in FIGS. 16 and 17 when the woodworker is drilling a hole into a substantially large workpiece where additional stability is needed to maintain the position and alignment of the drill guide 1 over a drilling location. During a drilling operation, the woodworker would apply a downward linear force onto the bottom surface 210F of the fence 202 to provide additional support and stability to the drill guide 1 in which the step 212 would act as a cleat or support member. Such downward linear force applied by the woodworker on the bottom surface 210F of the fence 202 is shown by an arrow labeled "F3." In addition, the fence 202 is positioned away from the base plate 10 at a distance "G2" that is measured from the drilling bit 400 to the rear end 2106 of the fence 202. In the illustrated orientation, the maximum distance "G1" between the front end 30A of the base plate 10 to the rear end 210B of the fence 202 is up to about six and one-half inches.

Figure 18:
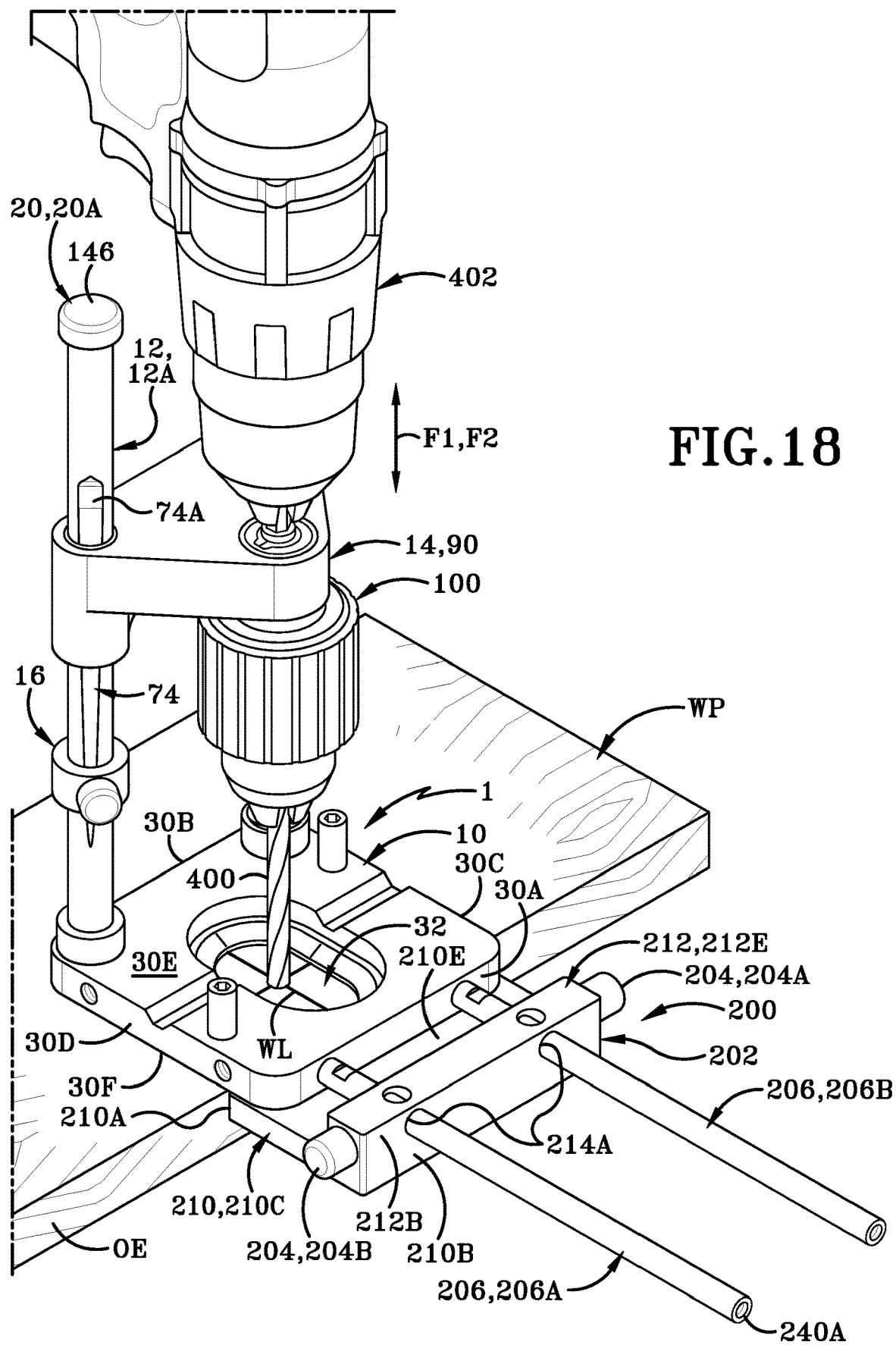
FIG. 18 is a top, front, right isometric perspective view of the portable power drill and the chuck carrier of the drill guide in operation moving and rotating the drilling bit into the workpiece for drilling a hole, wherein a front end of the fence abuts an outermost end of the workpiece and a portion of a top surface of the fence is beneath a bottom surface of the base plate of the drill guide.
Figure 19:
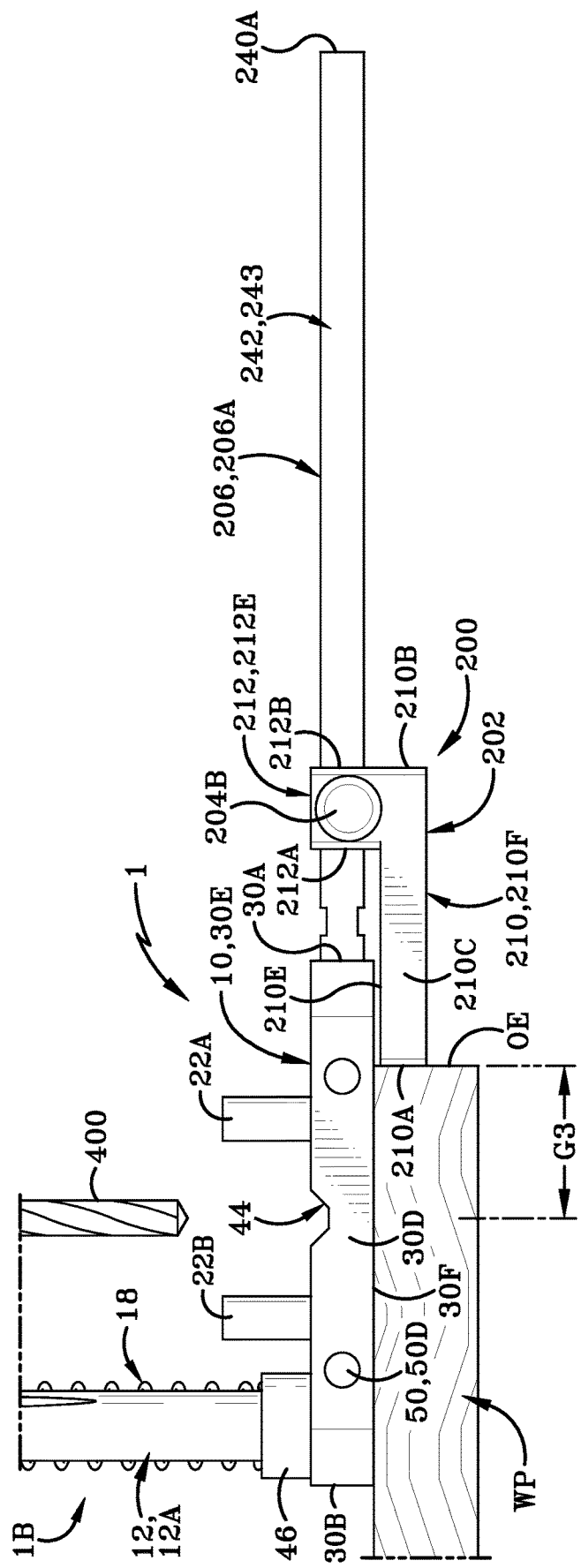
FIG. 19 is a right side elevation view of drill guide and the fence assembly, wherein a front end of the fence abuts an outermost end of the workpiece and a portion of a top surface of the fence is beneath a bottom surface of the base plate of the drill guide as shown in FIG. 18.

As illustrated in FIGS. 18 and 19, the woodworker may orient the fence 202 on the first and second guide rods 206A, 206B in a third orientation relative to the base plate 10. In the third orientation, the first and second top surfaces 210E, 212E of the fence 202 face in the same direction as the top surface 30E of the base plate 10 relative to the longitudinal axis "X" of the drill guide 1. Similar to the first orientation as illustrated in FIGS. 14A-14F, the first and second guide rods 206A, 206B operably engage with the fence 202 via the first set of passageways 214A. However, the first and second guide rods 206A, 206B enter the fence 200 from front end 210A and exit at the rear end 210B. In the third orientation, the front end 210A of the fence 202 operably engages with an outermost end "OE" of a workpiece "WP" for maintaining a distance between the fence 202 and the drilling bit 400. In addition, a portion of the fence 202 measured from the front end 210A towards the rear end 210B is disposed beneath the base plate 10 where the first top surface 210A of the fence 202 is adjacent to and faces the bottom surface 30F of the base plate 10.

Generally, a woodworker would select the third orientation for the fence 202 to minimize the distance between the drilling bit 400 and the fence 202 when drilling a hole proximate to an outermost end "OE" of the workpiece "WP" (seen in FIGS. 18 and 19). During a drilling operation, the woodworker would operably engage the fence 202 to the first and second guide rods 206A, 206B by orienting the front end 210A of the fence 202 at the front end 30A of the base 10 and having the first and second guide rods 206A, 206A enter through the front end 212A of the step 212 and exit at the rear end 212B of step 212. The third orientation of the fence 202 allows the woodworker to have support and stability when drilling holes close to the outermost end of a workpiece, such as the outermost end "OE" of the workpiece "WP" shown in FIGS. 18 and 19. As a woodworker moves the drill guide 1 closer to the outermost end "OE" of the workpiece "WP", the woodworker will also move the front end 210A of the fence 202 closer to the drilling bit 400 to compensate for the overhang and/or unsupported base plate 10 when resting on the workpiece "WP." As such, the third orientation of the fence 202 acts as a cantilever in which the front end 210A of the fence 200 directly abuts the outermost end "OE" of the workpiece "WP" while providing horizontal support to the drill guide 1 during a drilling operation. When the fence 202 is provided in the third orientation, the woodworker may drill a hole into the workpiece "WP" at a distance "G3" measured from the drilling bit 400 to the front end 210E of the fence 200. In the illustrated embodiment, a hole may be drilled into a workpiece that is about one-half of an inch away from an outermost end of the workpiece.

Figure 20:
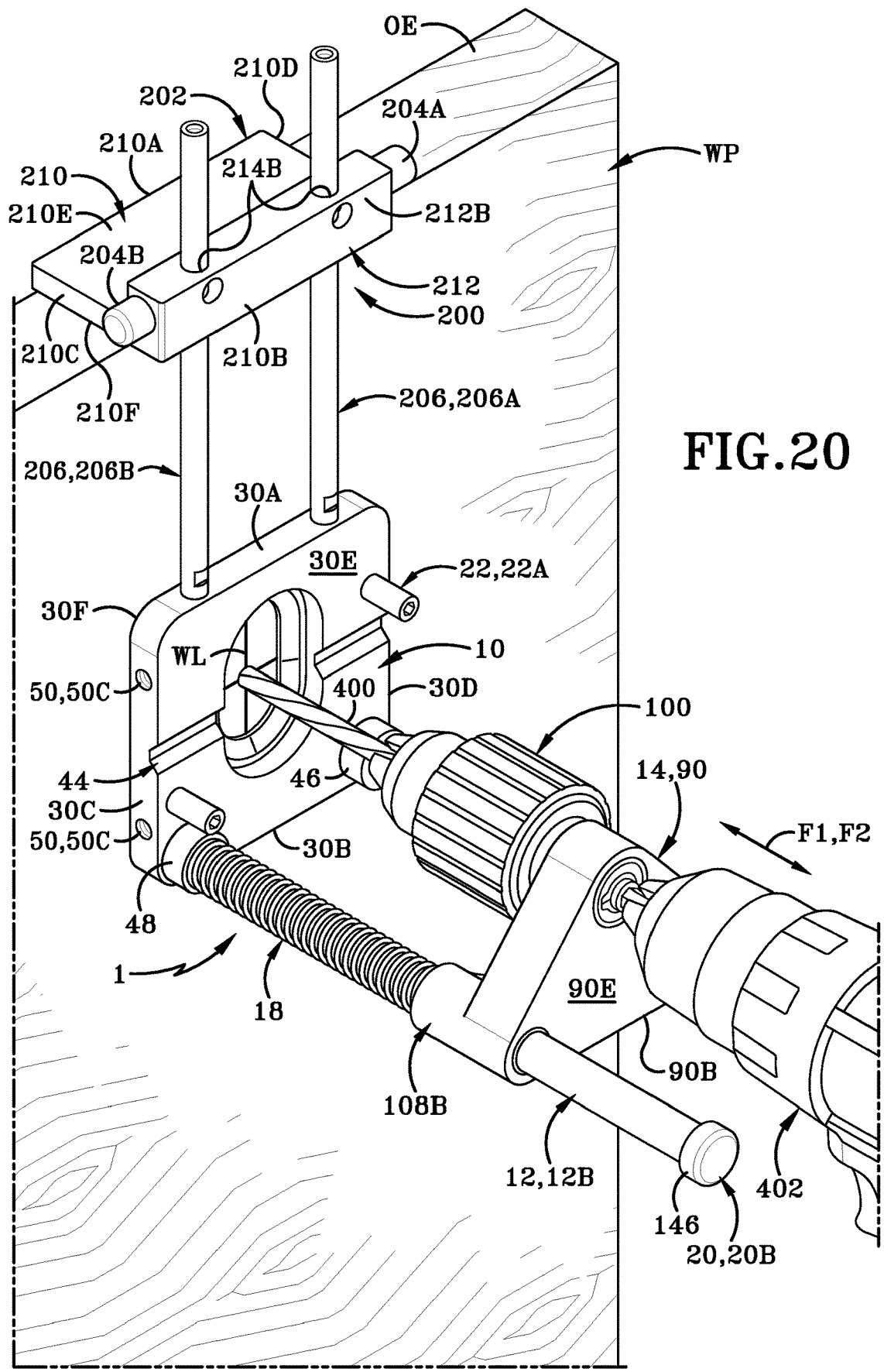
FIG. 20 is a top, front, right isometric perspective view of the portable power drill and the chuck carrier of the drill guide in operation moving and rotating the drilling bit into the workpiece for drilling a hole, wherein a bottom surface of the fence abuts an outermost end of the workpiece.
Figure 21:
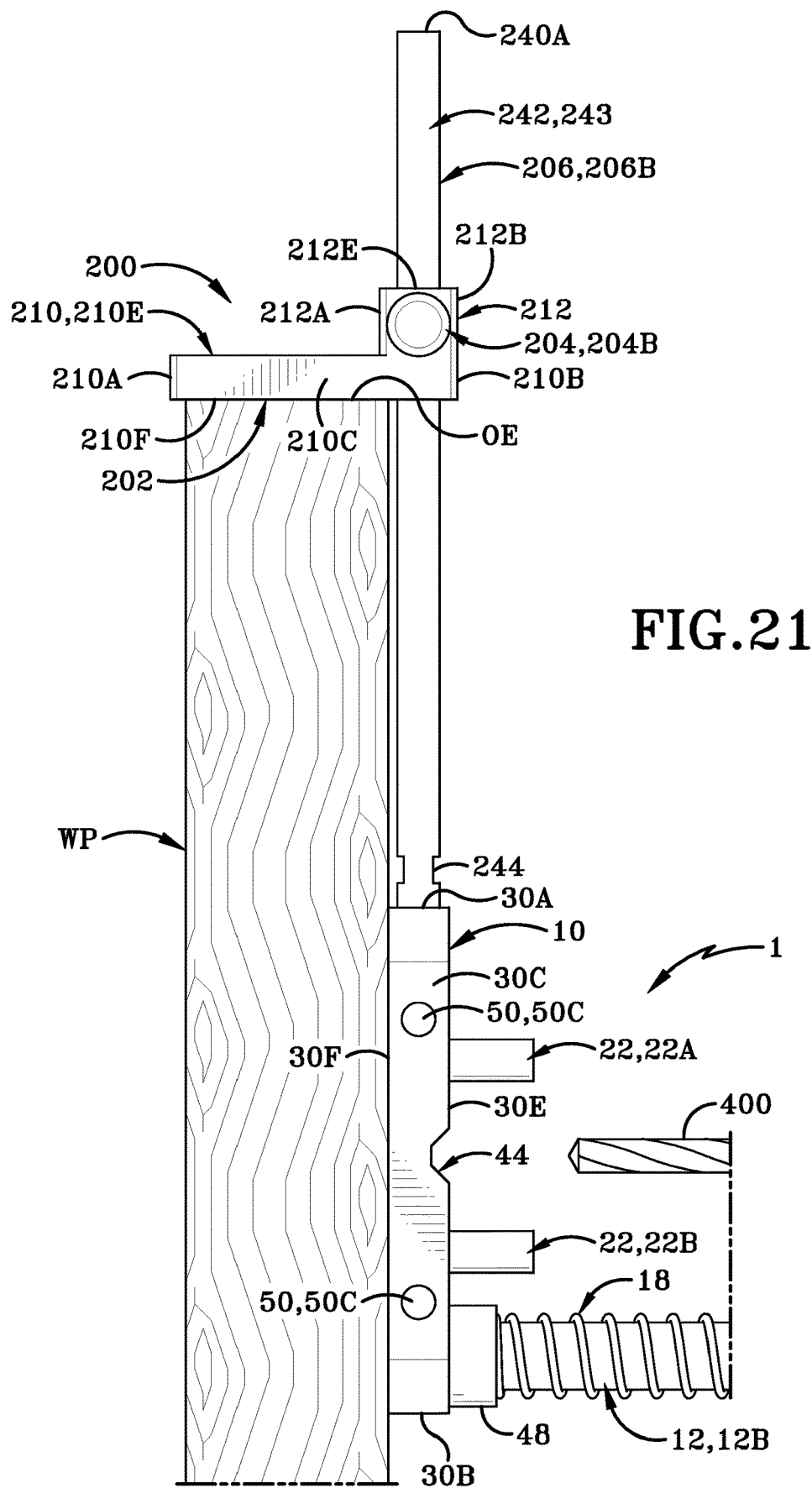
FIG. 21 is a right side elevation view of drill guide and the fence assembly, wherein the bottom surface of the fence abuts the outermost end of the workpiece as shown in FIG. 20.

As illustrated in FIGS. 20 and 21, the woodworker may orient the fence 202 on the first and second guide rods 206A, 206B in a fourth orientation relative to the base plate 10. In the fourth orientation, the first and second top surfaces 210E, 212E of the fence 202 are substantially orthogonal to the top surface 30E of the base plate 10 relative to the longitudinal axis "X" of the drill guide 1. In the fourth orientation, the first and second guide rods 206A, 206B operably engaged with the fence 202 via the second set of passageways 214B as compared to the first, second, and third orientations of the fence 202. Here, first and second guide rods 206A, 206B enter the fence 200 at the bottom end 210F and exit at the second upper surface 212E of the step 212. In the fourth orientation, the bottom surface 210F of the fence 202 operably engages with an outermost end "OE" of a workpiece "WP" for maintaining a distance between the fence 202 and the drilling bit 400.

Generally, a woodworker would desire the fourth orientation of the fence 200 as shown in FIGS. 20 and 21 when the woodworker is drilling a hole into a substantially vertical workpiece "WP" and needs additional horizontal support at a distance above the drill guide 1. During a drilling operation, the woodworker would operably engage the fence 202 to the first and second guide rods 206A, 206B by orienting the bottom surface 210F of the fence 202 at the front end 30A of the base 10 and having the first and second guide rods 206A, 206A enter through the bottom surface 210F of the fence 200 and exit at the second upper surface 212E of step 212. The fourth orientation of the fence 202 allows the woodworker to have horizontal support and stability at an outermost end of a workpiece when drilling holes into a workpiece that is vertically-oriented, such as the workpiece "WP" shown in FIGS. 20 and 21. When drilling a hole into the workpiece "WP," the woodworker may apply a downward linear force onto the first top surface 210E and/or the second upper surface 212E of the fence 202 to maintain the position of the drill guide 1 on the vertically-oriented workpiece "WP."

While the first and second guide rods 206A, 206B are illustrated as operably engaging the set of threaded openings 50A at the front end 30A of the base plate 10, the first and second guide rods 206A, 206B may operably engaging any set of threaded openings 50 defined by the base plate 10. In one example, a woodworker may desire to operably engage the first and second guide rods 206A, 206B to the set of threaded openings 50B at the rear end 30B of the base plate 10. In another example, a woodworker may desire to operably engage the first and second guide rods 206A, 206B to the set of threaded openings 50C at the left side 30C of the base plate 10. In another example, a woodworker may desire to operably engage the first and second guide rods 206A, 206B to the set of threaded openings 50D at the right side 30D of the base plate 10.

Figure 6:
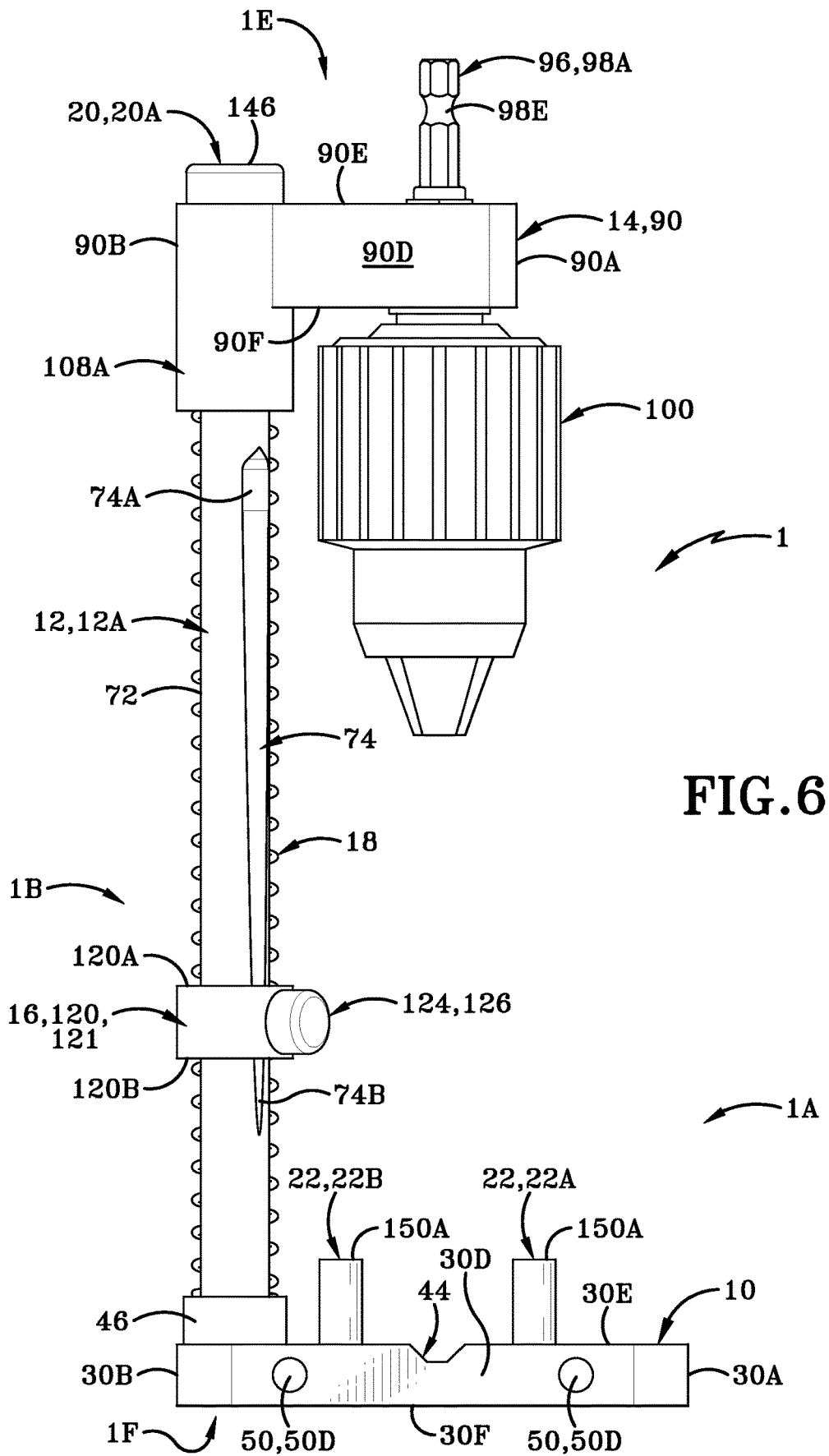
FIG. 6 is a right side elevation view of the drill guide of FIG. 2, wherein the chuck carrier is provided in the first position.

As illustrated in FIGS. 1-7 and 14A-21, the chuck carrier 14 is provided in a first position relative to the base plate 10. In the first position, the front end 90A of the housing 90 of the chuck carrier 14 faces towards the front end 1A of the drill guide 1. As illustrated in FIGS. 1, 6, and 7, the drill chuck 100 is disposed directly above the base plate 10 and the central opening 32 relative to the vertical axis "Z" of the drill guide 1. Similarly, the drilling bit 400 is disposed directly above the base plate 10 and the central opening 32 relative to the vertical axis "Z" of the drill guide 1 (see FIG. 14A). In addition, the chuck carrier 14 being oriented in the first position requires a maximum diameter for the drilling bit 400. As stated previously, the maximum diameter of a drilling bit that may be used during a drilling operation when a chuck carrier is provided in a first position is about one inch in diameter. The diameter of the drilling bit 400 is limited due to the overall diameter of the central opening 32 defined by the base plate 10. In addition, the first position of the chuck carrier 14 allows a woodworker to install and use a drilling bit with a maximum length of about 6.7 inches.

However, the chuck carrier 14 of the drill guide 1 may be provided in a second, reversible position. To reverse the orientation of the chuck carrier 14, a woodworker may loosen each of the first and second locking knobs 20A, 20B from each of the first and second guide columns 12A, 12B by applying a rotational force on the first and second locking knobs 20A, 20B in a counter-clockwise direction. Once the first and second locking knobs 20A, 20B have been loosened and removed from the first and second guide columns 12A, 12B, the woodworker applies a pulling force on the housing 90 of the chuck carrier 14 directed away from the base plate 10 relative to the vertical axis "Z" of the drill guide 1 to remove the chuck carrier 14 from the guide columns 12. Once removed, the woodworker then rotates the chuck carrier 14 rotates the chuck carrier 14 about the vertical axis "Z" of the drill guide 1 to have the front end 90A of the housing 90 face towards the rear end 1B of the drill guide 1 and opposite to the front end 1A of the drill guide 1. Once the chuck carrier 14 is oriented towards the rear end 1B of the drill guide 1, the woodworker operably engages the chuck carrier 14 to the guide columns 12 in a reverse orientation. In the second position, the first guide rod 12A enters through the second rear through-hole 110B and operably engages with the upper and lower bushings 112A, 112B in the second protrusion 108A. Also in the second position, the second guide rod 12B enters through the first rear through-hole 110A and operably engages with the upper and lower bushings 112A, 112B in the first protrusion 108A. Once the chuck carrier 14 is provided on the first and second guide columns 12A, 12B, the woodworker then tightens each of the first and second locking knobs 20A, 20B to the each of the first and second guide columns 12A, 12B by applying a rotational force on the first and second locking knobs 20A, 20B in the clockwise direction.

Once the chuck carrier 14 is provided in the second position, the drill chuck 100 is positioned away from the base plate 10 and the central opening 32 relative to the longitudinal axis "X" of the drill guide 1. In addition, a drilling bit 400' with a diameter "D2" that is greater than the diameter "D1" of the drilling bit 400 is also positioned away from the base plate 10 and the central opening 32 relative to the longitudinal axis "X" of the drill guide 1. Generally, a woodworker would desire this configuration of the drill guide 1 for drilling holes that are greater than one inch in diameter. In one example, the second position of the chuck carrier 14 allows a woodworker to install and use a drilling bit with a maximum diameter of about two inches. As illustrated in FIG. 22, a woodworker is able to use different types of drilling bits 400' on the drill guide 1. Examples of suitable types of drilling bits used when a chuck carrier is provided in a second position include twist drilling bits, flat bottom boring bits such as forstner bits, mortising bits, spade bits, and other suitable types of drilling bits when a chuck carrier is provided in a second position. In addition, the second position of the chuck carrier 14 allows a woodworker to install and use a drilling bit with a maximum length of about seven and one-half inches.

While not illustrated herein, a woodworker may install the fence assembly 200 and/or the flip stop assembly when the chuck carrier 14 is provided in the second position. The woodworker may include the fence assembly 200 and/or the flip stop assembly 300 at any set of threaded openings 50A, 50B, 50C, 50D on the base plate 10 as described and illustrated herein.

Figure 23:
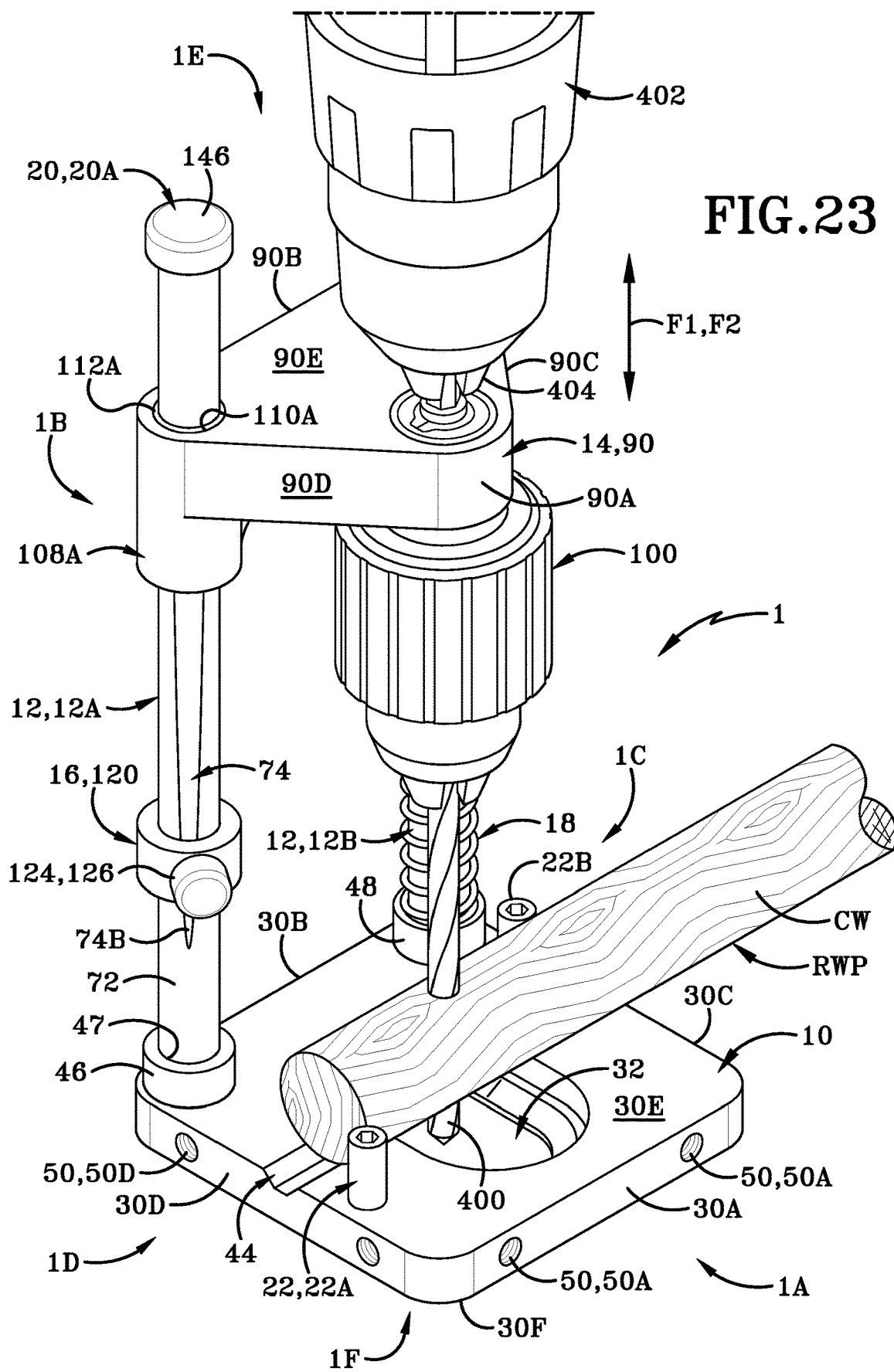
FIG. 23 is a top, front, right isometric perspective view of the portable power drill and the chuck carrier of the drill guide in operation moving and rotating the drilling bit into the workpiece for drilling a hole, wherein the workpiece is curvilinear-shaped and is maintained on the base plate of the drill guide.

The drill guide 1 also allows a woodworker to drill holes into a curvilinear and/or rounded workpiece. As illustrated in FIG. 23, a woodworker may rest a curvilinear and/or rounded workpiece "RWP" on the top surface 30E of the base plate 10 via the groove 44. The groove 44 defined in the base plate 10 provides a structure that allows a circumferential wall "CW" of the curvilinear and/or rounded workpiece "RWP" to rest inside of the base plate 10 so that the curvilinear and/or rounded workpiece "RWP" does not rotate or become misaligned during a drilling operation. In addition, the first and second centering pins 22A, 22B may also provide assistance to the drill guide 1 for maintaining the curvilinear and/or rounded workpiece "RWP" on the base plate 10 during a drilling operation. In this situation, the first and second centering pins 22A, 22B directly abut the circumferential wall "CW" of the rounded workpiece "RWP" during a drilling operation to provide additional support. If, however, the diameter or the width of the curvilinear and/or rounded workpiece "RWP" is greater than the distance between the first and second centering pins 22A, 22B when provided in the stored position on the base plate 10, the woodworker may loosen and removing the first and second centering pins 22A, 22B from the base plate 10.

As previously stated, the first and second centering pins 22A, 22B may also be moved from the stored position on the top surface 30E of the base plate 10 to the centering position on the bottom surface 30F of the base plate 10. Generally, a woodworker would desire to use the first and second centering pins in the centering position when the woodworker needs to drill at least one hole in to center of a workpiece, such as a wooden stud. Such use of the first and second centering pins 22A, 22B in the centering position is described below and illustrated in FIGS. 24A and 24B.

Figure 24A:
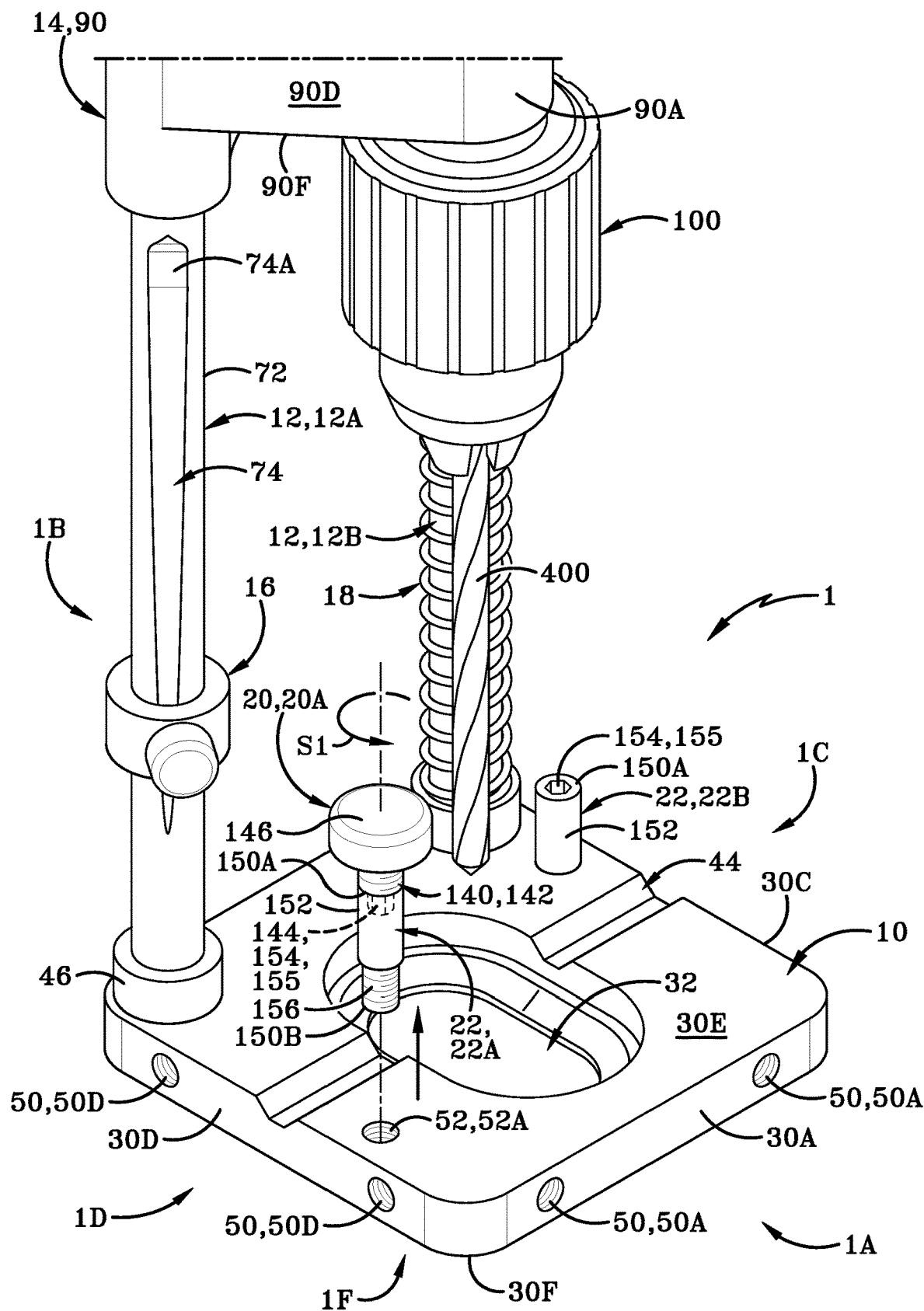
FIG. 24A is a top, front, right isometric perspective view of one of the centering pins in operation moving and disengaging from the top surface of the base plate of the drill guide via one of the locking knobs.

In order to move the first and second centering pins 22A, 22B from a stored position to a centering position, the woodworker may loosen and remove one of the locking knobs 20 from its respective guide column 12 (e.g., first locking knob 20A). As illustrated in FIG. 24A, the woodworker inserts the key portion 144 of the locking knob 20 into the passageway 154 of one of the centering pins 22 where the key portion 144 operably engages with the plurality of facets 155 inside of the passageway 154 of the selected centering pin 22. Once the locking knob 20 operably engages the centering pin 22, the woodworker applies a rotational force in the counter-clockwise direction on the locking knob 20 to loosen the first centering pin 22 from one of threaded passageways of the set of threaded passageways 52 (e.g., the first thread passageway 52A). The rotational force applied on the locking knob 20 by the woodworker is denoted by an arrow labeled "S1."

Figure 24B:
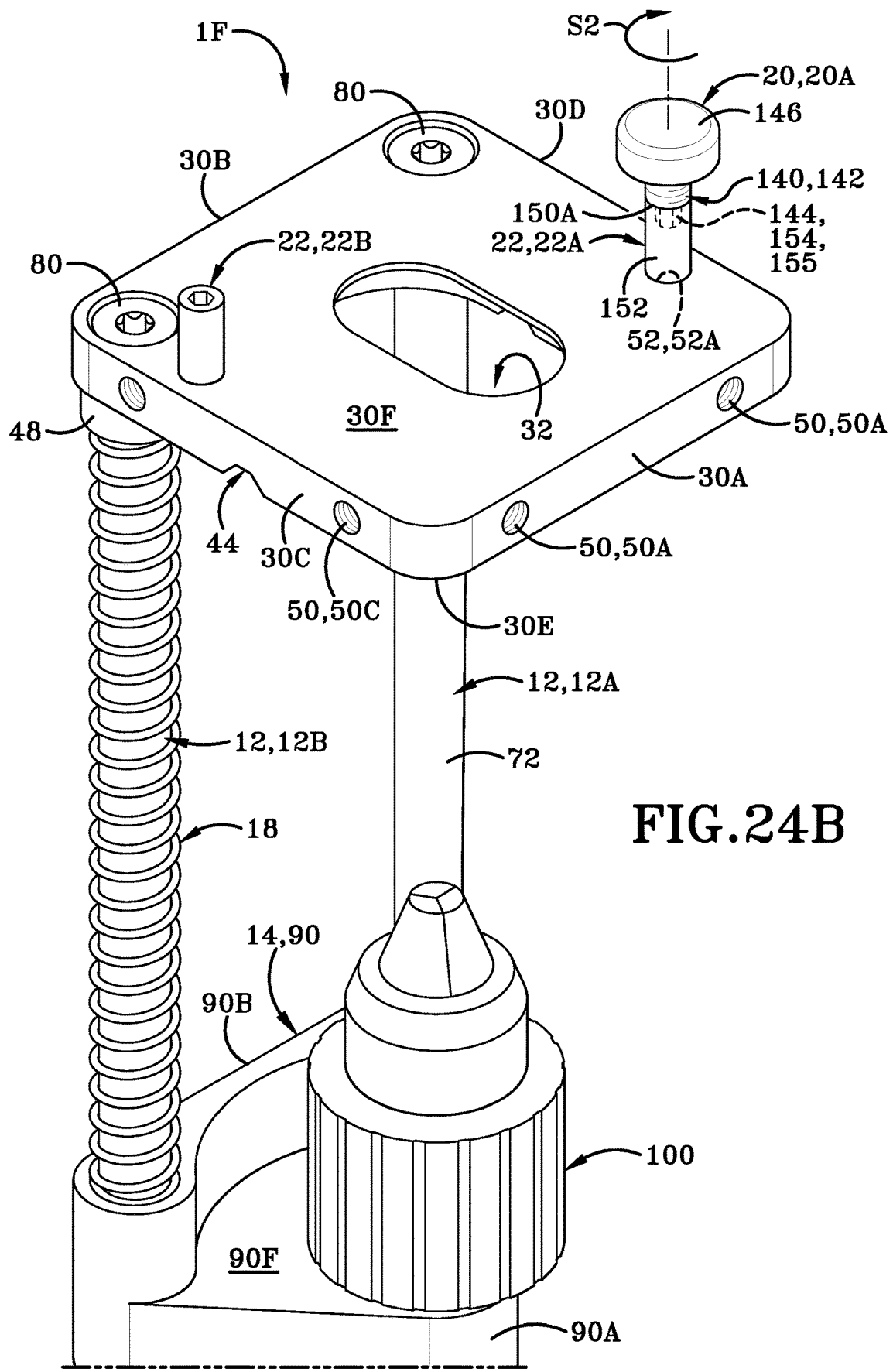
FIG. 24B is a bottom, rear, left isometric perspective view of one of the centering pins in operation moving and engaging to the bottom surface of the base plate of the drill guide via one of the locking knobs.

Once the centering pin 22 is loosened and removed from the threaded passageway at the top surface 30E of the base plate 10, the woodworker then moves the centering pins 22 to the threaded passageways 52 at the bottom surface 30F of the base plate 10. As illustrated in FIG. 24B, the threaded portion 156 of the centering pin 22 operably engages with the threaded passageway 52 by entering into the threaded passageway 52 from the bottom surface 30F of the base plate 10. Once the centering pin 22 operably engages with the threaded passageway 52, the woodworker applies a rotational force in the clockwise direction on the locking knob 20 to tighten the first centering pin 22 to the threaded passageways. The rotational force applied on the locking knob 20 by the woodworker is denoted by an arrow labeled "S2." The same technique and procedure may be repeated by woodworker for moving the other centering pin 22 from the stored position to the centering position.

Figure 25A:
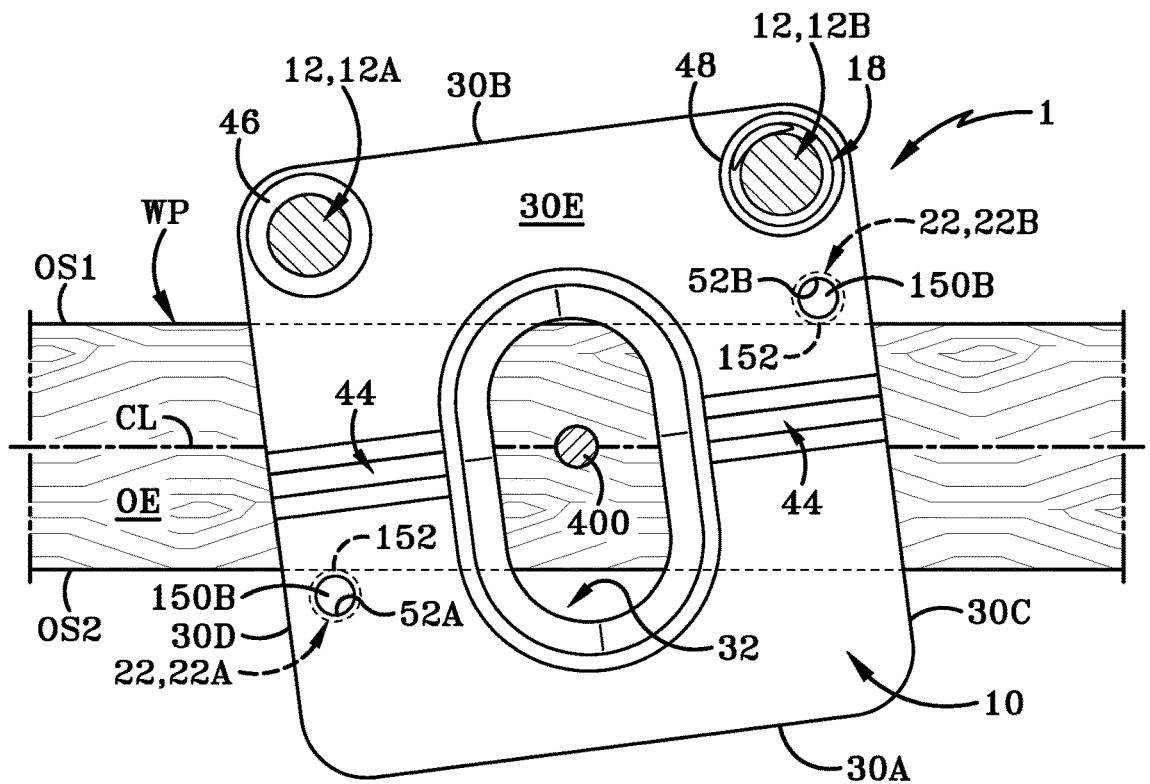
FIG. 25A is a transverse cross-section of first and second guide columns.
Figure 25B:
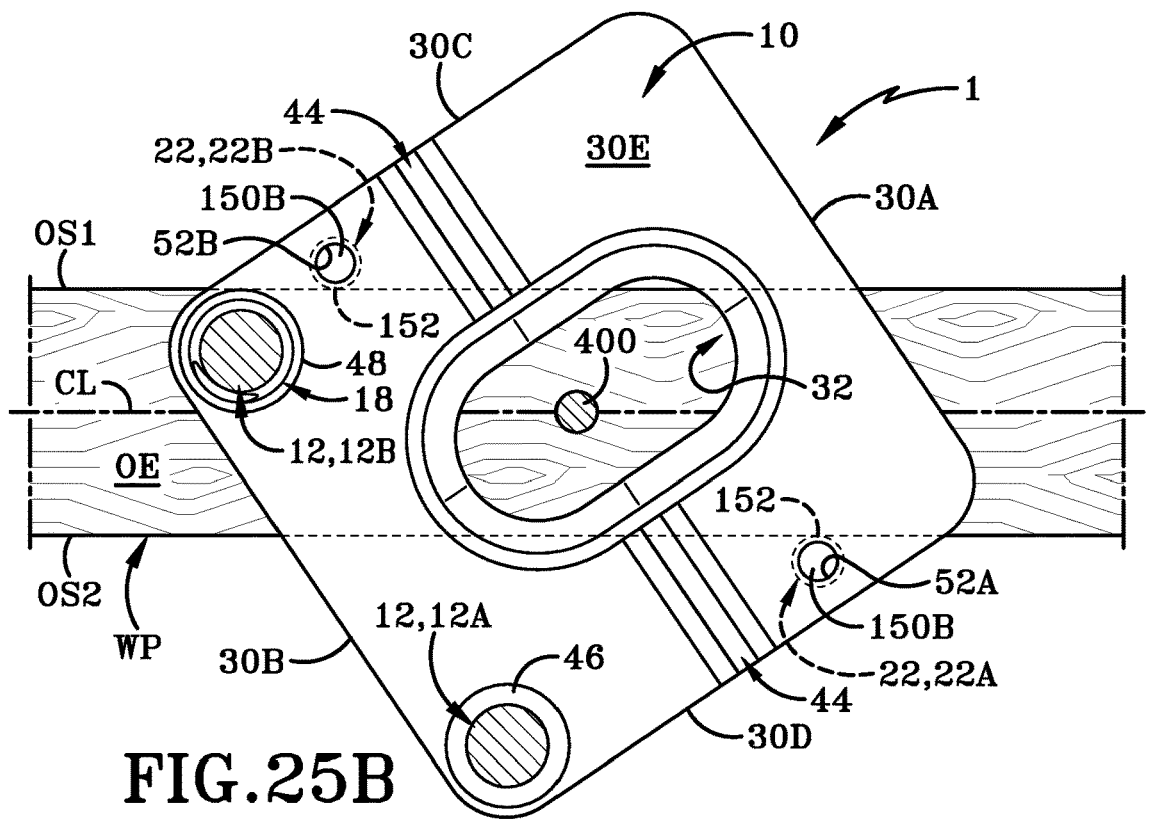
FIG. 25B is a transverse cross-section of first and second guide columns similar to FIG. 25A.

Once the centering pins 22 operably engage the base plate 10 at the bottom surface 30F, a woodworker may introduce the drill guide 1 along with the portable power drill 402 to a center line "CL" on an outermost edge "OE" of a workpiece "WP" as illustrated in FIG. 25A. As shown in FIG. 25A, the woodworker may align the centering pins 22A, 22B along first and second outermost sides "OS1", "OS2" of the workpiece "WP" such that the centering pins 22A, 22B are directly abutting the outermost sides "OS1", "OS2" during a drilling operation. Prior to precisely aligning the drilling bit 400 with a predetermined hole location, the first centering pin 22A is positioned along a first outermost side "OS1" of the workpiece "WP" such that the first centering pin 22A directly abuts the first outermost side "OS1" of the workpiece "WP". In addition, the second centering pin 22B is positioned along an opposed second outermost side "OS2" of the workpiece "WP" such that the second centering pin 22B directly abuts the second outermost side "OS2" of the workpiece "WP." Once the pair of centering pins 22 are abutting the first and second outermost sides "OS1", "OS2" of the workpiece "WP", the drilling bit 400 of the drill guide 1 may be plunged into the workpiece "WP" and used to drill along center line "CL" to bore a hole into the workpiece "WP".

As illustrated in FIG. 25A, the drill guide 1 is provided in a first orientation on the workpiece "WP". In the illustrated embodiment, the first centering pin 22A abuts the first outermost edge "OS1" at one end of the workpiece "WP" and the second centering pin 22B abuts the second outermost edge "OS2" at an opposing end of the workpiece "WP". In addition, the centering pins 22 may abut different locations of the first and second outermost sides "OS1", "OS2" of the workpiece "WP" to present the drill guide 1 in different orientation on the workpiece "WP". In one instance, the woodworker may rotate the drill guide 1 about the vertical axis "Z" to a second orientation until the first centering pins 22A abuts an opposing end of the workpiece "WP" on the first outermost side "OS1" and the second centering pins 22B abuts an opposing end of the workpiece "WP" on the second outermost side "OS2." The orientations of centering pins 22 on the drill guide 1 allows a woodworker to manipulate the drill guide to his/her desire when drilling a center hole in a workpiece "WP." Additionally, the centering pins 22 on the drill guide 1 may accommodate certain widths of workpieces when drilling a centering hole. In one exemplary embodiment, the centering pins 22 of the drill guide 1 may accommodate a workpiece defining a width up to about 3⅛ inches.

As illustrated in FIGS. 31A and 31B, a woodworker may operably engage the flip stop assembly 300 to the drill guide 1 for a drilling operation. In the illustrated embodiment, the fence assembly 200 is operably engaged to the set of threaded openings 50A defined at the front end 30A of the base plate 10.

Prior to introducing the drill guide 1 with the flip stop assembly 300, the woodworker may operably engage the support rod 302 into base plate 10 at any set of threaded openings 50 defined on the base plate 10. In the illustrated embodiment, support rod 302 operably engages with base plate 10 at a threaded opening in the set of threaded openings 50D defined at the right side 30D of the base plate 10. The woodworker may also operably engage one of the locking knobs 20 within the threaded passageway 326 of the support rod 302 to further tighten the support rod 302 to the base plate 10. Such use of the removing one of the locking knob 20 from one of the guide columns 12 is described above. Once the support rod 302 operably engages with the selected threaded opening in the set of threaded openings 50D defined at the right side 30D of the base plate 10, the woodworker may operably engage the support rod 302 to the base plate 10. The woodworker may also operably engage a tool (e.g., an opened-end wrench) to the support rod 302 inside of the pair of notches 322 to further tighten the support rod 302 to the base plate 10.

The woodworker may also operably engage at least one extension rod 304 with the support rod 302. As illustrated in FIGS. 31A and 31B, the threaded portion 344 of the at least one extension rod 304 operably engages with the threaded chamber 326 of the support rod 302 where the at least one extension rod 304 is operably engaged with the base plate 10 via the support rod 302. The woodworker may also operably engage a tool (e.g., an opened-end wrench) to the at least one extension rod 304 inside of the pair of notches 342 to further tighten the at least one extension rod 304 to the support rod 302. The woodworker may also operably engage one of the locking knobs 20 within the threaded passageway 326 of the support rod 302 or another tool similar to the locking knob 20 (e.g., a driving tool) into the at least one extension rod 304 inside of the threaded chamber 326 to further tighten the at least one extension rod 304 to the support rod 302. In other exemplary embodiment, the woodworker may operably engage any suitable number of extensions rod 304 to the base plate 10 based on particular embodiment, such as the number of flip stop 306 desired by the woodworker during a drilling operation. Example numbers of extension rods that may be operably engaged to a base plate include zero, one, at least one, two, a plurality, three, four, and other suitable numbers of extension rods that may be operably engaged to a base plate.

Optionally, the woodworker may remove one of the centering pins 22 from its stored position on the base plate 10 (operably engaged to the top surface 30E of the base plate 10 inside one of the threaded passageways in the set of threaded passageways 52). In this example, the woodworker may operably engage the selected centering pin 22 into base plate 10 at any set of threaded openings 50 defined on the base plate 10. As such, the selected centering pin 22 operably engages with base plate 10 at a threaded opening in the set of threaded openings 50D defined at the right side 30D of the base plate 10. The woodworker may also operably engage one of the locking knobs 20 within the passageway 154 of the selected centering pin 22 to further tighten the centering pin 22 to the base plate 10. Such use of the removing one of the locking knob 20 from one of the guide columns 12 is described above. Once the centering pin 22 operably engages with the selected threaded opening in the set of threaded openings 50D defined at the right side 30D of the base plate 10, the woodworker may operably engage at least one extension rod 304 to the base plate 10. The woodworker may then operably engage the threaded portion 344 of the at least one extension rod 304 to the centering pin 22 inside of the passageway 154. The woodworker may also operably engage a tool (e.g., an opened-end wrench) to the at least one extension rod 304 inside of the pair of notches 342 to further tighten the at least one extension rod 304 to the base plate 10.

The woodworker may also operably engage at least one flip stop 306 (such as flip stop 306A) to the support rod 302 and the at least one extension rod 304. As illustrated in FIG. 31B, the woodworker introduces at least one flip stop 306 to the at least one extension rod 304 by passing the at least one extension rod 304 through the first bore 362A of the at least one flip stop 306. The at least one extension rod 304 enters the at least one flip stop 306 from the rear end 360B of the at least one flip stop 306 and exits out at the front end 360A of the at least one flip stop 306. During assembly of the flip stop assembly 300, the woodworker may position the at least one flip stop 306 at any suitable length along the support rod 302 or the at least one extension rod 304. In addition, the woodworker may operably engage a second flip stop 306B and a third flip stop 306C from the at least one flip stop 306 to the support rod 302 and the at least one extension rod 304 substantially similar to the first flip stop 306A operably engaging to the support rod 302 and the at least one extension rod 304 (see FIG. 31B).

Figure 32A:
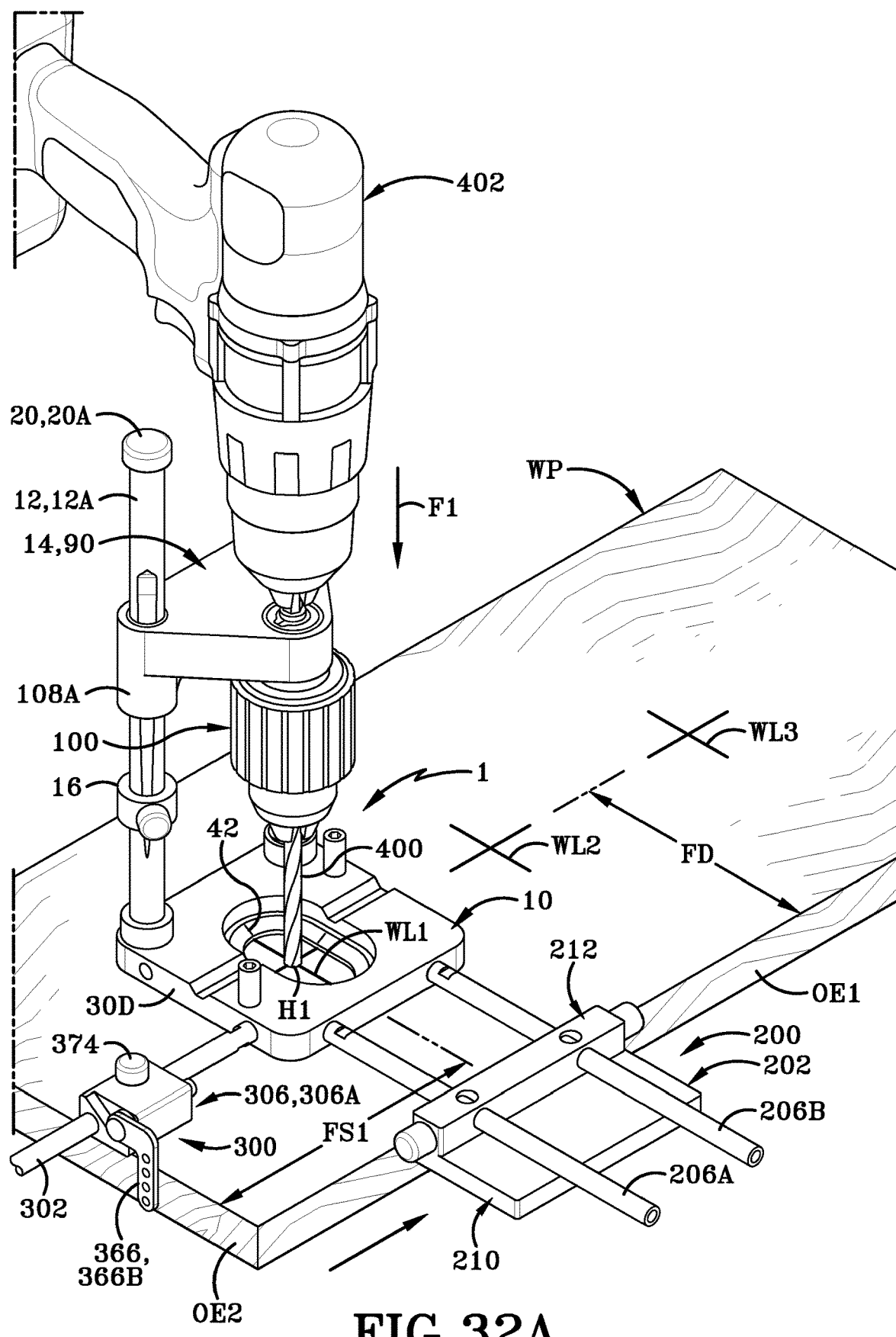
FIG. 32A is a top, front, right isometric perspective view of the flip stop assembly and the fence assembly operably engaged to the drill guide, wherein a first flip stop of the flip stop assembly and the fence of the fence assembly abut the workpiece, and wherein the portable power drill and the chuck carrier of the drill guide in operation moving and rotating the drilling bit into the workpiece for drilling a first hole.
Figure 32B:
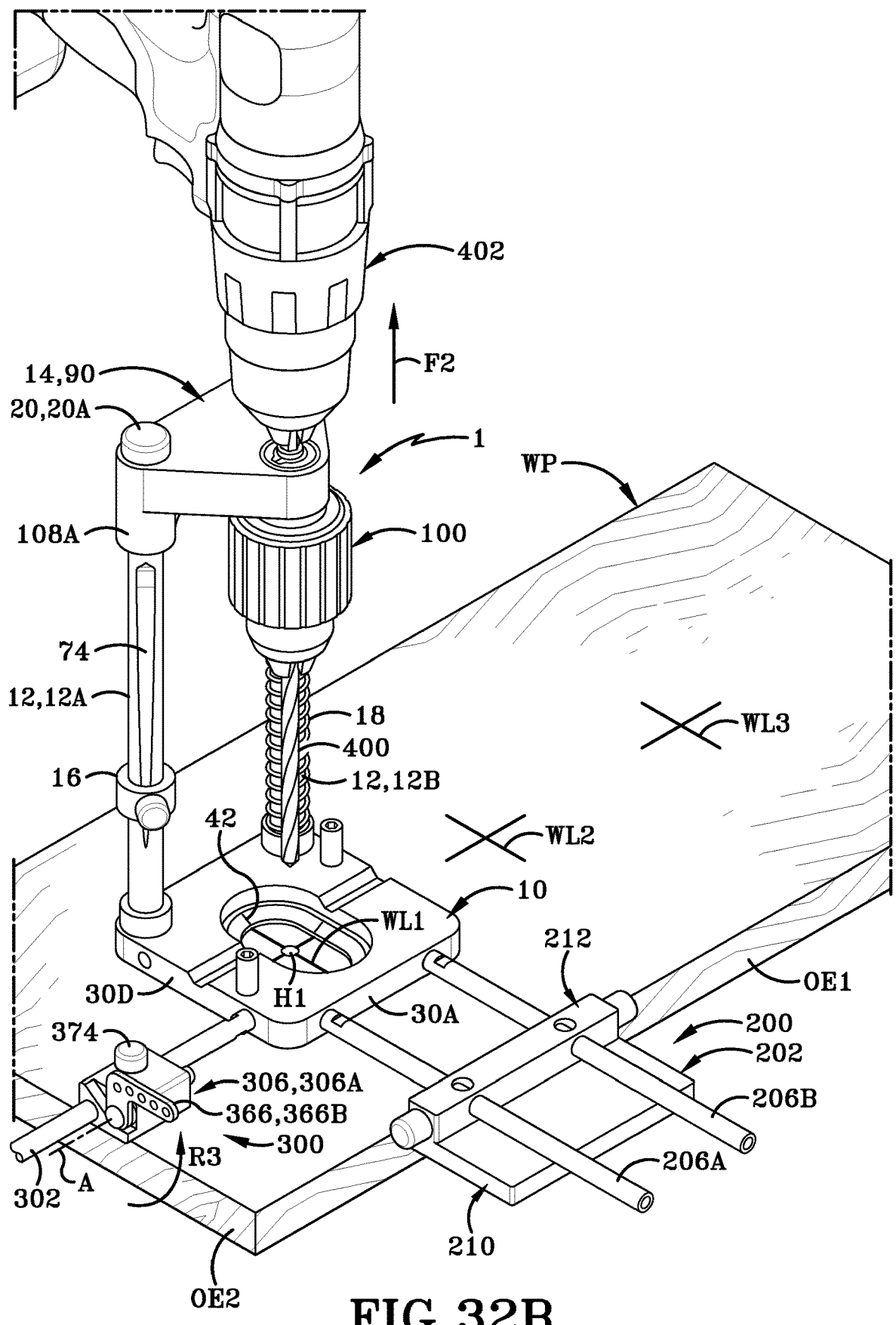
FIG. 32B is a top, front, right isometric perspective view similar to FIG. 32B showing a biaser of the drill guide in operation of moving the portable power drill and the chuck carrier of the drill guide away from base plate after drilling the first hole into the workpiece, wherein a stop arm of the first flip stop is rotated away from the workpiece.

Once the woodworker has operably engaged each of the first flip stop 306A, second flip stop 306B, and the third flip stop 306C to the support rod 302 and the at least one extension rod 304, the woodworker may introduce the drill guide 1, along with the fence assembly 200 and the fence assembly 300, to a workpiece "WP". As illustrated in FIG. 32A, the woodworker aligns the guide markers 42 defined on the base plate 10 with a first set of witness lines "WL1" scribed on the workpiece "WP" by the woodworker.

During the alignment of the guide markers 42 with the first set of witness lines "WL1", the fence 202 may abut a first outermost end "$OE_1$" of the workpiece "WP". In the illustrated embodiment, the fence 202 is provided in the first orientation (as illustrated in FIGS. 14C-14F) where the rear end 210B of the fence 200 directly abuts against the first outermost end "$OE_1$" of the workpiece "WP". During alignment, the fence 202 is also moveable along the first and second guide rods 206A, 206B in order to allow the woodworker to precisely and accurately align the drilling bit 400 at the point where the witness lines "WL1" intersect. In addition, the first flip stop 306A may abut a second outermost end "$OE_2$" of the workpiece "WP" where the second outermost end "$OE_2$" is orthogonal to the first outermost end "$OE_1$" on the workpiece "WP". In the illustrated embodiment, the stop arm 366 of the first flip stop 306A directly abuts against the second outermost end "$OE_2$" of the workpiece "WP" where the flip stop assembly 300 is positioned orthognal to the fence assembly 200 relative to the transverse axis "Y". During alignment, the first flip stop 306A is also moveable along the support rod 302 and the at least one extension rod 304 in order to allow the woodworker to precisely and accurately align the drilling bit 400 at the point where the witness lines "WL1" intersect.

Once the guide markers 42 are aligned with the first set of witness lines "WL1", the woodworker may adjust the fence 202 and the first flip stop 306A accordingly. As illustrated in FIG. 32A, the fence 202 is provided at a fence distance "FD" that is measured from the rear end 210B of the fence 200 to the drilling bit 400. Once the woodworker has determined the fence distance "FD" for the fence 202, the woodworker tightens the thumb screw 204A, 204B of the fence 202 to the guide rods 206A, 206B in order for the fence 202 to maintain the fence distance "FD" from the drilling bit 400. In addition, the first flip stop 306A of the at least one flip stop 306 may be positioned at a first distance "FS1" away from the drilling bit 400 that is measured from the stop arm 366 of the first flip stop 306A to the drilling bit 400 of the drill guide 1. Once the woodworker has determined the first distance "FS1" for the first flip stop 306A, the woodworker tightens the thumb screw 374 of the first flip stop 306A to the support rod 302 or the at least one extension rod 304 in order for the first flip stop 306A to maintain the first distance "FS1" from the drilling bit 400. The woodworker then rotates the stop arm 366 downwardly about the first axis of rotation "A" defined along the length of the fastener 372A in order for the stop arm 366 to operably engage the second outermost edge "OE₂". Once the fence 202 and the stop arm 366 of the first flip stop 306A operably engage the first outermost end "OE₁" and the second outermost end "OE₂" of the workpiece "WP", the woodworker may drill a first hole "H1" into the workpiece "WP" based on the first set of witness lines "WL1".

As illustrated in FIG. 32A, the engagement of the fence 202 and the stop arm 366 of the first flip stop 306A provides additional stability to the drill guide 1 where the fence 202 and the first flip stop 306A maintain the position of the drill guide 1 at the first set of witness lines "WL1". Here, the fence 202 and the first flip stop 306A act as stoppers and prevent movement of the drill guide 1 in both a longitudinal direction and a transverse direction when resting on the workpiece "WP". During a drilling operation, the woodworker may simply apply force to the drill guide 1, the fence assembly 200, and/or the flip stop assembly 300 that is directed towards the rear end 1B of the drill guide 1 and/or directed towards the left side 1D of the drill guide 1 to maintain the position of the drill guide 1 over the first set of witness lines "WL1" during a drilling operation.

Once the woodworker has completed drilling the first hole "H1" into the workpiece "WP", the woodworker may then rotate the stop arm 366 upwardly about the first axis of rotation "A" defined along the length of the fastener 372A in order for the stop arm 366 to operably disengage from the second outermost edge "OE₂". The rotation of the stop arm 366 is denoted by an arrow labeled "R3". Once disengaged, the woodworker may slide the drill guide 1 along with the fence assembly 200 and the flip stop assembly 300 away from the first set of witness lines "WL1" to a second set of witness lines "WL2" scribed on the workpiece "WP". During this movement, the fence 202 of the fence assembly 200 may be maintained at the fence distance "FD" to eliminate redundant alignment and adjustment of the guide markers 42 with the second set of witness lines "WL2".

Figure 32C:
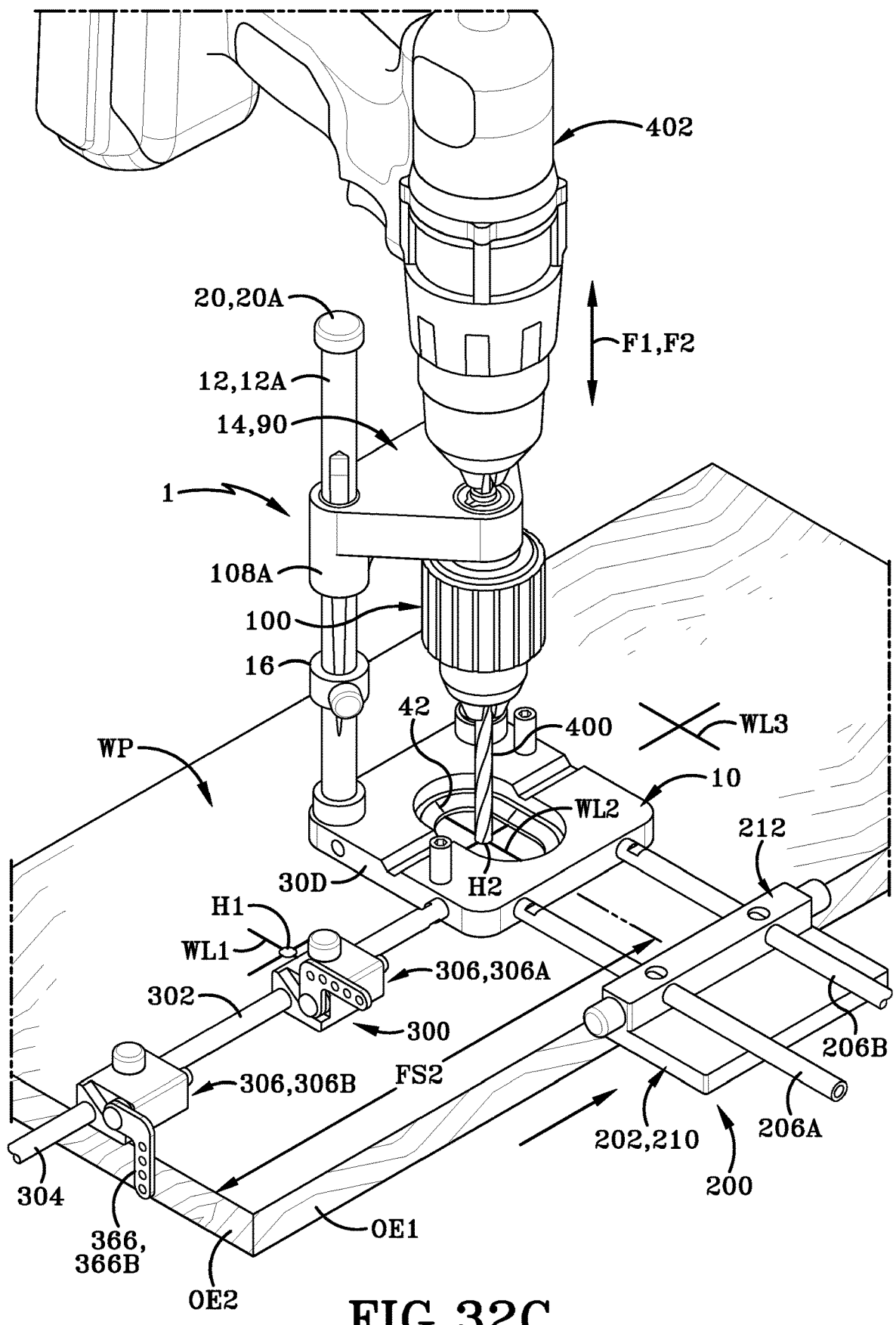
FIG. 32C is a top, front, right isometric perspective view similar to FIG. 32B showing the flip stop assembly and the fence assembly operably engaged to the drill guide, wherein a second flip stop of the flip stop assembly and the fence of the fence assembly abut the workpiece, and wherein the portable power drill and the chuck carrier of the drill guide in operation moving and rotating the drilling bit into the workpiece for drilling a second hole.

As the guide markers 42 of the base plate 10 align with the second set of witness lines "WL2", the woodworker may adjust the second flip stop 306B based on the alignment between the guide markers 42 of the base plate 10 align with the second set of witness lines "WL2". As illustrated in FIG. 32C, the second flip stop 306B of the at least one flip stop 306 may be positioned at a second distance "FS2" away from the drilling bit 400 that is measured from the stop arm 366 of the second flip stop 306B to the drilling bit 400 of the drill guide 1. In the illustrated embodiment, the second distance "FS2" of the second flip stop 306B is greater than the first distance "FS1" of the first flip stop 306A. Once the woodworker has determined the second distance "FS2" for the second flip stop 306B, the woodworker tightens the thumb screw 374 of the second flip stop 306B to the support rod 302 or the at least one extension rod 304 in order for the second flip stop 306B to maintain the second distance "FS2" from the drilling bit 400. The woodworker then rotates the stop arm 366 of the second flip stop 306B downwardly about the axis of rotation "A" defined along the length of the fastener 372A in order for the stop arm 366 to operably engage the second outermost edge "OE₂". Once the fence 202 and the stop arm 366 of the second flip stop 306B operably engage the first outermost end "OE₁" and the second outermost end "OE₂" of the workpiece "WP", the woodworker may drill a second hole "HZ" into the workpiece "WP" based on the second set of witness lines "WL2".

Once the woodworker has completed drilling the second hole "HZ" into the workpiece "WP", the woodworker may then rotate the stop arm 366 of the second flip stop 306B upwardly about the axis of rotation "A" defined along the length of the fastener 372A in order for the stop arm 366 to operably disengage from the second outermost edge "OE₂". Once disengaged, the woodworker may slide the drill guide 1 along with the fence assembly 200 and the flip stop assembly 300 away from the second set of witness lines "WL2" to a third set of witness lines "WL3" scribed on the workpiece "WP". During this movement, the fence 202 of the fence assembly 200 may be maintained at the fence distance "FD" to eliminate redundant alignment and adjustment of the guide markers 42 with the third set of witness lines "WL3".

Figure 32D:
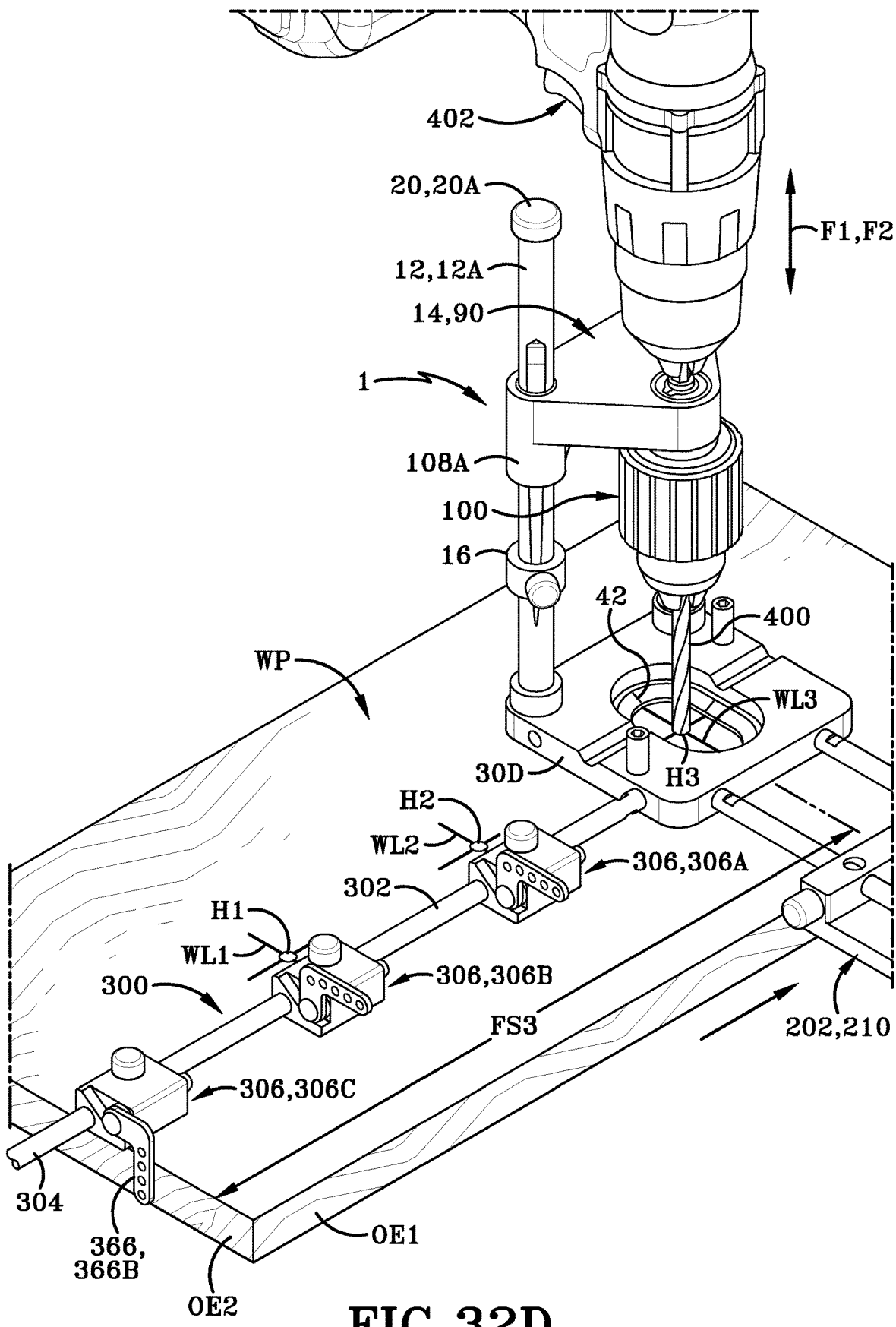
FIG. 32D is a top, front, right isometric perspective view similar to FIG. 32C showing the flip stop assembly and the fence assembly operably engaged to the drill guide, wherein a third flip stop of the flip stop assembly and the fence of the fence assembly abut the workpiece, and wherein the portable power drill and the chuck carrier of the drill guide in operation moving and rotating the drilling bit into the workpiece for drilling a third hole.

As the guide markers 42 of the base plate 10 align with the third set of witness lines "WL3", the woodworker may adjust the third flip stop 306C based on the alignment between the guide markers 42 of the base plate 10 align with the third set of witness lines "WL3". As illustrated in FIG. 32D, the third flip stop 306C of the at least one flip stop 306 may be positioned at a third distance "FS3" away from the drilling bit 400 that is measured from the stop arm 366 of the second flip stop 306B to the drilling bit 400 of the drill guide 1. In the illustrated embodiment, the third distance "FS3" of the third flip stop 306C is greater than the first distance "FS1" of the first flip stop 306A and the second distance "FS2" of the second flip stop 306B. Once the woodworker has determined the third distance "FS3" for the third flip stop 306C, the woodworker tightens the thumb screw 374 of the third flip stop 306C to the support rod 302 or the at least one extension rod 304 in order for the third flip stop 306C to maintain the third distance "FS3" from the drilling bit 400. The woodworker then rotates the stop arm 366 of the third flip stop 306C downwardly about the axis of rotation "A" defined along the length of the fastener 372A in order for the stop arm 366 to operably engage the second outermost edge "OE₂". Once the fence 202 and the stop arm 366 of the third flip stop 306C operably engage the first outermost end "OE₁" and the second outermost end "OE₂" of the workpiece "WP", the woodworker may drill a third hole "H3" into the workpiece "WP" based on the third set of witness lines "WL3".

While not illustrated herein, the woodworker may keep the arrangement of the fence 202 on the guide rods 206A, 206B and the flip stops 306A, 306B, 306C on the support rod 302 and the at least one extension rod 304 for drilling a similar hole arrangement on the same workpiece "WP" or an entirely different workpiece. In other words, the measured arrangement of the fence 202 and the flip stops 306A, 306B, 306C on the drill guide 1 allows a woodworker to simply align the fence 202 with a first outermost end of a workpiece and one of the flip stops 306 with a second outermost end of a workpiece without measuring and scribing new set of witness lines on the workpiece as described above and illustrated in FIGS. 32A-32D. As such, the measured arrangement of the fence 202 and the flip stops 306A, 306B, 306C on the drill guide 1 eliminates redundant alignment and adjustment performed by the woodworker when drilling a new set of holes into the same workpiece or a different workpiece.

While the at least one flip stop 306 comprises of first, second and third flip stops 306A, 306B, 306C, any suitable number of flip stop may be provided with a drill guide based on a particular embodiment, such as the size, shape, and configuration of a workpiece being drill into via a drill guide. Example numbers of flip stops that may be provided with a drill guide includes zero, one, at least one, two, a plurality, three, four, five, and any other suitable amount of flip stops that may be provided with a drill guide.

Figure 33:
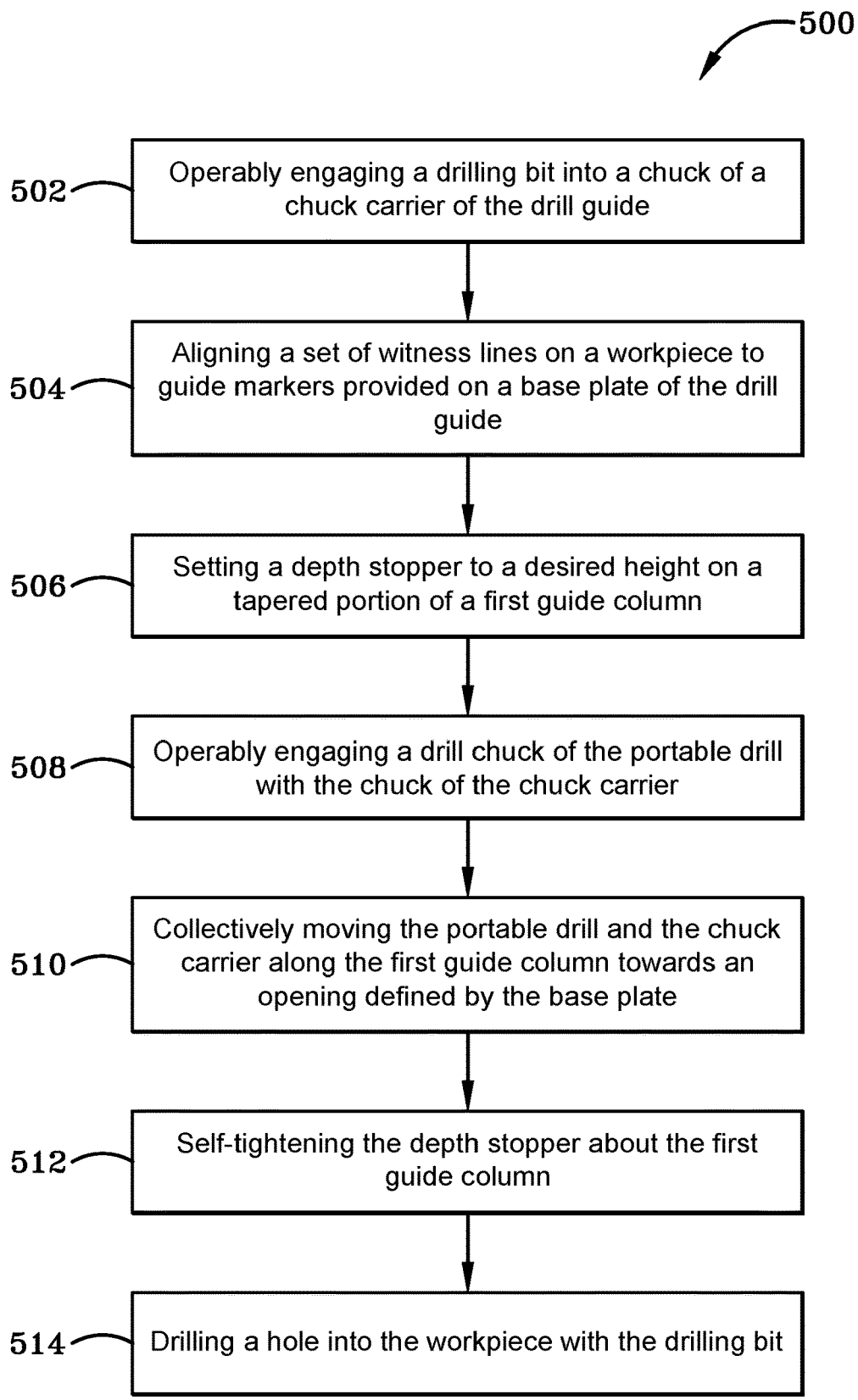
FIG. 33 illustrates an exemplary method flow chart for using a portable power drill with a drill guide.

FIG. 33 illustrates a method 500 of using a portable power drill with a drill guide. Initial step 502 of method 500 may include operably engaging a drilling bit into a chuck of a chuck carrier of the drill guide. Another step 504 may include aligning a set of witness lines on a workpiece with guide markers provided on a base plate of the drill guide. Another step 506 may include setting a depth stopper to a desired height on a tapered portion of a first guide column of the drill guide. Another step 508 may include operably engaging a drill chuck of the portable drill with the chuck of the chuck carrier. Another step 510 may include collectively moving the portable drill and the chuck carrier along the first guide column towards an opening defined by the base plate. Another step 512 may include self-tightening the depth stopper about the first guide column as the chuck carrier moves towards the opening. Another step 514 may include drilling a hole into the workpiece with the drilling bit.

In an exemplary embodiment, method 500 may include additional steps of using a portable power drill with a drill guide. An optional step may include the step of collectively moving the portable drill and the chuck carrier away from the base plate via a biaser provided on a second guide column of the drill guide. Optional steps may further include the steps of rotating the chuck carrier from a first position where the drilling bit aligns with the opening in the base plate to a second position where the drilling bit is located outwardly away from the base plate; disengaging the drilling bit from the chuck carrier; and engaging another drilling bit of a greater diameter with the chuck carrier. Optional steps may further include the steps of removing a first lock knob from the first guide column of the drill base when the chuck carrier is in the first position; disengaging the chuck carrier from the first guide column; rotating the chuck carrier to the second position; reengaging the chuck carrier in the second position with the first guide column; and operably engaging the first lock knob with the first guide column to maintain the chuck carrier in the second position. Optional step may further include the steps of removing a first centering pin from a first stored position on a top surface of the base plate; removing a second centering pin from a second stored position on the top surface of the base plate; operably engaging the first centering pin at a bottom surface of the base plate in a first centering position; operably engaging the second centering pin at the bottom surface of the base plate in a second centering position; and locating the workpiece between the first centering pin and the second centering pin on the bottom surface of the base plate. An optional step may include the step of positioning a workpiece into a groove defined by the base plate, wherein the workpiece defines a curvilinear shape. Optional steps may further include the steps of operably engaging at least one guide rod with a first end of the base plate; operably engaging a fence with the at least one guide rod; and positioning a top surface of the fence adjacent to a bottom surface of the base plate. Optional steps may further include the steps of operably engaging at least one guide rod with a first end of the base plate; operably engaging a fence with the at least one guide rod; positioning the fence a first distance away from the drilling bit; and abutting a rear end of the fence to a first outermost edge of the workpiece. Optional steps may further include the steps of operably engaging a support rod with a first side of the base plate; operably engaging a flip stop with the support rod; positioning the flip stop at a second distance away from the drilling fence; and abutting a stop arm of the flip stop to a second outermost edge of the workpiece, wherein the stop arm is orthogonal to the rear end of the fence.

Figure 34:
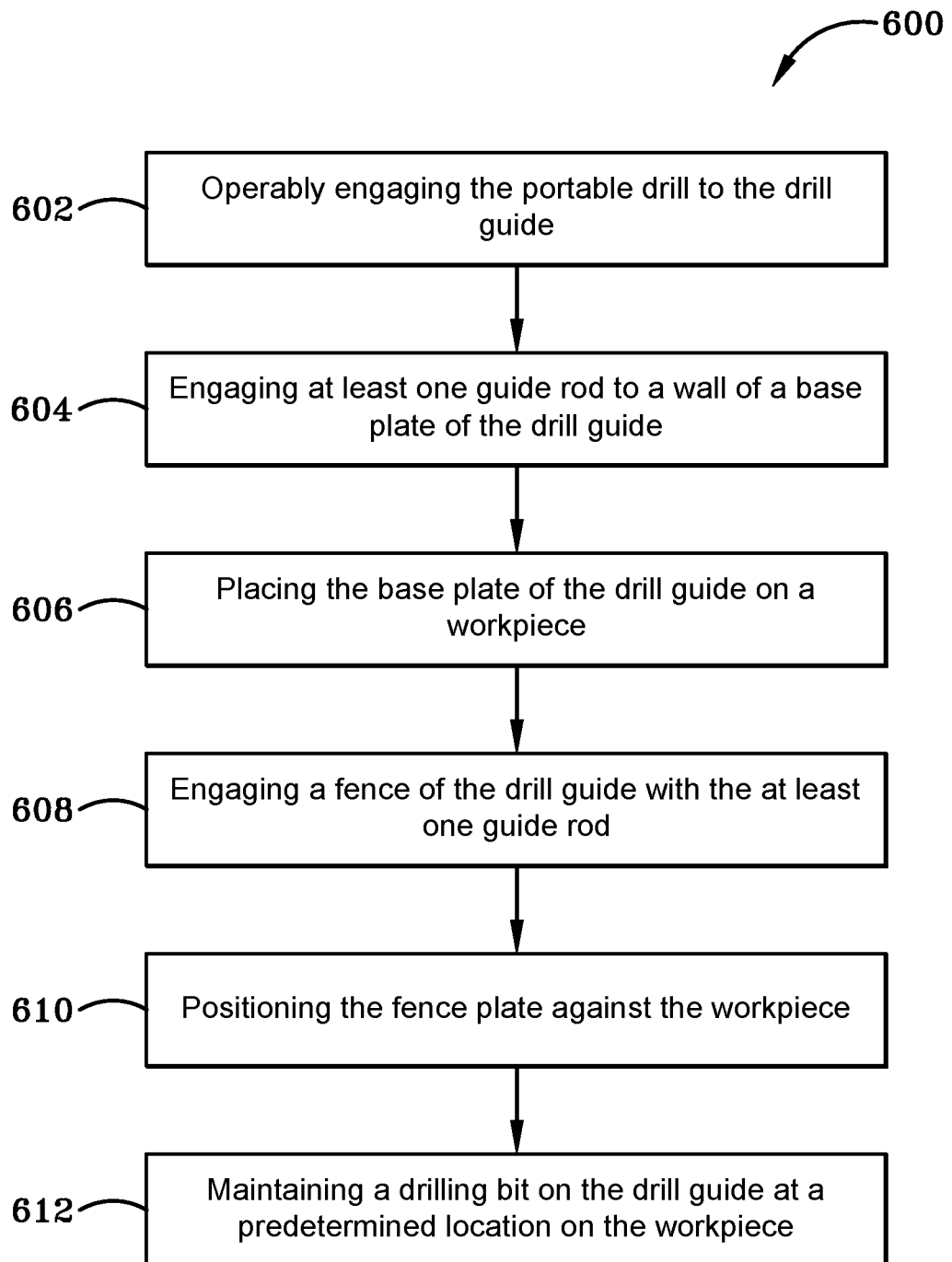
FIG. 34 illustrates an exemplary method flow chart for guiding a portable drill guide.

FIG. 34 illustrates a method 600 of guiding a portable drill with a drill guide. An initial step 602 may include operably engaging the portable drill to a drill guide. Another step 604 may include engaging at least one guide rod to a base plate of the drill guide. Another step 606 may include placing the base plate of the drill guide on a workpiece. Another step 608 may include engaging a fence of the drill guide with the at least one guide rod. Another step 610 may include positioning the fence against the workpiece. Another step 612 may include maintaining a drilling bit on the drill guide at a predetermined location on the workpiece.

In an exemplary embodiment, method 600 may include additional steps of guiding a portable drill with a drill guide. An optional step may further provide that the step of placing of the base plate of the drill guide on the workpiece includes placing the base plate on a top surface of the workpiece; wherein the positioning of the fence against the workpiece includes placing a rear end of the fence on a side surface of the workpiece that is substantially perpendicular to the top surface of the workpiece; and positioning the fence at a distance away from the drilling bit via the at least one guide rod. An optional step may further provide that the step of placing of the base plate of the drill guide on the workpiece includes placing the base plate on a top surface of the workpiece; wherein the positioning of the fence against the workpiece includes placing a front end of the fence on a side surface of the workpiece that is substantially perpendicular to the top surface of the workpiece; and positioning a portion of a top surface of the fence adjacent to a bottom surface of the base plate. An optional step may further provide that the step of placing of the base plate of the drill guide on the workpiece includes placing the base plate on a top surface of the workpiece; placing an upper surface of the fence on the top surface of the workpiece; and positioning the fence a distance away from the drilling bit via the at least one guide rod. An optional step may further provide that the step of placing of the base plate of the drill guide on the workpiece includes placing the base plate on a side surface of the workpiece; wherein the positioning of the fence against the workpiece includes placing a bottom surface of the fence on the top surface of the workpiece; and positioning the fence a distance away from the drilling bit via the at least one guide rod.

Figure 35:
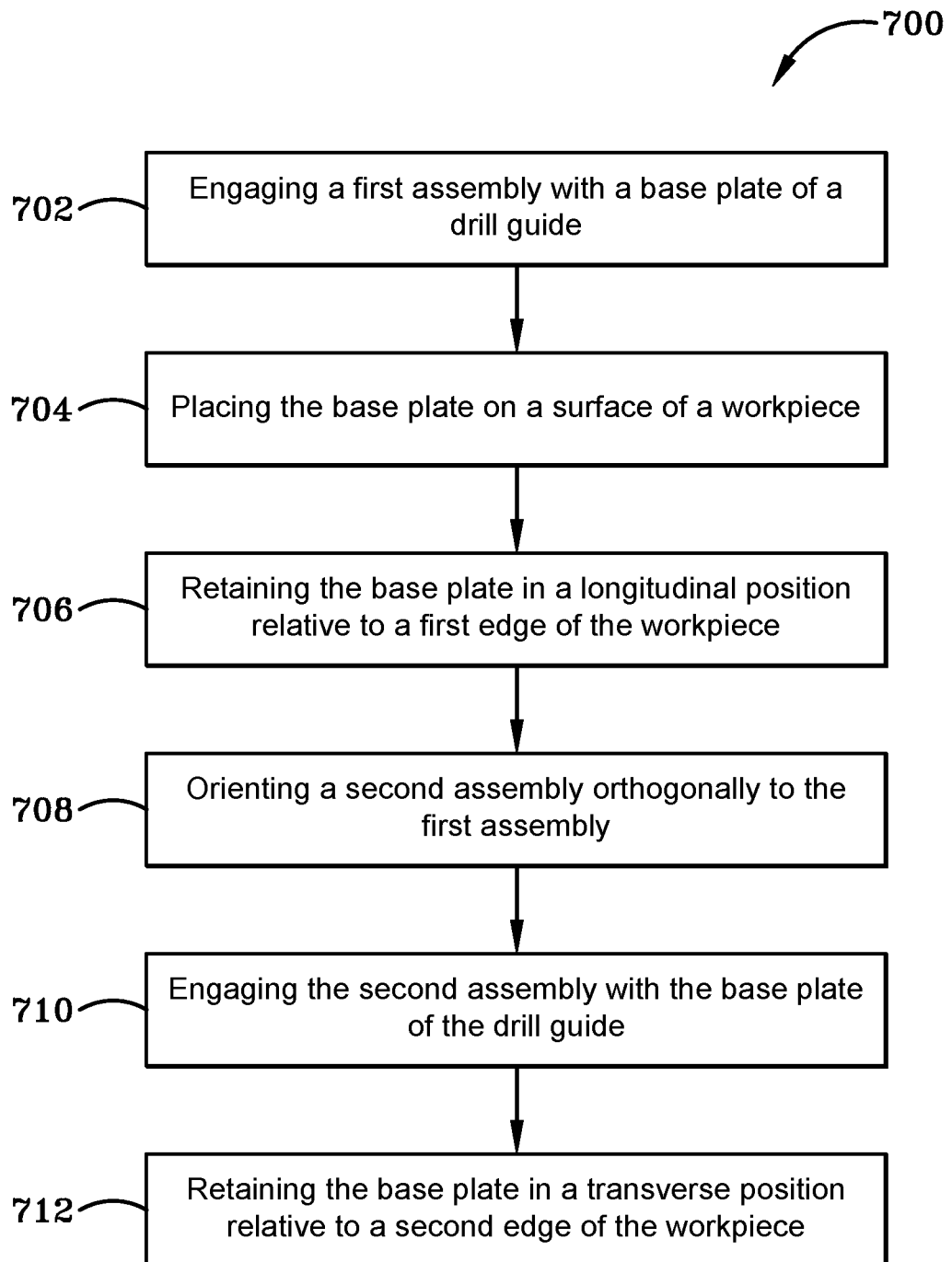
FIG. 35 illustrated another exemplary method flow char for guiding a portable drill guide.

FIG. 35 illustrates a method 700 of guiding a portable drill with a drill guide. An initial step 702 may include engaging a first assembly with a base plate of a drill guide. Another step 704 may include placing the base plate on a surface of a workpiece. Another step 706 may include retaining the base plate in a longitudinal position relative to a first edge of the workpiece, wherein the first edge is orthogonal to the surface of the workpiece. Another step 708 may include orienting a second assembly orthogonally to the first assembly. Another step 710 may include engaging the second assembly with the base plate of the drill guide. Another step 712 may include retaining the base plate in a transverse position relative to a second edge of the workpiece, wherein the second edge is orthogonal to the first edge.

In an exemplary embodiment, method 700 may include additional steps of guiding a portable drill with a drill guide. Optional step may further provide steps of locating a drilling bit of the drill guide at a predetermined location on the surface of the workpiece; rotating the drilling bit; and drilling a hole into the workpiece along a straight line. Optional steps may include the steps of inserting the at least one guide rod through the first aperture defined on the fence; placing the base plate on a top surface of the workpiece; placing a rear end of the fence on a side surface of the workpiece that is substantially perpendicular to the top surface of the workpiece; and positioning the fence at a distance away from the base plate via the at least one guide rod. Optional steps may include the steps of inserting the at least one guide rod through the first aperture defined on the fence; placing the base plate on a top surface of the workpiece; placing a front end of the fence on a side surface of the workpiece that is substantially perpendicular to the top surface of the workpiece; and positioning a portion of a top surface of the fence place adjacent to a bottom surface of a base plate when the fence is disposed beneath the base plate. Optional steps may include the steps of inserting the at least one guide rod through the first aperture defined on the fence; placing the base plate on a top surface of the workpiece; placing a top end of the fence on top surface of the workpiece; and positioning the fence at a distance away from the base plate via the at least one guide rod. Optional steps may include the steps of inserting the at least one guide rod though the second aperture defined on the fence; placing the base plate on a side surface of the workpiece; placing a top end of the fence on the top surface of the workpiece; and positioning the fence at a distance away from the base plate via the at least one guide rod. Optional steps may include the steps of choosing to operably engage at least one extension rod to a second wall of the base plate of the drill guide; operably engaging at least one flip stop to the at least one extension rod disposed perpendicularly to the fence; positioning the fence at a first distance from the base plate via the at least one guide rod; and positioning the at least one flip stop at a second distance from the base plate via the at least on extension rod, wherein the second distance is greater than the first distance. Optional steps may include the steps of choosing to operably engage at least one extension rod to a second wall of the base plate of the drill guide; operably engaging a first flip stop to the at least one extension rod disposed perpendicularly to the fence and disposed at a first distance from the base plate; and operably engaging a second flip stop to the at least one extension rod disposed perpendicularly to the fence and disposed at a second distance from the base plate that is greater than the first distance of the first flip stop.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A drill guide, comprising:
a base plate having a front wall, a rear wall opposite to the front wall, a first side wall, and a second side wall opposite to the first side wall;
at least one guide column provided on the base plate;
a chuck carrier operably engaged with the at least one guide column and being linearly moveable relative to the base plate, wherein said chuck carrier is adapted to engage a portable drill; and
a fence assembly selectively operatively engagable with the base plate at each of the front wall, the rear wall, the first side wall, and the second side wall, wherein the fence assembly is adapted to collectively maintain the base plate, the at least one guide column, the chuck carrier, and the portable drill at a predetermined location on a workpiece; the fence assembly further comprises:
a fence; and at least one guide rod which operably engages the fence to the base plate and maintains the fence a distance away from the base plate.

2. The drill guide of claim 1, wherein the fence is engaged with the at least one guide rod and is selectively movable between a first end of the at least one guide rod and a second end of the at least one guide rod.

3. The drill guide of claim 1, wherein the fence comprises:
a plate, wherein the plate has a front end, an opposed rear end, a longitudinal axis that extends between the front end and the rear end, said plate further having a top surface and an opposed bottom surface;
a step, wherein the step extends outwardly from the top surface of the plate and includes an upper surface remote from the top surface of the plate.

4. The drill guide of claim 3, wherein the rear end of the plate faces the base plate, and wherein the at least one guide rod extends between the rear end of the plate and the front end of the plate.

5. The drill guide of claim 4, wherein the upper surface of the plate and a top surface of the base plate both face in a same direction.

6. The drill guide of claim 4, wherein the upper surface of the plate and a top surface of the base plate face in opposite directions.

7. The drill guide of claim 4, wherein the top surface of the plate faces a bottom surface of the base plate.

8. The drill guide of claim 4, wherein the bottom surface of the plate is orthogonal to a top surface of the base plate.

9. The drill guide of claim 1, further comprising:
a first assembly that is operatively engaged with the base plate and is adapted to retain the base plate in a longitudinal position relative to a first edge of a workpiece; and
a second assembly that is operatively engaged with the base plate and is adapted to retain the base plate in a transverse position relative to a second edge of the workpiece, wherein the first assembly and the second assembly are orthogonal to one another.

10. The drill guide of claim 1, further comprising:
at least one centering pin selectively operatively engagable with the base plate, wherein the at least one centering pin is movable between a first stored position on a top surface of the base plate and a first centering position on a bottom surface of the base plate.

11. The drill guide of claim 10, wherein the at least one centering pin comprises a first centering pin and a second centering pin, and wherein the second centering pin is selectively operatively engagable with the base plate between a second stored position on the top surface of the base plate remote from the first centering pin and a second centering position on the bottom surface of the base plate remote from the first centering pin;
wherein the first centering pin and second centering pin are adapted to align a workpiece with a chuck of the chuck carrier.

12. The drill guide of claim 1, further comprising:
a tapered portion defined in the at least one guide column; and
a depth stopper operably engaged with the at least one guide column; wherein the tapered portion enables self-tightening of the depth stopper about the at least one guide column.

13. The drill guide of claim 12, wherein the tapered portion further comprises:

a first diameter defined at a first end of the tapered portion; and
a second diameter defined at a second end of the tapered portion that is greater than the first diameter;
wherein the tapered portion is adapted to provide a self-tightening mechanism for the depth stopper about the at least one guide column when the chuck carrier moves towards the base plate.

14. The drill guide of claim 1, wherein the base plate further comprises a top surface and an opposed bottom surface which extend between the front end and the rear end, and wherein an opening is defined in the base plate, said opening extending between the top surface and the bottom surface and wherein the opening is adapted to receive a drilling bit provided on the chuck carrier therethrough.

15. The drill guide of claim 14, wherein the chuck carrier further comprises a chuck, and wherein the chuck is aligned with the opening of the base plate.

16. The drill guide of claim 14, wherein the chuck carrier further comprises a chuck, wherein the chuck is located outwardly away from the base plate.

17. The drill guide of claim 16, wherein the chuck of the chuck carrier is adapted to engage a drilling bit having a diameter of up to about two inches.

18. The drill guide of claim 14, wherein the opening of the base plate is adapted to receive a drilling bit having a diameter of up to about one inch.

19. A drill guide, comprising:
a base plate having a front wall, a rear wall longitudinally opposite to the front wall, a first side wall, a second side wall transversely opposite to the first side wall, a top surface, and a bottom surface vertically opposite to the top surface;
at least one guide column provided on the base plate;
a chuck carrier operably engaged with the at least one guide column and being linearly moveable relative to the base plate, wherein said chuck carrier is adapted to engage a portable drill; and
a fence assembly selectively operatively engagable with the base plate at any of the front wall, the rear wall, the first side wall, and the second side wall, wherein the fence assembly is adapted to collectively maintain the base plate, the at least one guide column, the chuck carrier, and the portable drill at a predetermined location on a workpiece.

20. A drill guide, comprising:
a base plate having a front wall, a rear wall longitudinally opposite to the front wall, a first side wall, a second side wall transversely opposite to the first side wall, a top surface, and a bottom surface vertically opposite to the top surface;
at least one guide column provided on the base plate;
a chuck carrier operably engaged with the at least one guide column and being linearly moveable relative to the base plate, wherein said chuck carrier is adapted to engage a portable drill; and
a fence assembly selectively operatively engagable with the base plate at any two of the front wall, the rear wall, the first side wall, and the second side wall that are perpendicular to one another, wherein the fence assembly is adapted to collectively maintain the base plate, the at least one guide column, the chuck carrier, and the portable drill at a predetermined location on a workpiece.

* * * * *